(12) United States Patent
Meeker

(10) Patent No.: US 7,545,988 B2
(45) Date of Patent: Jun. 9, 2009

(54) IMAGE BLOCKING ARTIFACT REDUCTION VIA TRANSFORM PAIR

(76) Inventor: George William Meeker, 310 Bonifant Rd., Silver Spring, MD (US) 20905

( * ) Notice: Subject to any disclaimer, the term of this patent is extended or adjusted under 35 U.S.C. 154(b) by 647 days.

(21) Appl. No.: 11/161,571

(22) Filed: Aug. 8, 2005

(65) Prior Publication Data

US 2006/0029282 A1 Feb. 9, 2006

Related U.S. Application Data

(60) Provisional application No. 60/599,837, filed on Aug. 9, 2004.

(51) Int. Cl.
*G06K 9/36* (2006.01)
(52) U.S. Cl. ...................... 382/232
(58) Field of Classification Search ......... 382/232–234, 382/236, 238–240, 248, 250–251; 348/384.1, 348/390.1, 394.1–395.1, 398.1–404.1, 408.1, 348/430.1–431.1; 375/240.02, 240.11, 240.18–240.2, 375/240.24; 708/317, 400–401
See application file for complete search history.

(56) References Cited

U.S. PATENT DOCUMENTS

| | | | |
|---|---|---|---|
| 4,447,886 A | 5/1984 | Meeker | |
| 4,754,492 A | 6/1988 | Malvar | |
| 5,220,616 A | 6/1993 | Downing et al. | |
| 5,357,584 A | 10/1994 | Yamaoka | |
| 5,367,385 A | 11/1994 | Yuan | |
| 5,629,778 A | 5/1997 | Reuman | |
| 6,141,446 A * | 10/2000 | Boliek et al. | 382/233 |
| 6,754,394 B2 * | 6/2004 | Boliek et al. | 382/240 |
| 6,996,281 B2 * | 2/2006 | Boliek et al. | 282/236 |
| 7,382,925 B2 * | 6/2008 | Boliek et al. | 382/233 |

OTHER PUBLICATIONS

Clarke, R.J., "Transform Coding of Images", 1985, pp. 100-105, Academic Press, Inc., Orlando, FL.
Pennebaker, W.B. and Mitchell, J.L., "JPEG Still Image Data Compression Standard", 1993, pp. 261-265, Van Nostrand Reinhold, New York.
Rao, K.R., and Yip, P., "Discrete Cosine Transform, Algorithms, Advantages Applications", 1990, pp. 48, 62-63, 88, 104-106, Academic Press Limited., United Kingdom.
Richardson, Iain E.G., "H.264 and MPEG-4 Video Compression, Video Coding for Next-generation Multimedia", 2004, pp. 184-187, John Wiley & Sons Ltd., United Kingdom.

* cited by examiner

*Primary Examiner*—Jose L Couso
(74) *Attorney, Agent, or Firm*—Miles & Stockbridge P.C.; Michael A. Minter, Esq.

(57) ABSTRACT

An apparatus using a compact blocked and Wavelet transform pair suppresses block artifacts in image compression systems by re-purposing one or more block transform coefficients with Wavelet coefficients. A general architecture and class of transforms is disclosed including integer types having Wavelet features but which can be processed one block at a time. An exemplary integer, non-separable two-dimensional Wavelet Transform is disclosed to partner with a Walsh-Hadamard blocked transform to serve as the core for the apparatus then tailored to function as a DCT, DST or other signal transform.

28 Claims, 30 Drawing Sheets

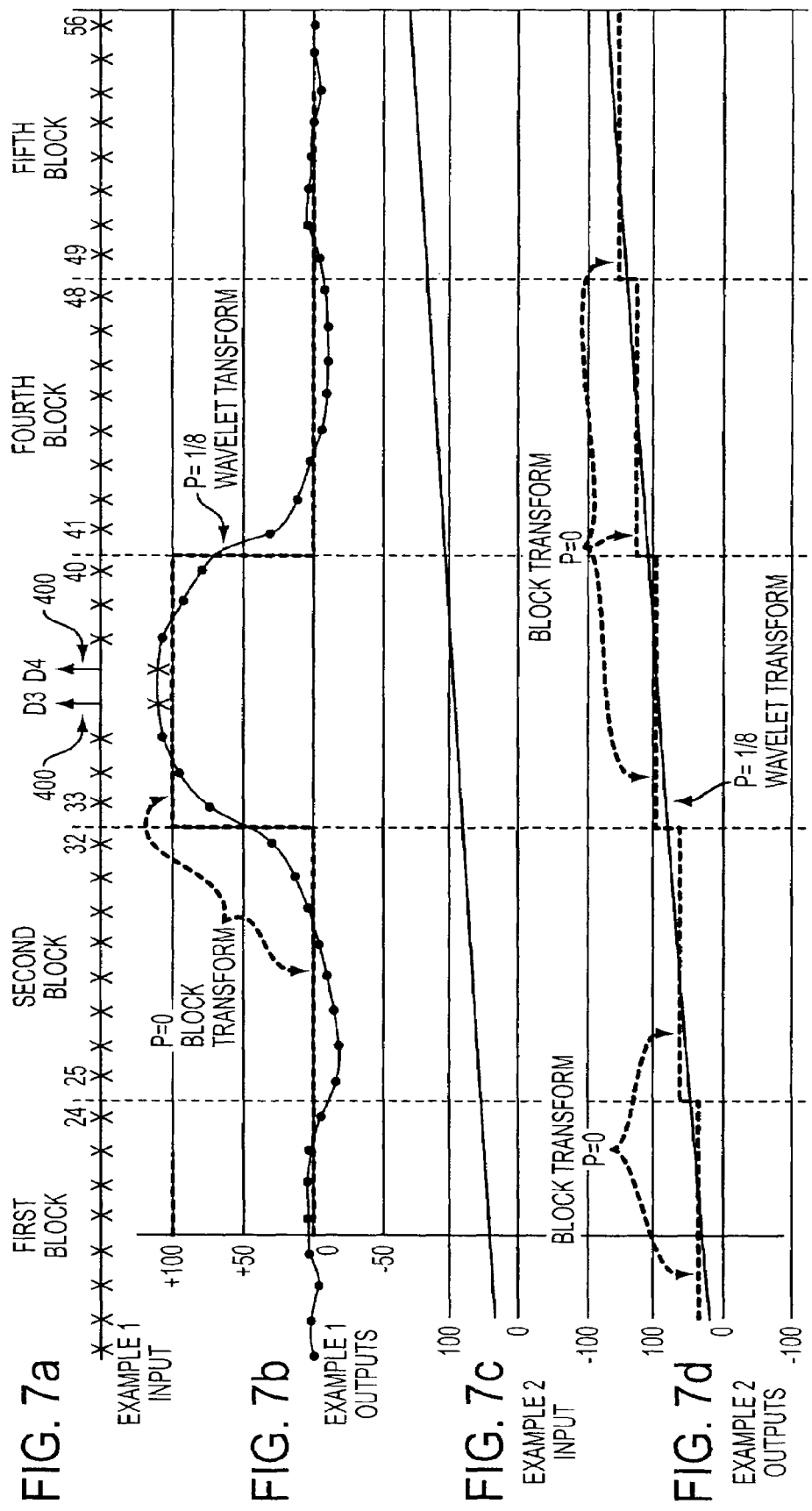

1D DATA EDGE CALCULATION METHODS

ALIGNMENT OF 2D ELEMENTAL WAVELET
TRANSFORMS IN ADJACENT LAYERS

| | | | | | |
|---|---|---|---|---|---|
| D(M1-3, N1-3) | -------- | -------- | -------- | -------- | D(M1-3, N1+2) |
| | D(M1-2, N1-2) | -------- | -------- | D(M1-2, N1+1) | |
| | | D(M1-1, N1-1) | D(M1-1, N1) | D(M1-1, N1+1) | |
| | | D(M1, N1-1) | D(M1, N1) | D(M1, N1+1) | |
| | D(M1+1, N1-2) | -------- | -------- | D(M1+1, N1+1) | |
| D(M1+2, N1-3) | -------- | -------- | -------- | -------- | D(M1+2, N1+2) |

FIG. 11a

| C(M-1, N-1) | C(M-1, N) | C(M-1, N+1) |
|---|---|---|
| C(M, N-1) | C(M,N), CH(M,N) CV(M,N) CD(M,N) | C(M, N+1) |
| C(M+1, N-1) | C(M+1, N) | C(M+1, N+1) |

FIG. 11b

2D WHT SIGNAL FLOW DIAGRAM
1ST COLUMN
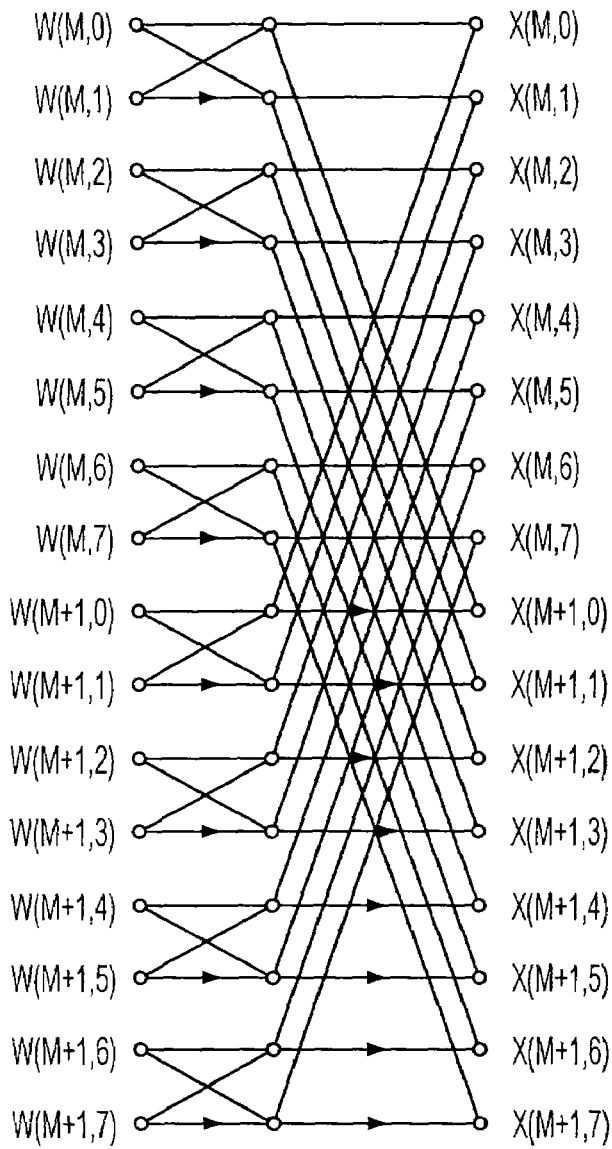
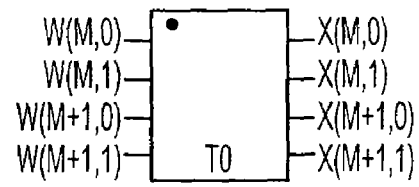
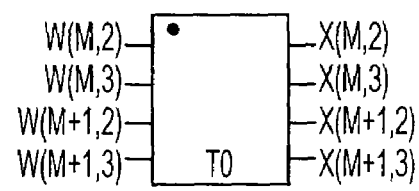
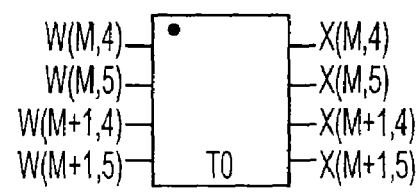
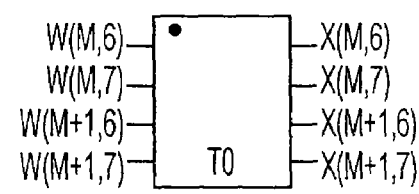
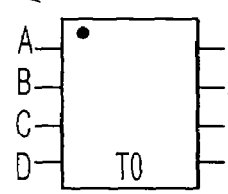
4 OF THESE FOR COLUMN1;
ONE EACH FOR M = 0,2,4 & 6
FIG. 13

2D WHT SIGNAL FLOW DIAGRAM;
2ND COLUMN; GROUP 0
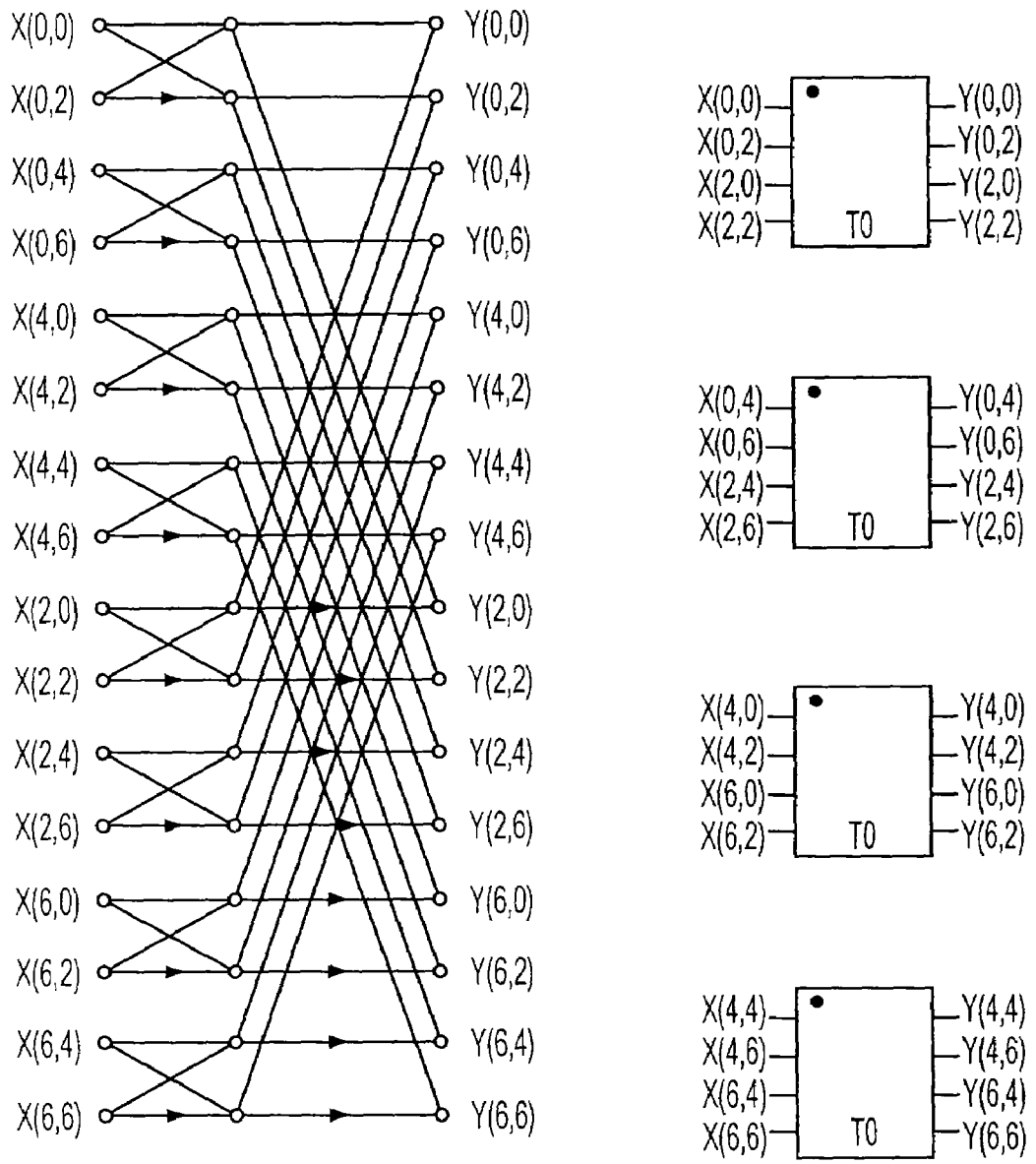
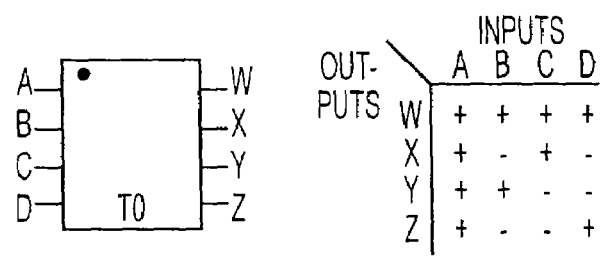
FIG. 14a

2D WHT SIGNAL FLOW DIAGRAM;
2ND COLUMN GROUP 2
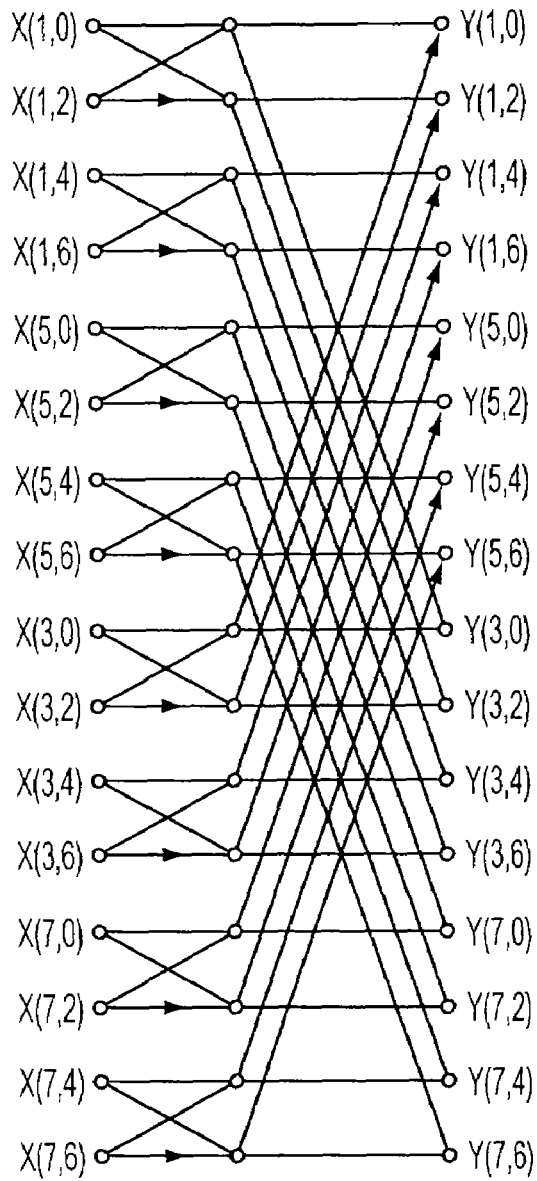
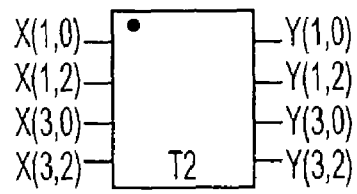
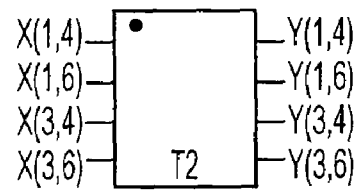
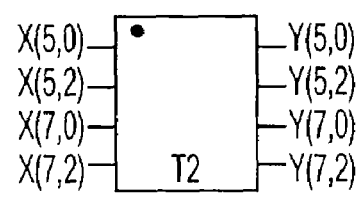
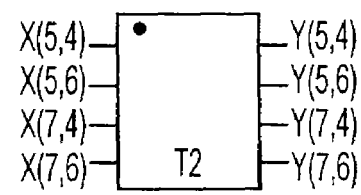
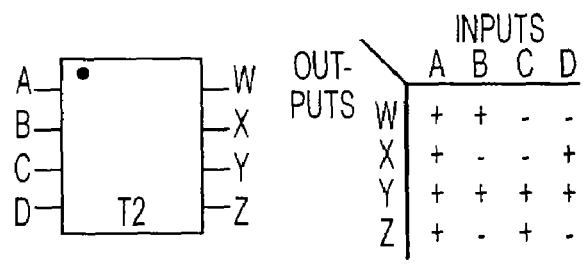
FIG. 14c 2D WHT SIGNAL FLOW DIAGRAM;
3RD COLUMN; GROUP 0
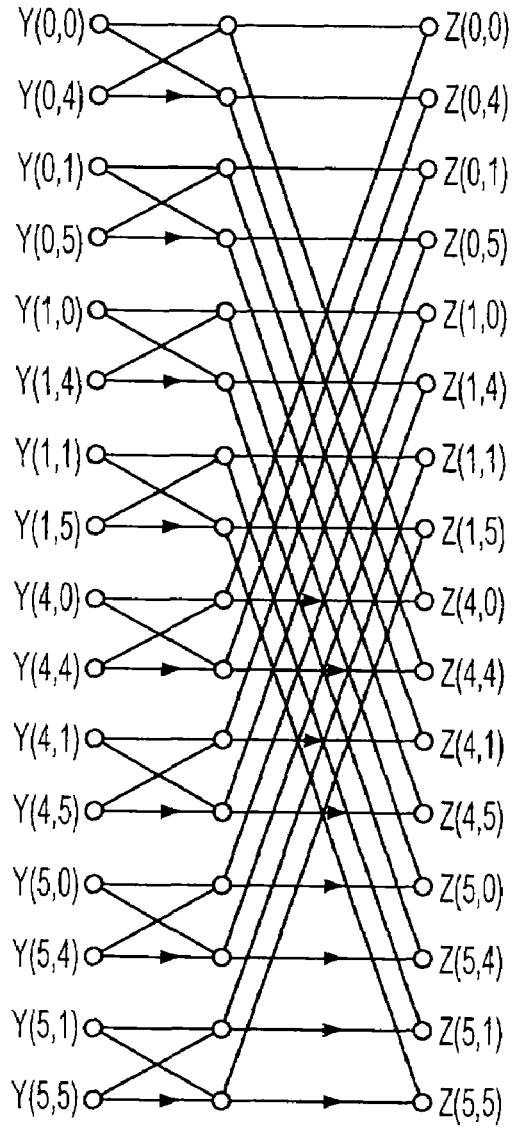
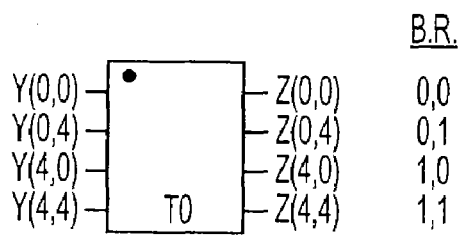
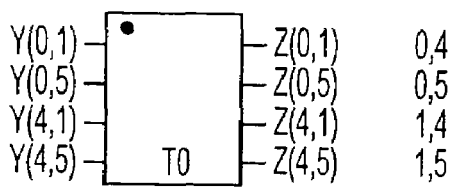
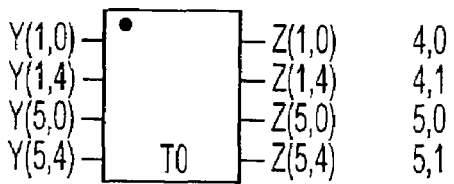
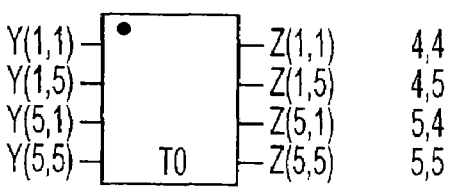
TYPE 0 SHOWN
ON FIG. 14a
FIG. 15a

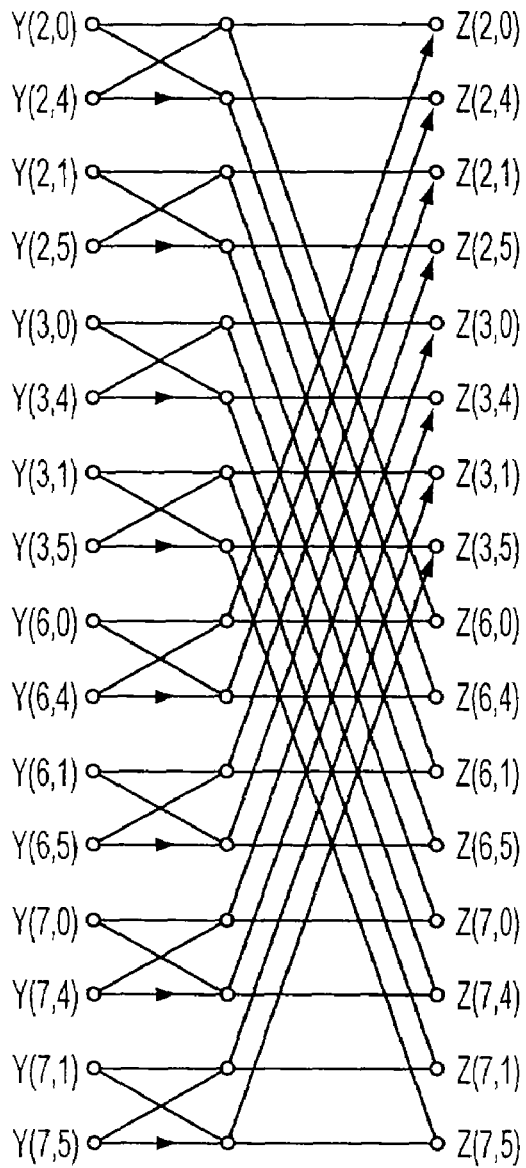
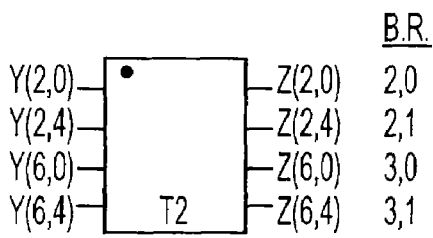
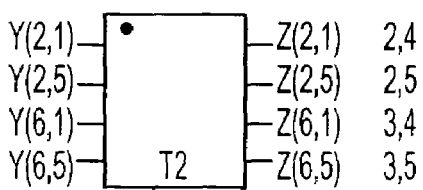
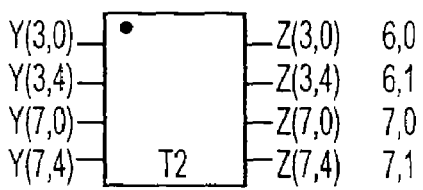
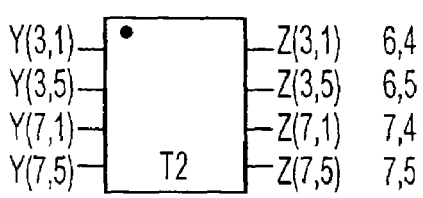
TYPE 2 SHOWN ON FIG. 14c
FIG. 15c 2D WHT FLOW DIAGRAM;
3RD COLUMN; GROUP 3
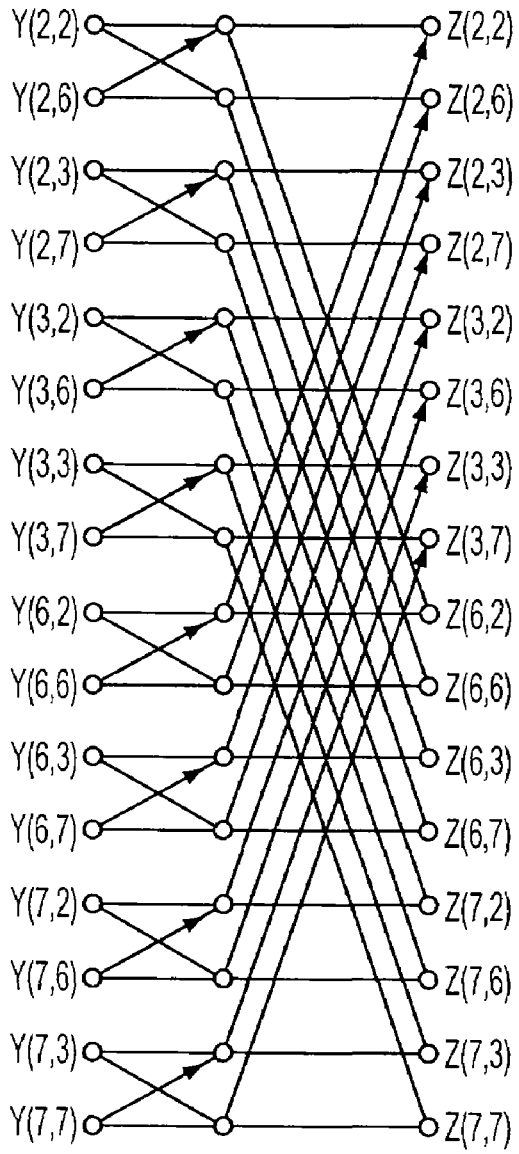
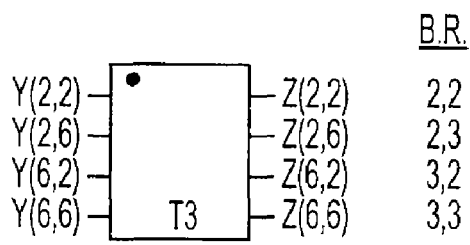
| B.R. |
|---|
| 2,2 |
| 2,3 |
| 3,2 |
| 3,3 |
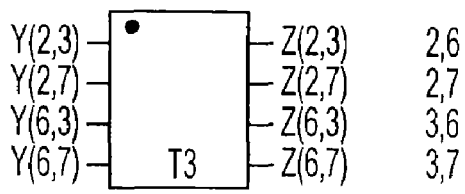
| B.R. |
|---|
| 2,6 |
| 2,7 |
| 3,6 |
| 3,7 |
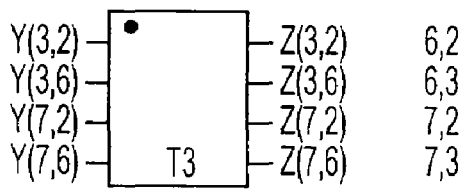
| B.R. |
|---|
| 6,2 |
| 6,3 |
| 7,2 |
| 7,3 |
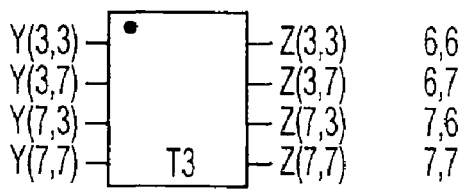
| B.R. |
|---|
| 6,6 |
| 6,7 |
| 7,6 |
| 7,7 |
TYPE 3 SHOWN
ON FIG. 14d
FIG. 15d

IMAGE BLOCKING ARTIFACT REDUCTION VIA TRANSFORM PAIR

FIELD OF THE INVENTION

This invention relates to waveform coding, image processing for still or motion images, image compression and subsequent reconstruction, block and wavelet signal transforms, electronic signal processing and in particular, methods for minimizing block transform edge artifacts caused by transform coefficient quantization in the image compression process. The invention is applicable to prior art coding standards for compression of images and motion imagery including the Joint Photographic Experts Group (JPEG), the Motion Picture Experts Group (MPEG) series—one, two and four—and the telecommunication series H.261 through H.264.

BACKGROUND OF THE INVENTION

This invention relates to the compression of still or motion images for efficient storage and/or transmission. Most frequently used is the method of performing the Discrete Cosine Transform (DCT) followed by a quantization of the resulting transform coefficients to minimize coefficient data that must be transmitted to represent the imagery and lastly a lossless entropy encoding process for transmission of the quantized data. This prior art sequence of operations is well known and readily implemented. The DCT is a blocked transform wherein individual blocks usually of an eight-by-eight array of picture elements each can be individually processed before moving on to process the next block.

A natural consequence of the quantization process is the loss of coefficient accuracy at the decoder, which results in distortion of the reconstructed imagery. The purpose of a good transform is to minimize the appearance of the distortion introduced to create the efficient compression of the imagery. The DCT is an excellent transform to accomplish this goal. However, when a large amount of compression is achieved by using a large amount of quantization then noticeable artifacts appear in the reconstructed imagery. Most bothersome is the so-called blocking artifact, which causes image portions to appear in blocks or tiles.

The Wavelet Transform (WT) is also used for image compression and does not suffer the blocking problem since it is calculated as overlapping waves without the immediate borders of the blocked transforms. The blocked nature of the DCT, on the other hand, makes it ideal for the motion compensated prediction process used in the Interframe compression of moving imagery. Use of this Inter-frame compression technique with the Wavelet Transform is problematic and not generally undertaken. For single images the Wavelet Transform provides high compression efficiency without blocking problems although its calculation method is generally more complex than that of the DCT.

An early example of WT prior art is described in U.S. Pat. No. 4,447,886 named, Triangle and Pyramid Signal Transforms and Apparatus issued to Meeker. Overlapping basis functions are described to form a compact representation of one- and two-dimensional data sets. Said two-dimensional representation uses the one-dimensional transform in a modified separable two-dimensional configuration. These transforms are shown in a stand-alone implementation not in conjunction with another transform. The transforms have some characteristics similar to the one-dimensional Wavelet transform used in the present invention. The two-dimensional Wavelet Transform introduced herein and described is a novel non-separable transform that is an integral part of this present invention.

Block edge artifacts occurring with DCT reconstruction have been treated in some system standards for many years with smoothing filters applied across the block boundaries. Although effective in reducing the artifacts themselves the filtering action can attenuate actual image detail. Moreover, the edge smoothing process can change the average brightness of a block. In motion imagery this can cause an unintended wavy appearance of imagery undergoing translational motion. In the earlier H.261 video codec for teleconferencing applications the smoothing filter was a simple low-pass filter across the block edges but has grown in complexity with more recent standards. The newer H.264 codec uses between three and five tap filters to adjust the degree of filtering under a variety of circumstances. Details of the H.264 de-blocking filter are found in "H.264 and MPEG-4 Video Compression" by Iain E. G. Richardson, Wiley, 2004, PP. 184-187.

Another prior art technique is "Prediction of AC Coefficients from the DC Values" in the firstJoint Photographic Experts Group (JPEG) standard. This method is included in the specification ISO/IECJTC1/SC2/WG8 N745 (May 1988). A description is also given in "JPEG Still Image Data Compression Standard", VanNostrand Reinhold, N.Y., 1993, pp. 261-265. by W. B. Pennebaker and J. L. Mitchell. The method predicts the first five AC DCT coefficients of a block being processed using the model of a quadratic surface fitted to a three-by-three array of DCT blocks where the block presently being processed is at the center. With this method a smooth surface is produced at the center block's edges in smooth background areas of the image. However, predictions are not reliable at edges and the method must be avoided in those blocks where transmitted ac. coefficients are decoded.

Another technique directed to block artifact reduction is "Method and system for adapting a digitized signal processing system for block processing with minimal blocking artifacts" described in U.S. Pat. No. 4,754,492 by Malvar. This uses multiple DCT blocks with a post-filtering process forming, in essence, a basis function that is twice, or more, the length of DCT functions and is called the Lapped Orthogonal Transform (LOT). Blocks therefore overlap each other by 50%, or more. LOT cosine basis functions both start and end at the value of zero whereas the comparable DCT functions start and end near the cosine function's maximum value. Discontinuities at the border between blocks are therefore avoided. The meaning of the transform coefficients are modified from that of standard blocked transforms such that the amplitudes of the discrete frequencies is carried by the lower half of the frequencies in a pair of one-dimensional blocks leaving the upper half of the discrete frequencies to carry information as to how the actual frequency components are distributed between the blocks of the pair. Quantization effects instead relate to unintended distribution of frequency content between the pair sometimes producing a "ringing" effect.

U.S. Pat. No. 5,220616 by Downing, et al describes a method operating on reconstructed imagery at the decoder transformed from received quantized transform coefficients wherein the resulting block boundaries are sequentially scanned and subsequently smoothed by a one-dimensional operator matrix.

U.S. Pat. No. 5,357,584 by Yamaoka discloses a method for evaluating at the encoder the block artifact effects that will occur at the decoder for particular levels of encoder quantization. The encoder is then able to use an optimum degree of coefficient quantization balancing image quality and compression efficiency.

U.S. Pat. No. 5,367,385 by Yuan discloses a method for pixel modification around block boundaries of imagery reconstructed from blocked transforms. A low-pass filtering is applied to reduce the difference between pixels across block boundaries.

U.S. Pat. No. 5,629,778 issued to Reuman that discloses a method for suppressing block artifacts through use of overlap transformation of reconstructed imagery at the decoder and a means of filtering in the frequency domain using a quantization error matrix. Said error matrix is derived from additional data sent from the encoder or from an estimation of error via a decoder look-up table. The adjusted overlap frequency representation is then inverse-transformed to obtain reduced-noise imagery for presentation.

The prior art in many cases has approached the block artifact problem in a two step process of first measuring the discontinuities at block edges in either the data or the frequency domain caused by quantization effects on the transform coefficients received at the decoder. The second step is a compensation process involving replacement of data values on either side of a block edge or the addition of compensating frequency domain coefficients to affect a similar result.

The present invention differs from this approach and does not rely on measurement of block edges or subsequent compensation of them. For small to moderate values of coefficient quantization a primary result is the loss of transform coefficients that are quantized to the value of zero. A primary category of these lost coefficients is a pattern that also appears in adjacent blocks. In combination these transform coefficients indicate low-frequency components of the same wave over multiple blocks. The method of the new invention largely prevents the loss of these low-frequency components over multiple blocks by re-purposing the dc. coefficients of the block transform to signal said components to the decoder. Since the dc. component is not subject to variable quantization as are the ac. transform coefficients in standardized systems the quantization effects do not occur with this signaling. The re-purposing is accomplished by replacement of the dc. term of the blocked transform with a Wavelet Transform scaled coefficient having certain desirable coefficients designed for this purpose. A combination of the Wavelet coefficients for multiple blocks by itself results in a decoder reconstruction of smooth contour without block edges. This technique also lessens artifacts caused by the ac, block transform coefficients remaining to be transmitted to generate detail in each block. This re-purposing method offers greater use of the already available signaling structure in current image compression systems and does not require any further signaling of image data, error data or side information.

OBJECTS OF THE INVENTION

A principal objective of the invention is a reduction in block edge artifact distortion in reconstructed data and imagery whose representation in the block transform domain has been compressed using a transform coefficient quantization process. A further objective is to re-purpose the dc. transform coefficient of each of a plurality of transform blocks through partial use of a supporting Wavelet Transform to describe a low spatial frequency continuous contour of the data or imagery. The objective is to subtract this continuous contour from the incoming data or imagery and perform block transforms and quantization on the resulting difference signal. It is a further object of the invention to organize the calculation of the wavelet and block transforms in a unified and computation efficient process.

It is also an object of the invention to provide a new integer, non-separable, two-dimensional Wavelet Transform for re-purposing the dc. coefficient of the Blocked Transform and achieve additional smoothness in the diagonal direction spatial direction.

A further object of the invention is to satisfy the above objectives without transmission of any additional signal data, error data or side information from the encoder to the decoder.

SUMMARY OF THE INVENTION

This invention employs a combination of a blocked transform such as the Discrete Cosine Transform (DCT) and a Wavelet Transform (WT) to alleviate the blocking artifact distortion in single images or motion imagery but to also retain the usability of the transform combination in motion imagery applications and the flexibility of processing on a block-by-block basis. This transform combination operates in a first region directly on the image or other input signal data. The output of the first region is a set of ac. and dc. transform coefficients organized into blocks, as is the case with a blocked transform alone. The WT optionally continues on into a second region by itself using the output scaled coefficients of the WT from the first region as inputs. The output ac. coefficients of the first region are a combination of the blocked and wavelet coefficients. The total number of ac. and dc. coefficients from each combined transform block is equal to the number of elements in the input data set within the range of the primary blocked transform. It is therefore deemed a compact transform.

In the WT used in this combination the scaling analysis component after three layers of calculations is by design exactly equal to the dc. coefficient of the eight point blocked transform, or of 64 points in two dimensions. The wavelet coefficient analysis component is crafted tt o have a spread over the image, or other, data space somewhat greater than that of the complementary scaling analysis component. The Wavelet transform synthesis components are crafted for perfect reconstruction and for compacting most of the low frequency energy of the input data signal into said Wavelet scaling synthesis components. The underlying motivation here is to reconstruct the low frequency portion of the data signal from the dc. coefficients of the transform, as these always receive a fixed and quite modest amount of quantization. These terms are also overlapping and proceed to zero value at their edges. In contrast, the ac. blocked transform coefficients which carry portions of low frequency energy when said blocked transform is used by itself are subject to heavy quantization and hence distortion. In a relatively smooth area of the input data set the ac. coefficients often are reduced in magnitude or made zero-valued when used in the combined transformer of this invention. The Low-pass frequency filter sharpness of the WT is key to achieving good artifact reduction.

The set of Wavelet coefficients in the first region of the combined transformer are by design arbitrarily set to zero, although not in all alternative implementations of this invention. A few scaled dc. coefficients around this block must be available for calculations as well. The ac. transform coefficients generated by the blocked transform are modified according to a function of the scaled dc. coefficients in the neighborhood of the present processing block to then compactly and completely specify the input data in terms of new modified transform domain coefficients.

The combined transform can be equivalently calculated in multiple ways both at the encoder and the decoder. Details of these methods are shown in the Detailed Description of the Invention. A Walsh-Hadamard Transform (WHT) is calculated using the input data to obtain WHT transform coefficients. This integer-type transform is calculated using only additions and subtractions. Combinations formed from the dc. values of surrounding blocks are next used to modify these WHT coefficients in accordance with the invention. In this last process low frequency portions, now carried by the WHT dc. coefficient, are removed from ac. transform coefficients. These calculations involve only additions, subtractions and binary shifts. No non-trivial multiplications are required.

The last encoder process prior to ac coefficient quantization converts the WHT coefficients to those of the desired transform. The DCT is a desirable blocked transform. This conversion process contains all of the multiplications necessary to calculate the DCT from the WHT. FAST algorithms in one and two dimensions provide for relatively simple conversion processes. This two-step process of the WHT followed by the DCT conversion avoids multiplications in the coefficient modifiers and relegates them to the WHT-TO-DCT Transformation where they have to be done anyway to achieve DCT coefficients.

A wide variety of transforms can be calculated from the WHT using a suitable and relatively simple transformation matrix. Among these are integer types that approximate the DCT. The 2D WHT is naturally an integer type and use of an integer conversion matrix can generate other integer transform types. A 2D non-separable integer Wavelet Transform is introduced as part of the invention that helps the transform smoothly reconstruct the low frequency diagonal 2D imagery as well as the horizontal and vertical 2D imagery using only the aforementioned dc. coefficients.

Region Two processing of the combined transform commences with the scaled DC terms generated by the final layer of the Wavelet scaled analysis step in Region One. The Wavelet transform is continued in further layers wherein the coefficients generated by each layer are now saved or transmitted for subsequent data reconstruction. The blocked transform coefficients are neither calculated nor used in Region Two. Region Two is intended for use in single image compression or the Intra-frame compression in motion imagery. Inter-frame image compression may alternatively employ Region One processing alone.

The decoder for reconstructing the imagery from the combined transform coefficients is described very much as the inverse of the encoder process. Mathematically the inverse WHT is the same as the forward WHT. The conversion of DCT coefficients to WHT coefficients is a straightforward reversal of the signal flow chart of the forward conversion process. Finally, the computation of modifications of WHT coefficients at the decoder is identical to that of the forward process. Where these adjustments at the encoder are subtractions these same modifications become additions at the decoder.

The process of subtractive modifications to WHT or Block Transform (BT) frequency coefficients at the encoder by performing transforms before the subtraction is shown to be mathematically equivalent to performing the subtractive modifications in the data domain between the input data and the Wavelet low-pass filter data. Frequency domain subtractive modifications are desirable since each basic Transform Block can be processed separately. Additionally, approximations can be readily made to the frequency domain subtraction process with little effect on the performance of the system. Some subtractions concerning high frequency coefficients can be omitted entirely. The decoder additive linear modifications are calculated from identical scaled dc. coefficient data used at the encoder that convert the received ac. coefficients back to complete WHT coefficients. Encoder and decoder calculations are always identical since they are based on the non-variably quantized dc. components that are always the same at the encoder and decoder.

The burden of transmitting a portion of the low-pass filtered data normally carried by ac. block transform coefficients that are subject to variable quantization has been transferred to the fixed-quantization dc. coefficient of the blocks. The advantage gained is the avoidance of the generally higher quantization performed on these ac. coefficients and the attendant generation of blocking artifacts in reconstructed imagery.

The format of the above signal processing is important in that it permits use of approximations of the frequency modification terms. The general procedure of subtractive modifications at the encoder with like additions at the decoder results in saving low-frequency image content that is otherwise lost to coefficient quantization. However, the magnitude of the frequency-modification components generally decreases with increasing spatial frequency. It is therefore viable to consider simplification of the formation of these components or in some cases omission of them. These are both approximations. There is no harm done by this process in the light-quantization case of ac. coefficients as said coefficients are able to take over any decrease in the capability of the modifications. In the case of higher quantization of ac. coefficients the decrease in ability of the modifications can be kept small by approximating the higher frequency coefficients to a higher degree and keeping the lower frequency modifications less approximated. This preserves the quality of the method and also affords some calculation simplification.

A method is next shown for treating image, or other data, edges, either 1D or 2D, to keep the number of transform components from exceeding the number of data components. This keeps the coefficient representation compact. The overlapping feature of the Wavelet transform requires data in adjacent blocks for calculations. This data becomes non-existent at edges where the data commences and ends. Odd symmetry mirroring of the existing data is used at the data edges to provide the extra input data needed to calculate the Wavelet Transform. This mirroring symmetry causes edge transform coefficients to have zero value and can always be taken to be zero-valued at the decoder avoiding any transmission of them.

In summary there are multiple ways of viewing this invention that describe its characteristics and focus on its desirable features. First it is a new class of signal transforms made from a pair of previous transform types. This class can accommodate different block transforms and different Wavelet transforms some of which are shown in the description of the invention.

Second it can be viewed as two different transform types— the Wavelet and the blocked transform operating sequentially—wherein the Wavelet Transform first represents low-frequency content of the input data signal so as not to chop it up into blocks but rather portray it as continuous multi-block imagery. The blocked transform is then presented the remainder of the imagery involving mostly the block's details represented by higher-frequency content more self-contained within a block.

Third it can be viewed as a process of re-purposing the dc. coefficient of the transform block to additionally be a sample of a multi-block, sharp cut-off, low-pass filter such that in combination the multiple sample points represent the low frequency contour of the data or imagery without being subject to the variable quantization of the ac. coefficients of the blocked transform. This re-purposing aspect creates a higher level of performance in minimizing blocking artifacts without trading away the block artifact problem for a different problem such as loss of image detail, ringing, or wavy-ness in moving imagery.

BRIEF DESCRIPTION OF THE DRAWINGS

FIG. 1 shows a simplified block diagram of the basic invention for compression of an incoming data source using a combination of a Wavelet and a Block Transform together over a first spectral region, Region I, and the Wavelet Transform alone over the second spectral region, Region II.

FIG. 2 shows a sequence of rearrangement and expansion of the blocks in FIG. 1. Whereas FIG. 1 illustrates the invention with the combination of two transforms for Region I in the data domain FIG. 2 shows the steps in derivation of the transform combination in the frequency domain.

FIG. 3 shows block diagrams of the preferred implementation of the invention following the steps of the derivation from FIG. 1 and FIG. 2.

FIG. 6a is overlaid on FIG. 6b it is seen to be a subset of FIG. 6b.

FIG. 7 shows input data examples and the responses of the Inverse Wavelet Transform using only the third layer scaled coefficient outputs from the analysis transform as input to the synthesis transform. FIG. 7a shows an input with two values each of magnitude 400. FIG. 7b shows the response to the input of FIG. 7a first with the parameter, 'P', equal to ⅛ (solid line) and second to zero (dashed line). FIG. 7c shows a linear ramp as the data input. FIG. 7d shows the response to the data of FIG. 7c first with the parameter, 'P', equal to ⅛ (solid line) and second to zero (dashed line).

FIGS. 11a and 11b show the arrangement of two-dimensional data and of transform coefficients and the nomenclature for them. Taken in the forward transform direction FIG. 11a shows all of the data elements required for processing one two-dimensional elemental block located in the center of FIG. 11b. In the reconstruction direction FIG. 11b shows all the data elements required to calculate the four center data elements within the heavy lines in FIG. 11a.

FIG. 13 shows the signal flow diagram for the first of three columns of the two-dimensional WHT with simplified representation for basic blocks. All 16 2-D blocks are indicated through use of the parameter M that takes on values of 0, 2, 4 and 6. A careful comparison with the blocks of FIG. 12 indicates that the elemental Wavelet Transform overlays precisely the WHT blocks defined in FIG. 13 not considering transform scaling. Looking ahead to FIG. 16 there are 16 Wavelet blocks in column 1, (denoted by the '1' inside the blocks) that overlay the 16 WHT blocks indicated in FIG. 13.

FIGS. 14a, 14b, 14c and 14d show the signal flow diagrams for the second of three columns of the two-dimensional WHT with simplified representation for basic blocks. The four WT blocks in FIG. 16, denoted by a circled 2, indicating column 2, overlay the four FIG. 14a WHT blocks marked TO inside the blocks. The remaining 12 blocks in FIGS. 14b, 14c and 14d do not have overlays.

FIGS. 15a, 15b, 15c, and 15d show the signal flow diagrams for the third of three columns of the two-dimensional WHT with simplified representation for the basic blocks. The single WT block in FIG. 16, denoted by the circled 3, indicating column 3, overlays the one WHT block in FIG. 15a with inputs Y(0,0), Y(0,4), Y(4,0) and Y(4,4).

DETAILED DESCRIPTION OF THE INVENTION

Figure 1A:
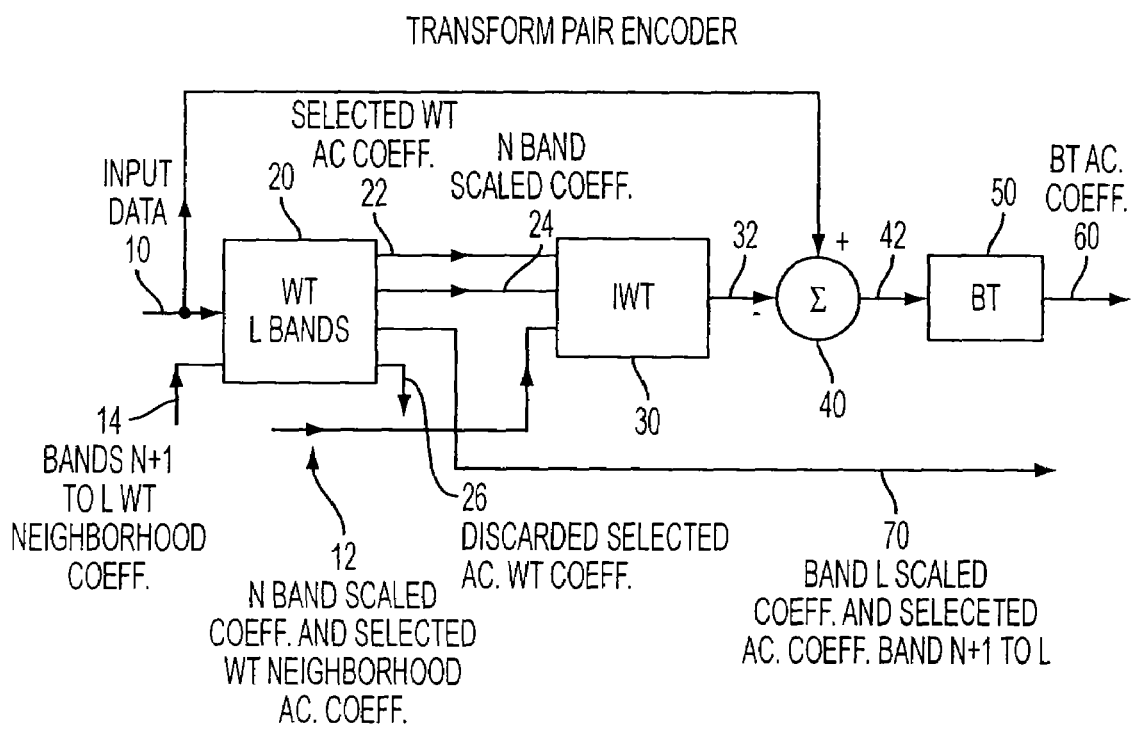
FIG. 1a shows the encoder and FIG. 1b shows the data reconstruction decoder.

Many video and audio data compression systems employ a data transformer, a lossy quantization process to reduce the number of bits to describe transform coefficients and a subsequent lossless encoding process. A major purpose of the transform is to convert the data into a format where the subsequent quantization is least disruptive to the quality of the output data reconstructed from the quantized transform coefficients. The quantization process results in fewer bits to specify each coefficient. Many of these coefficients have a small magnitude and can be quantized to a value of zero. Others have a value of zero. These quantized coefficients are then very efficiently encoded using entropy coding and placed in bit stream for transmission.

Distortion of the reconstructed data is produced by quantization of transform coefficients in proportion to the level of quantization employed. To effect high compression efficiency one uses greater quantization but to achieve less distortion one uses less quantization. Compression transforms can in part be judged by their ability to create better reproduction at higher quantizations than other transforms. The DCT has found wide use in still and motion imagery since it excels in this regard and is relatively easy to implement given the FAST algorithms that have evolved for its efficient calculation. The size of an individual blocked transform has a practical limit restricted by the number of calculations necessary to perform it. The overall data space is therefore subdivided into multiple individual transform blocks each of which is calculated separately.

The Wavelet family of transforms has evolved more recently. A Wavelet Transform (WT) is an overlapping or non-blocked transform with parameters that can be selected to, in some sense, optimize compression performance. This transform is calculated in layers that will be referred to as bands wherein a one-dimensional transform one half of the output data is coefficient data produced to exit the transform at that band and the other half of the output data is scaled coefficient data input to the succeeding band. In two dimensions three-quarters of a band's out are transform coefficients that exit the transform at that band and one-quarter of the output data is scaled coefficient data input to the succeeding band. The number of bands does not have a limit due to growing calculation complexity. However, the calculation of the Wavelet transform is arguably more involved than is the DCT and not as readily performed one block at a time.

Both the DCT and WT can tolerate substantial quantization of their ac. transform coefficients without excessive visible distortion. Although the ac. coefficients are variably quantized the dc value of a blocked transform block is fixed and always lightly quantized. This latter fact will be utilized in the invention to gain improved reconstructed image performance. However, since the DCT is subdivided into blocks, use of a large amount of ac quantization can cause artifact block edges to appear in the reconstructed imagery. The WT generally avoids this particular problem since it is not a blocked transform. Use of the WT in motion imagery has not yet proven practical in the same way as the DCT since Motion-compensated Interframe compression is a blocked operation.

It can be argued that much of the blocking artifact problem encountered with the DCT can be traced to the distortion or complete loss due to quantization of low-frequency image components extending over multiple transform blocks. The suggestion here is that blocking artifacts might be largely avoided if these low-frequency image components were removed prior to performing the DCT and subsequent quantization of its ac transform coefficients. It will later be seen that said removed low-frequency image components can be transported to the decoder as part of the Wavelet Transform. Evidence to support this suggestion is shown with regard to Case 1, a particular, relatively simple example. Subsequently Case 2, a non-global example will be discussed and finally the case of both Case 1 and Case 2 simultaneously present will be discussed.

Assume in Case 1 an image whose brightness increases linearly from the left to the right horizontal edge but does not change in the vertical direction. The brightness changes the same amount in the horizontal direction in each DCT block. It is shown later that a low-pass filter capable of capturing the zero order moment (dc value of a transform block) and the first order moment (the slope of the block) can completely capture all of this change within the span of each block and be discretely represented by a single data sample. This sample will be equal to the dc coefficient of the DCT. When the low-pass filtered image is subtracted from the Case 1 input image the resulting image has all zero-valued elements and hence all ac transform coefficients equal to zero.

Next assume instead that a blocked DCT is performed on the Case 1 input image without first using a low-pass filter and the resulting transform coefficients observed. For each block the dc term is a scaled average value of all image elements of that block. There are also four non-zero horizontal ac. coefficients, C (0,1), C (0,3), C (0,5) and C (0,7) in each and every block. This is in contrast to the low-pass filtered Case 1 image where all transform coefficients have the value of zero.

Proceeding further with Case 1 assume next that an image is quantized such that the four ac coefficients in each block are zero-valued and the block represented only by its dc coefficient value. The resulting reconstructed image exhibits vertical bars, each vertical bar being the width of a transform block. All image elements in a bar have the same brightness equal to the scaled value of the dc transform coefficient of the block. All blocks in a vertical column have the same dc transform coefficient as a result of the assumed input image. The block edge in the horizontal direction (a vertical line) occurs due to the removal of the four horizontal coefficients in each block. Thus a blocking artifact occurs at every block edge in the horizontal direction but none at all in the vertical direction, as there were no non-zero vertical-transform coefficients initially.

In the above example of Case 1 the only image detail in each block is that which occurs globally. This follows from the fact that a low-pass filter of the type described above can remove the variation in the image domain from all of the blocks. The DCT can properly encode and reconstruct this information when light quantization is used but heavier quantization destroys the accurate reconstruction. When this global data is filtered out and carried by the dc sample prior to forming and quantizing the ac coefficients it is immune from high quantization effects.

Transform coefficients in a block can also take on non-zero values due to image element variations that are limited to only that block. Case 2 is an example of non-global activity. Consider a 1D data space of 16 elements wherein a left data block has a half-cosine function over its eight points and the right data block has the same half-cosine function but with the polarity signs inverted from those of the left block. The result is a complete cosine wave over two blocks and no discontinuity exists at the common edge between blocks. In the DCT domain the first ac coefficient in the left block will have a value of +X and the first ac coefficient in the right block will be −X. The opposite sign of these is necessary for the waveform to be continuous at their common edge. Also, if different waveform magnitudes had been chosen for the two adjacent blocks then a discontinuity at the common block-edge would have been already built in and the effect of quantization more difficult to assess. All other coefficients will be zero since the input waveform has exactly the DCT basis function of the first ac coefficient. Any equal amount of quantization performed on these two blocks will result in no discontinuity of the reconstructed waveform since the relative magnitudes of the two coefficients is preserved through the same quantization process. The absence of a block edge discontinuity prevents the appearance of a block-edge artifact.

In the more general case values of transform coefficients are determined by both local and global image activity. The next example is the linear sum of the waveforms of Cases 1 and 2. Since the DCT is a linear transform the resulting transform coefficients are the sum of the coefficients separately produced for Case 1 and Case 2. Assume that the value of the first coefficient for Case 1 is W, the same for both blocks. This occurs because the difference in dc values of the two blocks causes alignment of the global waveform at the common edge of the blocks. Then for the combination case the left block will have a first coefficient value of [W+X] and the right block will have a first coefficient value of [W−X]. In general the effect of the quantization process will now be different in the left block from that in the right block, although not for all values of W and X. Where the quantization effects are different in the two blocks then a discontinuity can occur and a visible artifact may likely appear at the block-edge.

It is apparent that the contribution of Case 1, which has the global waveform, provides a bias in the coefficient domain to the non-global waveform of Case 2. The bias in turn provides the quantization process to operate differently on the waveforms in the two blocks for the Case 2 waveform. The argument next follows that the removal of the global activity that appears in a block prior to the transformation and quantization processes can reduce the appearance of the blocking artifact after reconstruction of the quantized image. This redistribution of the global activity from the ac transform coefficients that are subject to heavy quantization to the lightly quantized dc transform coefficient is the root of the invention.

As will later be shown the low-pass filter proposed for use herein has a span of five eight-by-eight transform blocks. Its use on single images prior to DCT transformation, quantization and reconstruction has produced virtually block-artifact free imagery where the same quantization without prior filtering yields unacceptable block artifacts.

The invention is first described in terms of block diagrams applicable to either one- or two-dimensional cases. Both a WT and a Block Transform (BT) are used. The BT must have one output transform coefficient whose value is equal to a scaled average of all its input data samples. The DST does not have this output coefficient but can be modified to comply as will be shown later. The BT can be any one of many blocked transforms having the property of one-half even and one-half odd vectors in one dimension. A two-dimensional transform can be used if one-quarter of its vectors have an even-even structure, one-quarter have even-odd, one-quarter have odd-even and one-quarter have odd-odd structure. This latter restriction permits most transforms including the WHT, the DCT, the DST and most integer approximations to the DCT and DST to be used. The BT must have an Inverse BT, the IBT, that when given as its input the outputs of the BT, calculates at its output the original data A applied to the BT input. A method of the invention is to use a WT providing the low-pass filtering process and a WHT serving usually as an intermediate BT. It will be shown, importantly that the WT and BT contributions can be most easily and efficiently combined in the WHT domain giving impetus for expressing the BT in the form of the WHT followed by a transformation matrix to obtain the desired BT. A sequence of block diagrams show a first, direct structure and later the derived structure allowing calculation of a single block at a time. The WHT output coefficients are then converted by a sparse matrix transformation called the Transformation Matrix, into coefficients of the target transform or BT. This permits the invention to operate with the DCT or with an integer version of the DCT, as well as several other transforms, as the BT. The sparse matrix permits efficient transform conversion and overall transform efficiency. The WHT itself is performed using only additions and subtractions. The WHT is also an Integer Transform and can be arranged, given integer inputs, to output scaled integer coefficients. The IWHT is also an Integer Transform. The calculations required for processing the low-pass filter can also be performed using only additions and subtractions when an integer WT is used, as it will be in the later description. The specific WT used in this disclosure is exemplary and could be replaced by another WT. However, it is important to cause the core of the selected elemental WT used to be as much like that of the elemental WHT—which has herein been done—to minimize the overall required calculations.

The WT provides the low-pass filter processing as a companion to the blocked transform through three stages of decimation consistent with an eight point or eight-by-eight point blocked transform. This is called Region I. The WT can, however, provide additional stages of decimation afterward by itself. This is called Region II. This can be used in single image applications and in the Intra-frame mode of a moving image compression system. For the Inter-frame mode of a moving image compression system only Region I is used to facilitate processing isolated blocks. In Region II the WT outputs both a final dc scaling coefficient and intermediate ac. coefficients. This provides additional compression efficiency especially in low bit-rate and high definition applications.

After a complete description of the combination of the low-pass filter and the WHT the result can be viewed in the light of a new single transform wherein the output dc coefficients of the encoder have the same values of the WHT and the ac coefficients have the values of the WHT ac coefficients minus values calculated from the surrounding block dc values. Five total dc values are used in the one-dimensional transform and twenty-five in the two-dimensional transform. Some differences occur when the target transform is the DST and these will be described later.

The invention includes methods for the calculation of transform coefficients at and near the data edges to solve the problem of needing data past the end of a data stream to participate in calculations.

A goal of this description is to start with both a blocked transform such as the DCT and a WT and to subsequently derive the integrated operational transform system shown in FIG. 3, which is efficient from a compression standpoint, attenuates block visibility and which can be readily calculated a single block at a time with a minimum of inter-block processing. This system is first developed in terms of block diagrams in FIGS. 1 through 3 in a high level fashion showing the overall nature of the invention. The details of the invention with specific examples are next explained with reference to subsequent figures.

FIG. 1a shows the Transform Pair Encoder of the combined Transformers. New Input Data, 10, is introduced to a Wavelet processing system that includes blocks 20, 30 and 40. The input data is subdivided into strips, each strip having K points in one dimension, or blocks where each block has K-times-K points. The Wavelet Transform operates as a multi-band decimation system wherein input data is converted to ac. coefficients that are outputs of the process at each band and dc. scaled coefficients that are used as the input to the next lower band. In this regard the system is a standard Wavelet multi-resolution system. The WT operates over a total of L bands. The first N bands belong to Region 1, and the remaining (L−N) bands belong to Region II. The number of points in each strip, K, is equal to two to the Nth power. L is equal to or greater than N. When L is made equal to N, Region II is not used. In Region I both the WT and the BT are operative. In Region II only the WT is operative. To perform the WT in Region II additional WT Neighborhood Coefficients, 14, generated by neighboring Region I blocks, are required in the process. After N bands of forward transformation a single scaled transform coefficient, 24, is passed from the WT, 20, for each block to the Inverse Wavelet Transformer (IWT), 30, for reconstruction. The definition of the IWT is linked to the WT by the following requirement. When the IWT receives as inputs a full set of output coefficients of said WT then said IWT exactly reconstructs at its outputs the data inputs to the WT. However, due to the overlapping nature of the WT and IWT the input set required by each is larger than the set produced and a test for exact reconstruction must use multiple elemental wavelets to produce all the inputs required by the IWT. The IWT is selected or designed to produce a sharp cut-off low-pass filter characteristic using the scaled transform coefficients of a local neighborhood of strips or blocks. Also a feature desirable in the data domain from the IWT is the ability to generate constant-slope output data with only the scaled coefficients as inputs. In this case no ac. transform coefficients are required to support this output. Importantly, these ac. transform coefficients, if they were required, are ones that might be quantized to zero by subsequent coefficient quantization. A case is later shown where a single ac. WT coefficient is additionally part of the IWT reconstruction as is part of the system's capability. Any such ac WT coefficient is shown as the Selected WT ac. Coeff. (22). For now only the single dc. coefficient, 24, is assumed passed to IWT, 30. Dc. coefficients from neighboring blocks, 12, are also input to IWT, 30, to participate in the IWT reconstruction as required by the particular IWT used. The IWT output, 32, is a low-passed version of the Data Input, 10, since only Wavelet dc. terms are used in its reconstruction. When an ac. coefficient, (22) is present it too participates in the IWT reconstruction. A subtraction unit, 40, subtracts the low-passed output, 32, from the Data Input on a point-by-point basis to generate a high-pass filter function of Data Input, 10, at output 42. The ac. coefficients, 26, from the WT, 20, (except any used at 22) are discarded for the first N bands. For the calculation of the final (L–N) bands all W.T. ac. coefficients and scaled coefficients, 70, are used as final outputs for the block.

As an aside the high-pass filter in FIG. 1 a formed by WT, 20, IWT, 30, and subtraction unit, 40, could have been formed from a WT, 20, wherein only the ac. coefficients were saved to subsequently apply to the IWT, 30, whose output, 32, is then directly the desired data, 42. In this configuration subtraction unit, 40, is not required. This configuration is identical in performance to FIG. 1a. However, it requires saving over a large number of Wavelet ac transform coefficients, not only in the present block but in the neighborhood blocks as well. The FIG. 1a design also leads directly to the development of the desired configuration of FIG. 3a. that minimizes the amount of data and amount of computation needed to process transform blocks independently.

Still in FIG. 1a, high-pass output, 42, is input to the Blocked Transform (BT), 50, that generates ac. BT coefficients at output, 60. If there is one Selected WT ac. coefficient, 22, used in the design this will be output with the Coefficients, 70, and there will be one less coefficient used from the set of BT ac. Coefficient, 60. The center of the BT coincides with the center of the WT and coincides with the center of the data strip in one dimension and the center of the block in two dimensions. The number of points, K, in the BT is two to the Nth power where N was the number of bands used in the W.T. to generate data at locations 32 and 42. In two dimensions the number of points in the BT is K-times-K. All of the data, 42, being input to the BT, 50, is a high-pass filtered version of Input Data, 10. In the examples shown later N will be three and K will be eight. In this way the dc. term from Region 1 produced by WT, 20, and fed to IWT, 30, and the ac. BT coefficients, 60, form a compact set of output transform coefficients. The number of said transform coefficients in the compact set is equal, on average, to the number of new Input data samples required to generate a strip or block of said coefficients. When the BT is taken as the DST later on there may be one additional coefficient allowed in the compact set although a method is later disclosed resulting in a modified DST with a compact set of transform coefficients. In Region II a number of additional bands of only Wavelet coefficients can be generated if L is greater than N. If L is equal to N then a single Output, 70, is formed equal to the dc. WT value produced by W.T., 20 and input to IWT, 30. The purpose of extending the Wavelet Transform layers beyond N is to provide additional transform compression efficiency, especially in input data regions with little change in long strings of the data.

Figure 1B:
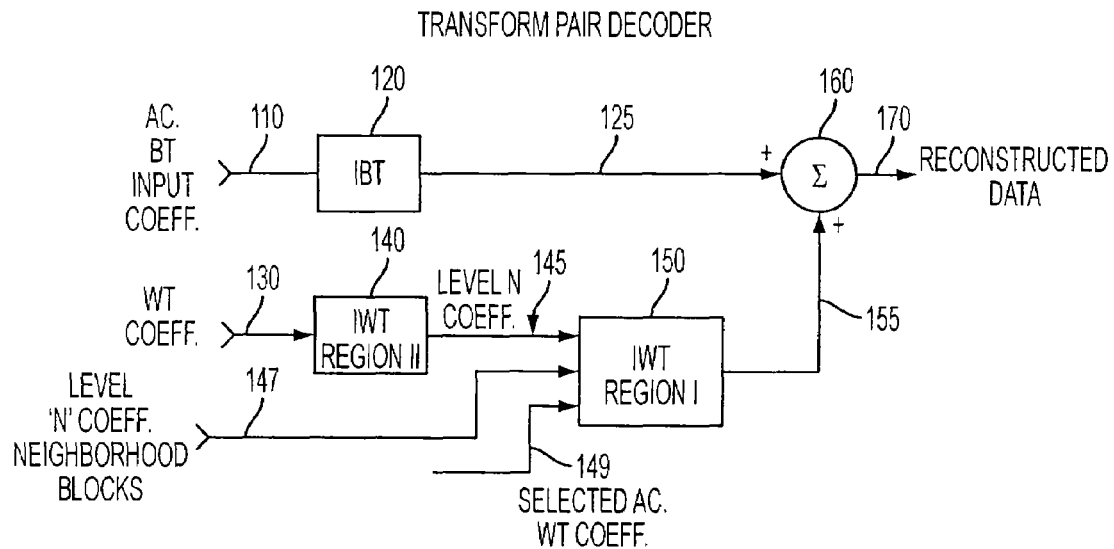

The companion Transform Pair Decoder for the system of FIG. 1a is shown in FIG. 1b. Ac. BT Input Coefficients, 110, are fed to the Inverse Block Transformer, 120, that in turn generates a high-pass version of the reconstructed data, 125. When the IBT receives as inputs a full set of output coefficients of the BT then said IBT exactly reconstructs at its outputs the data inputs to the BT. The companion WT Input Data, 130, enters the Inverse Wavelet Transform (IWT) for Region II, 140. This data includes both new WT coefficients directly associated with the present block plus WT coefficient data associated with neighboring blocks required for the reconstruction. The Output of IWT, 140, is Level N WT scaled coefficient data, 145. Any selected ac. WT coefficient data, 149, if used in the particular design, is input to IWT, 150, as well. Data, 145, data, 149, and Level N data from neighboring blocks, 147, is input to the IWT, Region I, 150. The output of IWT, 150, is the low-pass data, 155, needed to augment the high-pass data, 125. The Adder, 160, combines Data, 125, and Data, 155 to generate the final Reconstruction Data, 170. The Encoder of FIG. 1a and the Decoder of FIG. 1b comprise one complete implementation of the invention. Said implementation can be employed in single image or in Intraframe motion image compression and reconstruction. However, the means must be provided to perform all of the Wavelet processing to have readily available the Level N data, 12, at the Encoder and Level N Data, 145 and 147, at the Decoder before generating or combining with BT data, 125. A two-pass procedure may be helpful in doing this wherein all of the Wavelet Transforms for a large group of blocks are processed in one pass and the Block Transforms are processed in another pass.

Figure 2A:
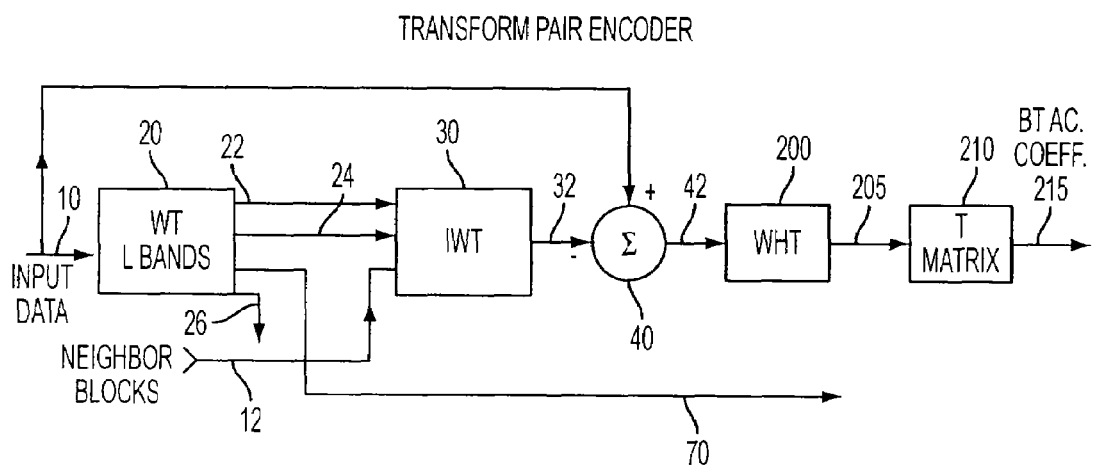
FIGS. 2a, 2b and 2c relate to the encoder and FIG. 2d relates to the decoder.

The method of the Invention to integrate much of this processing of the preceding paragraph and to allow it to be performed as a succession of single blocks is next shown in FIG. 2a through FIG. 2d. The final Encoder block diagram is shown in FIG. 3a and the final Decoder block diagram is shown in FIG. 3b. FIG. 2a shows the Block Diagram of FIG. 1a with the BT, 50, replaced by the combination of a Walsh-Hadamard Transform (WHT), 200, and the transformation matrix, 210, to generate the BT ac. output coefficients, 215. Blocks and Data of FIG. 2a that are the same as in FIG. 1a have the same reference numbers as in FIG. 1a. The transformation matrix, T Matrix, 210, is specific to the particular BT that is being replaced. This technology is described in the book, "Discrete Cosine Transform Algorithms, Advantages, Applications" by Rao and Yip, Academic Press, 1990, pp. 62-63 for one dimension and pp. 104-106 for two dimensions. Details of this are further discussed later in this Description. Thus, FIG. 2a performs the same processing as FIG. 1a.

Figure 2B:
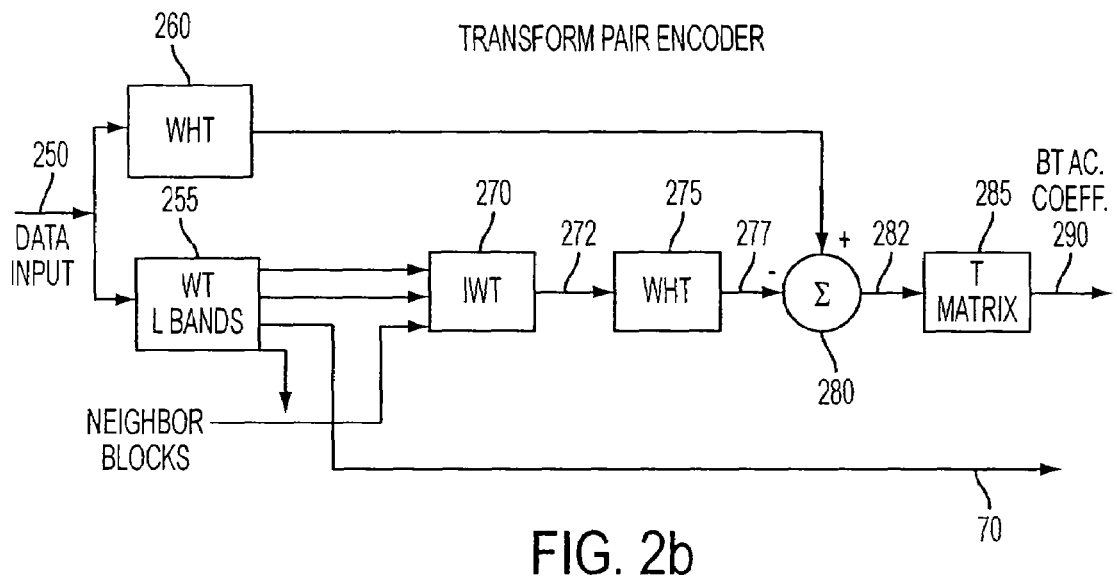
Figure 3A:
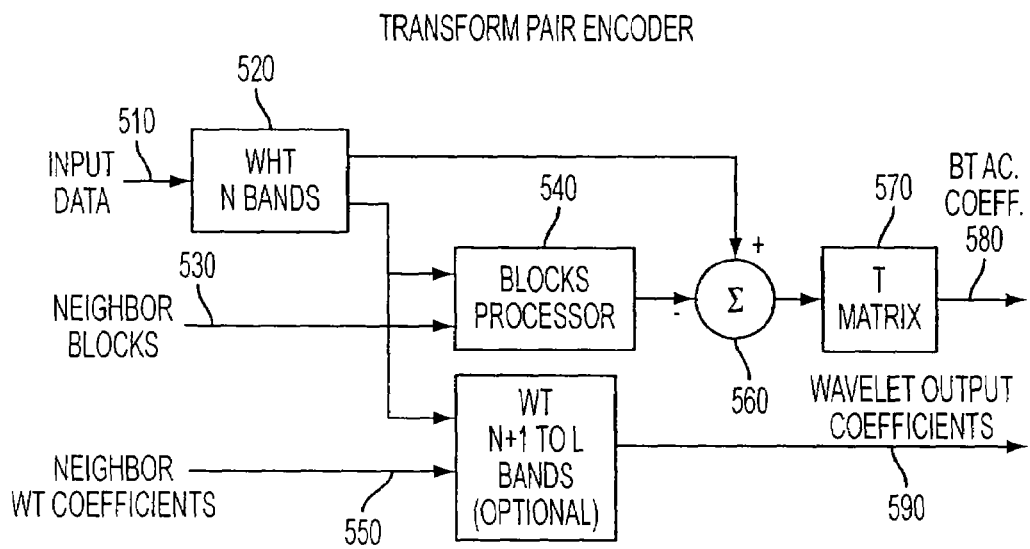
FIG. 3a shows the new encoder configuration with the same end-to-end performance as shown in FIG. 1a. but with all calculations oriented to a single block at a time.
Figure 3B:
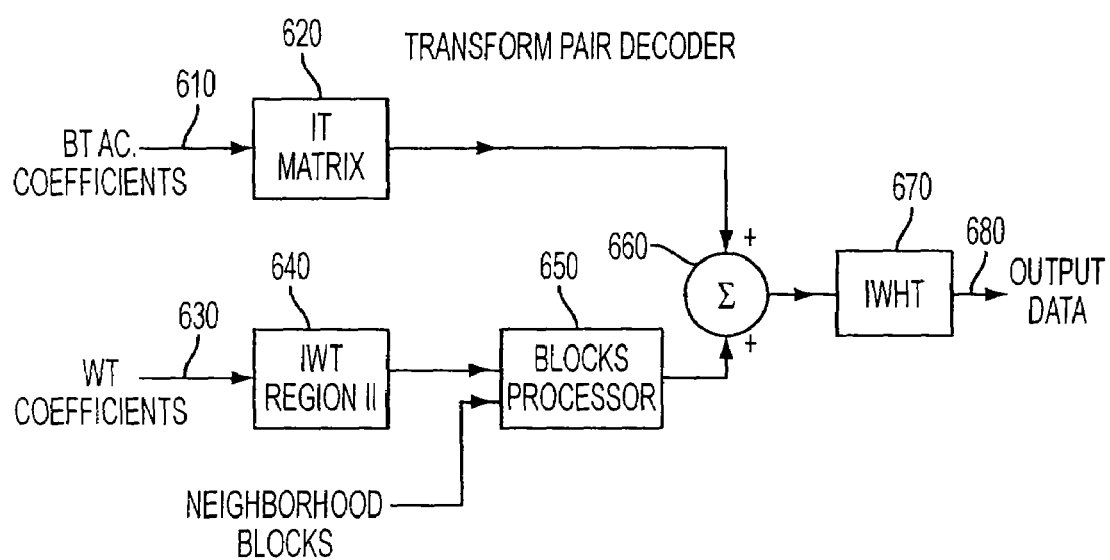
FIG. 3b shows the new decoder configuration with the same end-to-end performance as FIG. 1b but with all calculations oriented to a single block at a time.

FIG. 2b shows the Encoder of FIG. 2a wherein the WHT, 200, in FIG. 2a is moved to the left of the subtraction unit, 280, in FIG. 2b to appear at both its inputs. This juxtaposition produces the same results at output, 290, in FIG. 2b, as 215 in FIG. 2a. The inputs to the subtraction unit, 280, are now WHT coefficients rather than data elements and low-pass data elements in FIG. 2a. The transformation (T) Matrix, 285, receives coefficients, 282, from subtraction unit, 280, to produce the BT ac. coefficients, 290. All processes to the left of subtraction unit, 280, are not affected by the selected T Matrix and the BT. Furthermore, since both the WHT and the specific WT that will later be used in the examples are integer transforms the entire system can have integer characteristics if the BT is an integer transform, which in turn results in an integer T Matrix, 285. Although FIG. 2b has two WHT units (260 and 275) rather than a single WHT unit in FIG. 2a, the WHT, 275, is later removed by combination with IWT, 270.

Figure 2C:
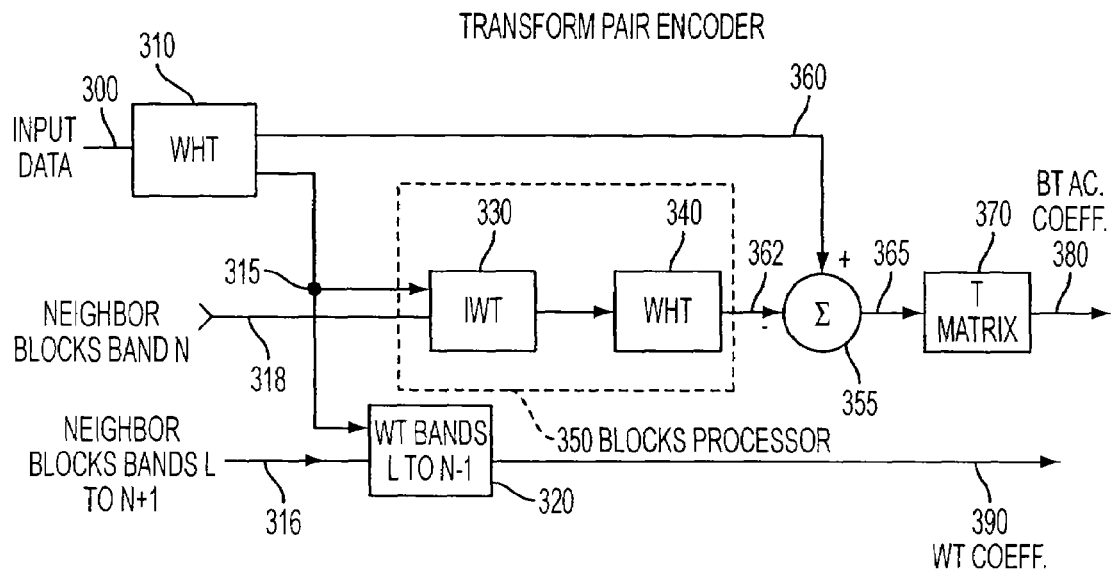

FIG. 2c first shows consolidation of the WHT, 260, and the first N bands of the WT, 255, of FIG. 2b. This is possible by selecting a WT that is an offshoot of the WHT, in particular one that has a +1/−1 butterfly at its core and common to both the WT and the WHT as will be shown later in more detail. This causes the analysis function of the Wavelet Transform of N bands to have the same output value as the dc. term of the WHT. Therefore the WT, 255, of FIG. 2b can be replaced in FIG. 2c by the WHT, 310, for the first N bands and the WT, 320, to process the subsequent bands from band N+1 to band L. Where selected WT ac. coefficients are used in a design the WHT, 310, can be augmented to generate these as well. WT, 320, is a small percentage of the hardware or software compared with WT, 255, of FIG. 2b, and in the case of L=N, WT, 320, is not needed at all. In this last case the WHT, 310, dc. term, 315, is directly output to 390 in FIG. 2c.

The IWT, 330, and WHT, 340, are shown unchanged from their functionality in FIG. 2b as IWT, 270, and WHT, 275, but now have a dashed line around them and labeled as the Blocks Processor, 350. The name stems from all of the inputs being block averages, also called the dc. terms and also equal to the scaled coefficient of the N-band WT. When Selected WT ac. Coefficients are used in a design these are passed by data 315 to the Blocks Processor 350, and through 320 without further processing to WT Coefficients, 390. The Band N dc. terms are part of Data, 315, and used by Blocks Processor, 350, and the WT Bands N+1 to L, 320, to generate the Band N+1 to L output coefficients at 390. The IWT and the WHT can have a lot in common when the IWT is close to the structure of the Inverse WHT (IWHT). This commonality is important in minimizing the complexity of the Blocks Processor. It was earlier noted that the analysis WT scaled coefficient is equal to the WHT dc. term. However, the IWT synthesis function starting with the WT dc. term is a superset of the reconstruction of the WHT as will later be detailed. It is possible to recast the 330-340 pair of FIG. 2b as a single entity by first writing out the equations of IWT, 340, followed by writing the equations for WHT, 340, substituting, simplifying the result and then expressing the result in terms of certain input combinations of the input dc. terms, 315 and 318 in FIG. 2c, and WT ac. terms if used. Furthermore, it is efficient to then express higher-frequency WHT modification coefficients, 362, in terms of lower frequency modification coefficients to further reduce the number of calculations required during a block cycle. This derivation is somewhat lengthy, especially in two dimensions, but needs to be done only once to establish the new calculation formulas. This one-time design process is disclosed in considerable detail for one- and two-dimensional cases later in this description.

Figure 2D:
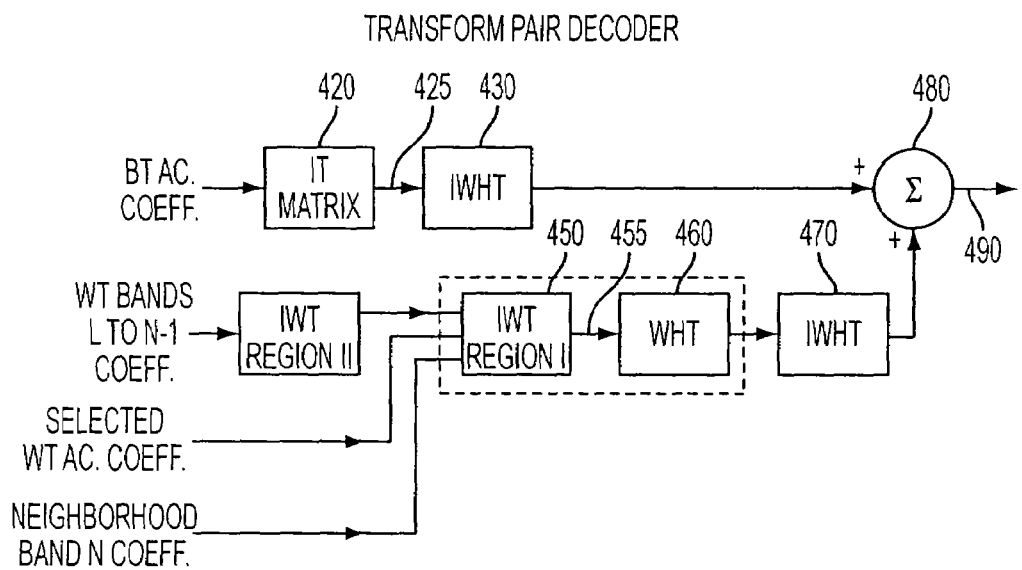

The Decoder of FIG. 1b is first recast in FIG. 2d so as to derive the final decoder configuration in FIG. 3b. First, the IBT, 120, in FIG. 1b is replaced in FIG. 2d by the Inverse T Matrix (IT Matrix), 420, followed by the IWHT, 430, and connected by data path, 425. Second, in between IWT Region 1, 150, and Adder, 160, both in FIG. 1b is added the WHT, 460, followed by the IWHT, 470. The combination of 460 followed by 470 simply passes the data signal, 455, to the adder, 480, unchanged since IWHT, 470, is the inverse of WHT, 460. The Input/Output characteristic of FIG. 2d is identical to that of FIG. 1b but this intermediate arrangement facilitates the final step in development of the new Decoder of FIG. 3b.

The Decoder of FIG. 3b is recast from FIG. 2d in two steps. First, the IWHT, 430, and the IWHT, 470, are transferred to the right side of the Adder, 480, where only the single IWHT, 670, is needed in FIG. 3b. The second operation is to group the IWT Region I, 450, and the WHT, 460, of FIG. 2d together as the Blocks Processor, 650, in FIG. 3b. This Blocks Processor, 650, is identical to the Blocks Processor, 540, in FIG. 3a. Adder, 660, in FIG. 3b now adds together ac. WHT coefficients from IT Matrix, 620, and WHT coefficient modifiers from Blocks Processor, 650.

The structures of the Transform Pair Encoder, FIG. 3a, and Transform Pair Decoder, FIG. 3b, can be viewed such that approximations identically made in both Encoder and Decoder Blocks Processors theoretically result in no error in the operation of Decoder data reconstruction relative to the Encoder Data Input. In fact, if all of the ac. WHT modification coefficients from Blocks Processors, 540 and 650, in FIG. 3a and FIG. 3b are set to zero there is theoretically still no error. Note the dc. component that passes through the Blocks Processors must be maintained. In this case the system of Encoder and Decoder revert to the BT-only Encoder and Decoder. The difference between the theoretical and the actual systems occurs when coefficient quantization is introduced and a substantial difference in performance then occurs between the system of FIG. 3 and a system using only the BT and IBT. This can be seen by a careful examination of the structures of FIG. 3a and FIG. 3b. This discussion suggests, however, that low-level approximations can be made in the Blocks Processors in the interest of reducing the computations required in said Processors providing that the same approximations are made in both the Encoder and Decoder. One class of approximations is to limit the WHT ac. frequency terms developed by the Blocks Processors to the lower frequencies. Another class of approximations is to quantize the coefficients from the Blocks Processors to a predetermined precision that would permit several intermediate terms to not be calculated. This benefit is not available to the configuration of FIG. 1a and FIG. 1b where the data elements, rather than frequency coefficients, are subtracted and added, respectively, in the Encoder and the Decoder.

This completes the Block Diagram descriptions for the two-transform systems. The next section describes in detail a one-dimensional implementation of the systems of the previous description and the first three figures. This includes development of the Blocks Processor formulas for calculation of WHT transform coefficients. Following the one-dimensional case description the two-dimensional case is described with reference to a novel non-separable two-dimensional integer Wavelet Transform. Only the Blocks Processor calculations must be carried out in a non-separable fashion leaving the WHT, IWHT, T Matrix and IT Matrix to be calculated as separable transforms, if desired.

One-Dimensional Transform Pair

An exemplary exact reconstruction Wavelet Transform is next defined which will be used throughout this description of the one-dimensional case. It is not the only one that could be used but is relatively simple and, with certain choices of its parameter, requires no non-trivial multiplications for its calculation. It is therefore an integer transform.

In one dimension let there be a string of input samples $D(-1), D(0), \ldots, D(4)$. Let a low-pass forward scaling analysis filter be defined as, $C(N)=Sf*\{D(N1-1)+D(N1)\}$, where $N1=2*N$.

And let the high-pass forward coefficient analysis filter be defined as, $CC(N)=Sf*\{D(N1-1)-D(N1)\}-p*\{C(N-1)-C(N+1)\}$, where $C(N-1)=Sf*\{D(N1-3)+D(N1-2)\}$, and $C(N+1)=Sf*\{D(N1+1)+D(N1+2)\}$, and p is a parameter.

Figure 4A:
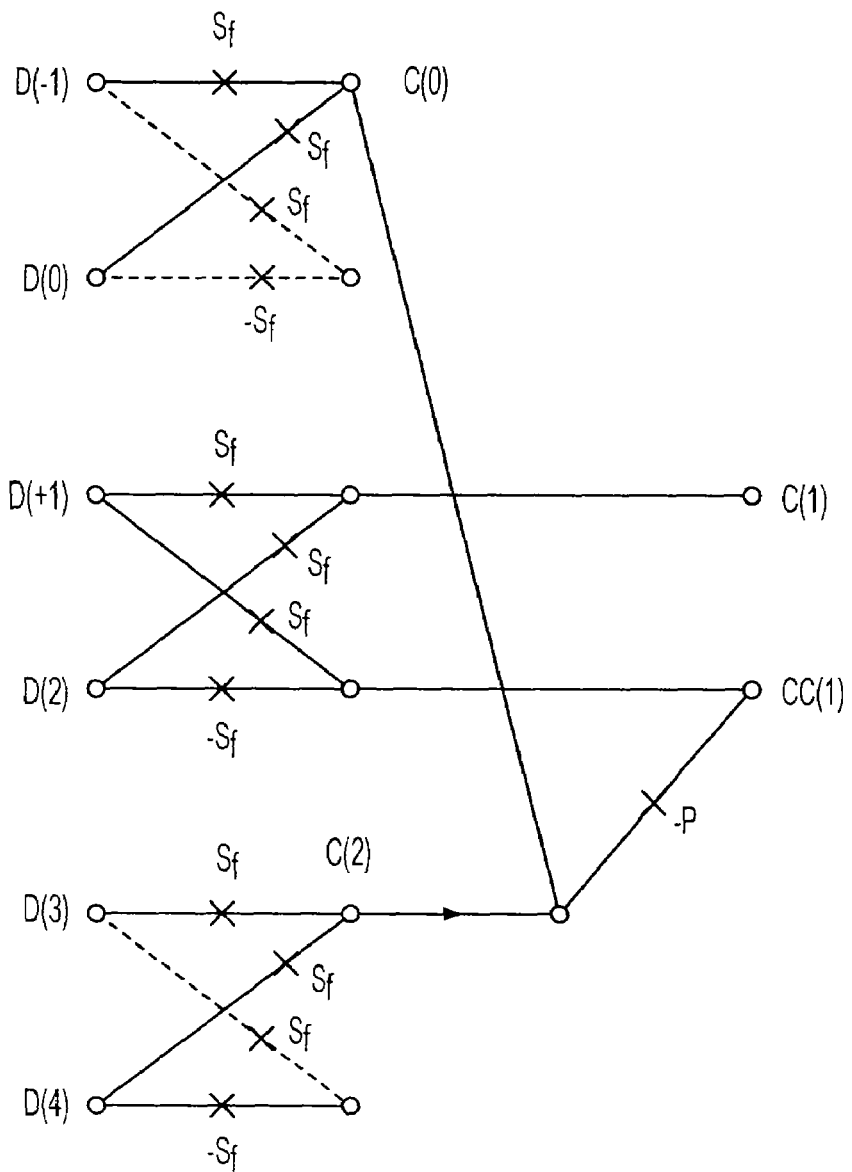
FIG. 4a shows a flow diagram for a single layer of the selected elemental Wavelet Transform in the forward direction.

The last two functions are also other low-pass analysis functions, which are shared with other analysis processing blocks. One coefficient, CC(N), and three scaling coefficients, $C(N-1)$, $C(N)$ and $C(N+1)$ are here defined. Sf is the forward transform scaling constant. The parameter, p, will be selected shortly. The input data stream, D(*), can be extended and a new pair of outputs defined for every two new data samples. The data flow diagram for this forward elemental Wavelet transform with N=1 is shown in FIG. 4a.

CC(N) above can be specified purely in terms of six inputs at the D(*) level as seen by substitution for $C(N-1)$ and $C(N+1)$. The given form above provides some calculation simplicity in both analysis and synthesis operations but with reduction in generality. Notwithstanding it will later be seen that the impulse response of the synthesis scaling function provides a quite desirable low-pass filter frequency response.

The flow diagram notation used in this invention description, such as in FIG. 4 and later figures is now detailed. Signals are taken to flow generally from left to right with or without some vertical tilting component. No vertical-only lines are used. A line without any designation implies a multiplication by one. A line with an arrow on the line implies a minus-one multiplier. An 'x' on the line and an accompanying symbol implies a multiplication by the value of the symbol. In some cases a flow diagram can be read backward where the signals enter on the right and exit on the left. This is used in the cases where the flow diagram of the inverse transform is the left-to-right opposite of the forward diagram.

The left and right edges of a data string lack some of the data elements with which to calculate forward and inverse values. The calculations at these edges require modified processing that will be deferred until the whole one-dimensional system is defined.

Let two complementary synthesis (alternatively, inverse or reconstruction) filters next be defined for reconstructing the data, DR(1) and DR(2), as, $DR(N1-1)=Si*[C(N)+p*\{C(N-1)-C(N+1)\}]+Si*[CC(N)]$, and $DR(N1)=Si*[C(N)-p*\{C(N-1)-C(N+1)\}]-Si*[CC(N)]$.

The first term (in brackets) in each equation is the synthesis scaled part and the second is the synthesis coefficient part. Note that the synthesis is defined differently from the analysis in that the term, $p*\{C(N-1)-C(N+1)\}$, is part of the scaling function in the synthesis but part of the coefficient function in the analysis. These equations are shown in the flow diagram of FIG. 4b where Si is the inverse scaling constant.

The exact reconstruction is next shown by substitution for C(N) and CC(N) from the forward transform, as $DR(N1-1)=Si*[Sf*\{D(N1-1)+D(N1)\}$ $+(Sf*\{D(N1-1)-D(N1)\}-p*\{C(N-1)-C(N+1)\})+$
$p*\{C(N-1)-C(N+1)\}]$, or, $DR(N1-1)=Si*(2*Sf*D(N1-1))$, and $DR(N1)=Si*[Sf*\{D(N1-1)-D(N1)\}$ $-(Sf*\{D(N1-1)-D(N1)\}-p*\{C(N-1)-C(N+1)\})+$
$p*\{C(N-1)-C(N+1)\}]$, or, $DR(N1)=Si*(2*Sf*D(N1))$.

If the substitution $Si*Sf=\frac{1}{2}$ is made, $DR(N1-1)=D(N1-1)$, and $DR(N1)=D(N1)$.

Thus exact reconstruction occurs. For symmetrical forward and inverse processes of a single layer where Si=Sf then each constant is the reciprocal of the square root of two. To avoid non-rational scaling constants non-equal values of Si and Sf can be used such as ½ and 1. For an N-layer system the overall scaling constant is the product of the scaling constants for each individual elementary layer. This issue arises again when the wavelet and blocked transforms are considered together.

Next, the parameter, p, can be selected to produce zero value coefficients for portions of the input data having a constant slope. The appearance of reconstructed image data will be unaffected by heavy quantization of coefficients in said areas since said coefficients will have a value of zero. To find a value for 'P' to provide this result presume an input data set with a constant slope, $D(\mathbf{1})=1+k$, $D(\mathbf{2})=2+k$, etc. where k is an arbitrary constant. Then, $C(0)=Sf*(-1+k+0+k)=Sf*(-1+2*k)$, $C(1)=Sf*(1+k+2+k)=Sf*(3+2*k)$, $C(2)=Sf*(3+k+4+k)=Sf*(7+2*k)$, and $CC(1)=Sf*(1+k-2-k)-p*Sf*(-1+2*k-7-2*k)$ For CC(1) to be zero valued,
$0=Sf*(-1-p*\{-8\})$, or $p=\frac{1}{8}$, independent of the value of Sf.

Using this value for p the reconstructed values are, $DR(1) = Si*[Sf*\{3+2*k\} + 1/8*Sf*\{-1+2*k-7-2*k\}] + 0$ $= Si*Sf*[3+2*k-1]$ $= 1/2*[2+2*k]$ $= 1+k$ $DR(2) = Si*[Sf*\{3+2*k\} - 1/8*Sf*\{-1+2*k-7-2*k\}] + 0$ $= Si*Sf*[3+2*k+1]$ $= 1/2*[4+2*k]$ $= 2+k,$ which are equal to the constant slope input data used for D(2) and D(3). D(0) through D(5) were part of the constant slope input data as well. P will take the value of (⅛) in subsequent equations in this format.

The three-layer Wavelet transform in one dimension is next described showing the equations for its calculation. Level D contains the input data. The three layers are from level D to level C, from C to B and from B to A as shown first in FIG. 5. An index system is now used for the elements in the four levels that allow similar equations to be used for all levels, avoid negative indices to accommodate computer program usage and to provide the desired registration between levels, or bands. In particular the A level must have a scaling coefficient which is the average value of the eight input data elements centered above it in level D. This satisfies the criteria of having the same value as a blocked transform starting with the same eight elements of level D. FIG. 6a shows the flow of data from the calculations. The outputs of the first layer scaled coefficients C(9), C(10), C(11) and C(12) and coefficients CC(9), CC(10), CC(11) and CC(12). These latter are calculated in two pieces as shown in FIG. 4a and the equations below. The formation of the first piece, the difference between two data elements at the D level, is shown in the flow graph, e.g. D(2*N-1)-D(2*N). The second piece, -P*[C(N-1)-C(N+1)] is not shown in FIG. 6a but indicated only by a stub at the CC(N) node. This notation provides two features. First, the flow diagram is usable in both the forward and inverse directions. Secondly it provides a basis for a common structure with the WHT, which shown in FIG. 6b. and described later.

The forward equations in the BASIC language with sf=1/2 are,
Level 'D to level C
FOR N=1 TO 20:N1=2*N $$C(N)=0.5*(D(N1-1)+D(N1))$$

NEXT N
FOR N=9 TO 12:N1=2*N $$CC(N)=0.5*(D(N1-1)-D(N1))-P*(C(N-1)-C(N+1))$$

NEXT N
The division of calculation of C(N) and CC(N) shows that a smaller number of coefficients will be used in the reconstruction calculations than scaled coefficients. The scaled coefficients, which are used multiple times, are in practice calculated once and saved over for reuse. Proceeding with the next level,
'Level C to level B
FOR N=1 TO 10:N1=2*N $$B(N)=0.5*(C(N1-1)+C(N1))$$

NEXT N
FOR N=4 TO 7:N1=2*N $$BC(N)=0.5*(C(N1-1)-C(N1))-P*(B(N-1)-B-B(N+1))$$

NEXT N
For the final layer,
'Level B to level A
FOR N=1 TO 5:N1=2*N $$A(N)=0.5*(B(N1-1)+B(N1))$$

NEXT N
FOR N=2 TO 4:N1=2*N $$AC(N)=0.5*(B(N1-1)-B(N1))-P*(A(N-1)-A(N+1))$$

NEXT N
The limits on N and N1 above are determined by the reconstruction equations, which follow next. The equations are presented in this format to show a complete forward and reconstruction set although a major part of the invention is to describe a more integrated method for the calculations in the aforementioned Blocks Processor. First let si=1 and AR(N)=A(N) in general and then,
'A to B Level
FOR N=2 TO 4:N1=2*N $$BR(N1-1)=AR(N)+P*(AR(N-1)-AR(N+1))+AC(N)$$

$$BR(N1)=AR(N)-P*(AR(N-1)-AR(N+1))-AC(N)$$

NEXT N
'B to C Level
FOR N=4 TO 7:N1=2*N $$CR(N1-1)=BR(N)+P*(BR(N-1)-BR(N+1))+BC(N)$$

$$CR(N1)=BR(N)-P*(BR(N-1)-BR(N+1))-BC(N)$$

NEXT N
'C to D level
FOR N=9 TO 12:N1=2*N $$DR(N1-1)=CR(N)+P*(CR(N-1)-CR(N+1))+CC(N)$$

$$DR(N1)=CR(N)-P*(CR(N-1)-CR(N+1))-CC(N)$$

NEXT N
This defines a three-level Wavelet transform although it can be seen that a calculation of two or more adjacent blocks in this fashion repeats some of the same calculations due to overlapping functions. To be more efficient a calculation scheme can be devised to save-over some of the results of one calculation that are needed for a subsequent calculation. However, to operate on isolated blocks there will not generally be an overlap in calculations so a more efficient single block method will be described.

Figure 5:
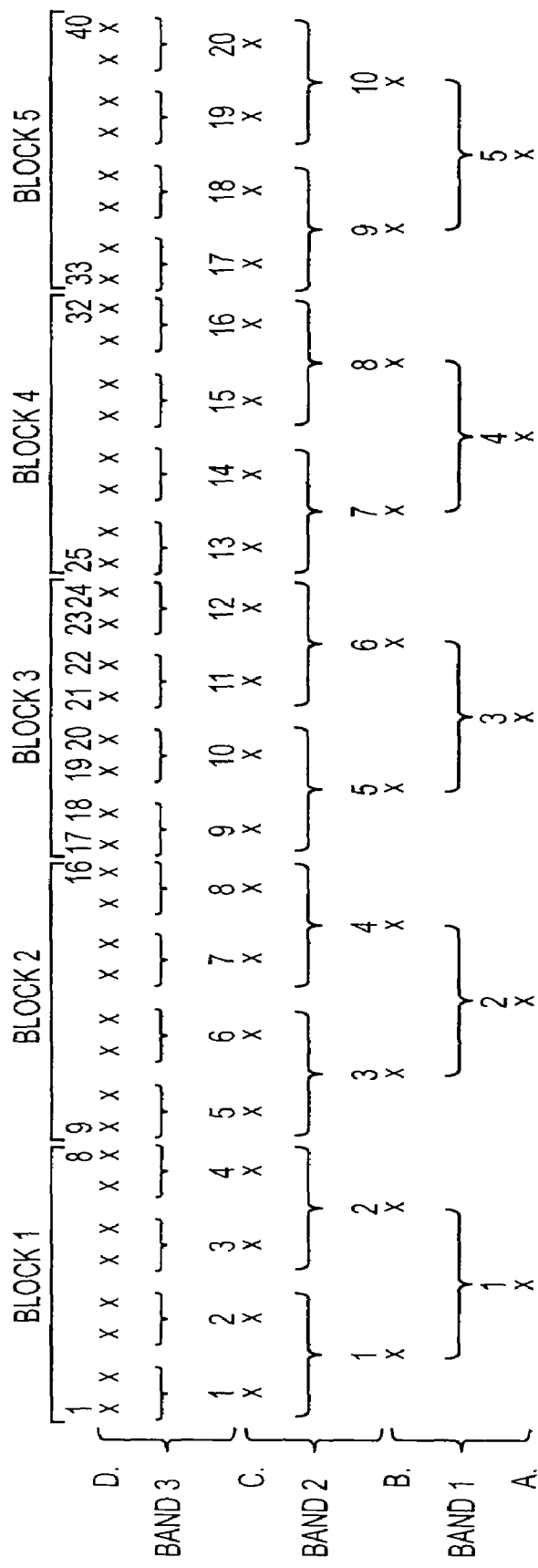
FIG. 5 shows the alignment of three layers of the Wavelet Transform over five consecutive blocks of eight elements each. Input data in one dimension is shown along the top of FIG. 5. Scaled dc. coefficients one through five are shown at the bottom.
Figure 6A:
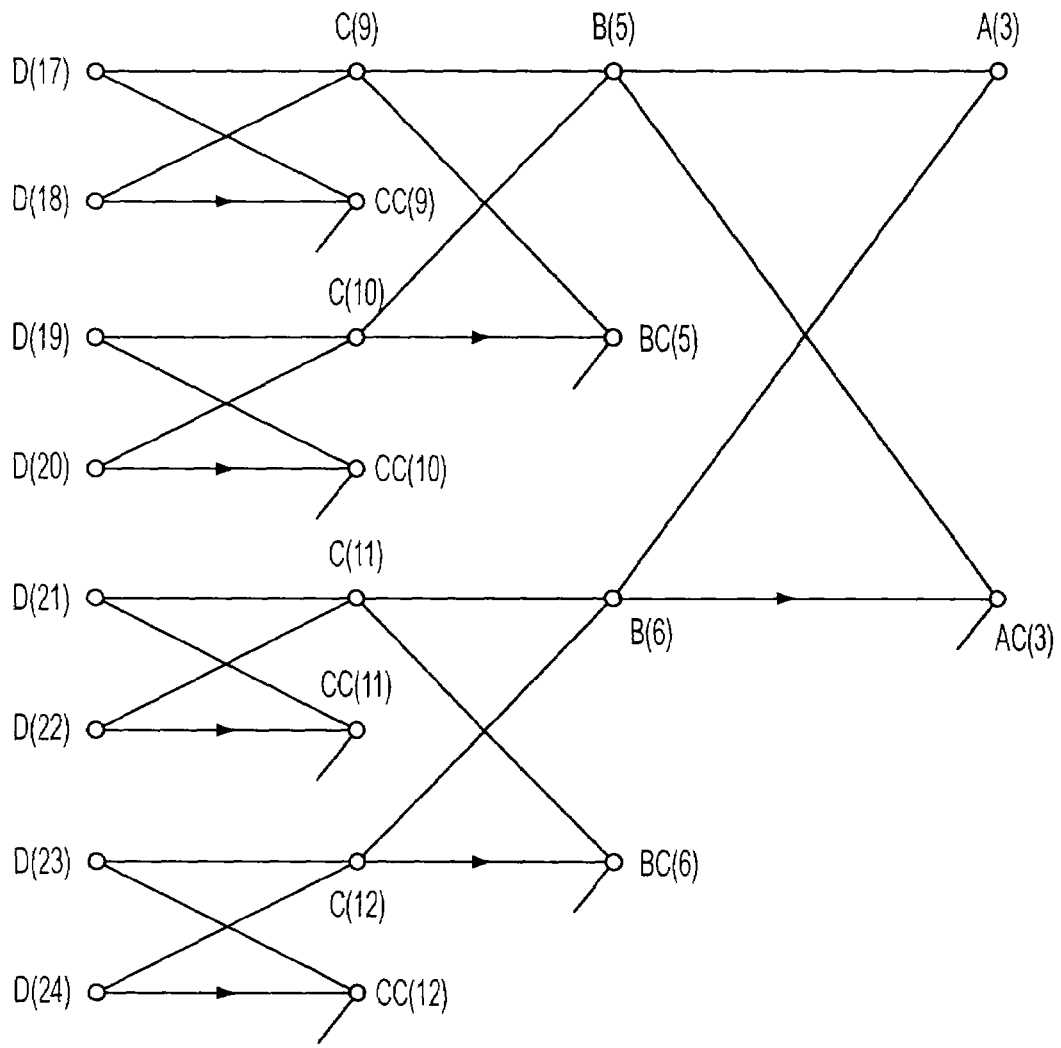
FIG. 6a is a signal flow diagram for a single three layer Wavelet Transformer (WT) showing the individual elementary coefficient input/output nodes and the single scaled output A(3).

FIG. 5 shows input data for five blocks of eight elements each. These blocks include, respectively, elements one through eight, nine through 16, 17 through 24, 25 through 32 and 33 through 40. The center block, number three, from elements 17 through 24 is reconstructed by the above equations. Five blocks need to be processed in part in the forward direction to gather sufficient scaled and coefficient values to perform the inverse transform for reconstruction of data elements 17 through 24. Moreover, in a complete Wavelet reconstruction, coefficients with indices two, three and four are required from the first layer. From the second layer scaled values, as produced by the processing of the first layer, with indices three through eight and coefficients with indices four through seven are required. From the third layer scaled values as produced by the processing of the second layer, with indices eight through 13 and coefficients nine through 12 are required. Note that scaled values with indices seven and 14 are produced by the second layer but are not used in the third layer processing.

FIG. 6a focuses on the block operating on data elements 17 through 24 from FIG. 5 and shows a flow diagram for the forward wavelet transform of three layers. Scaling by values of Sf and Si are not shown. For the inverse transform FIG. 6a. is applicable wherein the nodes are labeled AR(*), BR(*) and CR(*) and the coefficient entry points are again labeled AC(*), BC(*) and CC(*). However, said points are defined, for example, as, $$CC(10)+P*\{C(9)-C(11)\},$$

where the stub at the node indicates the addition of the second of the two terms above.

Figure 6B:
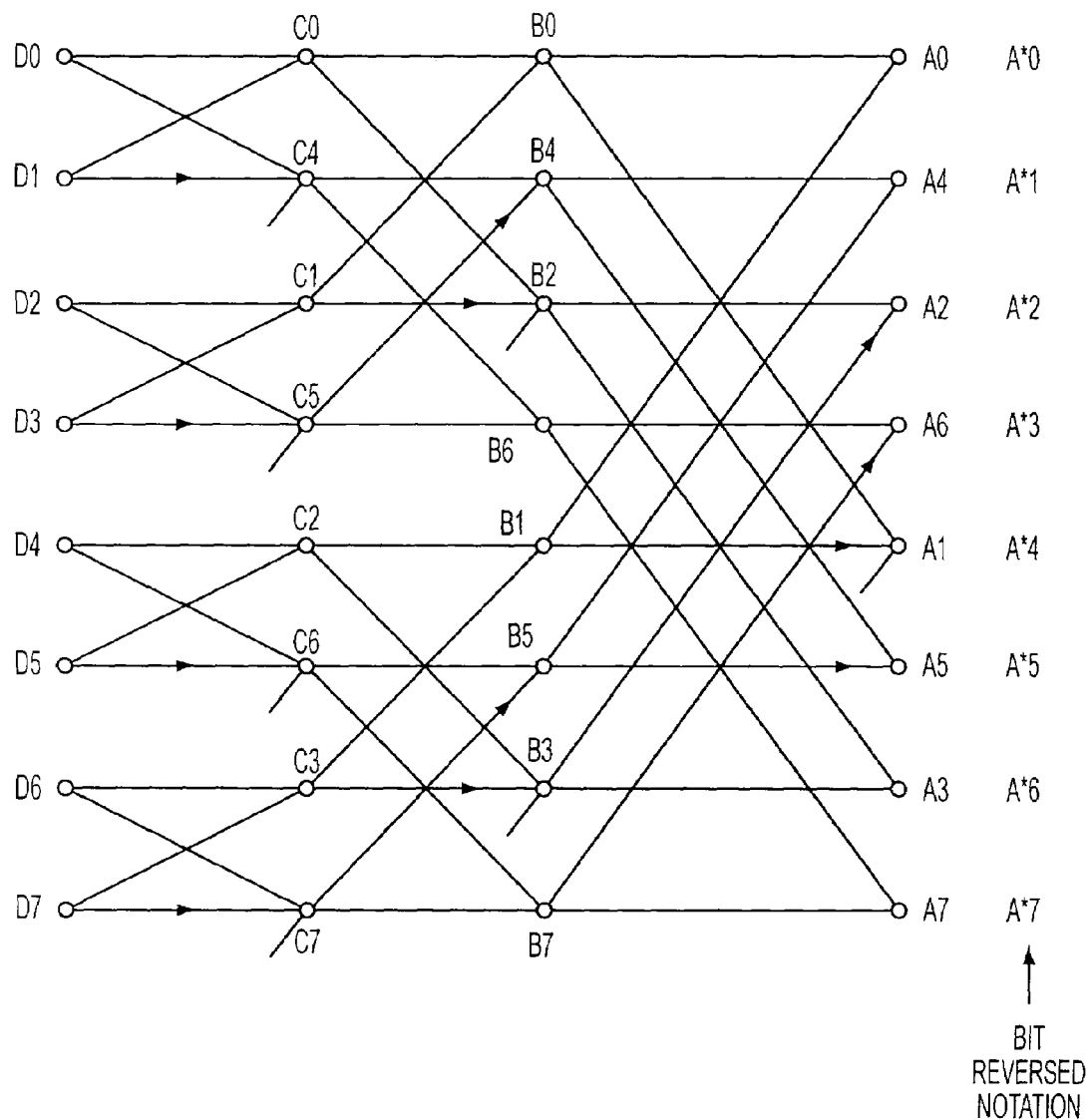
FIG. 6b shows the flow diagram for the Walsh-Hadamard (WHT). When

FIG. 6b is a signal flow diagram for the one-dimensional eight-point Walsh-Hadamard Transform (WHT). Other flow diagrams for the WHT are viable but this one has considerable commonality with the WT of FIG. 6a. In the forward direction the data inputs are D0 through D7 and the frequency domain outputs A0 through A7. Also shown are bit-reversed outputs, A*0 through A*7, which will be useful later on. The transform is performed in three columns from left to right. The first column outputs are C0 through C7 and the second column outputs are B0 through B7. The inverse WHT (IWHT) can be calculated from right to left using the same diagram. A comparison of FIG. 6a and FIG. 6b shows that this WT is a subset of the WHT. That is, all of the paths of this WT are included in the WHT except for the aforementioned stubs. Specifically the correspondence of signal nodes in FIGS. 6a and 6b are,

| FIG. 6a | FIG. 6b | FIG. 6a | FIG. 6b |
|---------|---------|---------|---------|
| C(9)    | C0      | B(5)    | B0      |
| C(10)   | C1      | B(6)    | B1      |
| C(11)   | C2      | BC(5)   | B2      |
| C(12)   | C3      | BC(6)   | B3      |
| CC(9)   | C4      |         |         |
| CC(10)  | C5      | A(3)    | A0      |
| CC(11)  | C6      | AC(3)   | A1      |
| CC(12)  | C7      |         |         |

With these correspondences the WHT signal flow graph can be used for either the WHT or in part for this WT and for both inverse transforms.

Figure 4B:
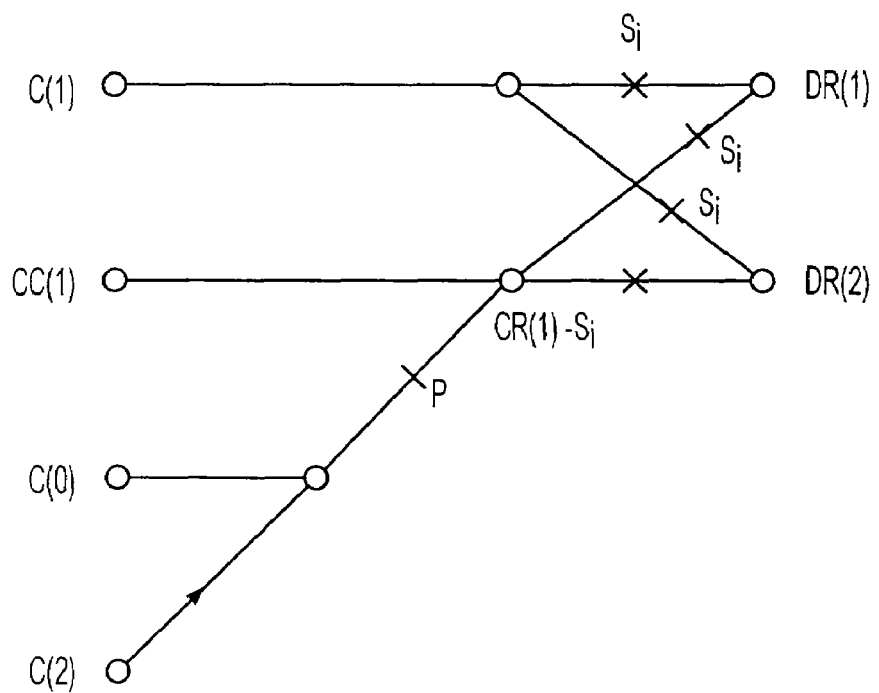
FIG. 4b shows the diagram for a single layer of the selected elemental Wavelet Transform in the inverse direction.

The elemental IWT in FIG. 4b is used for the IWT N-layer synthesis low-pass filter. Herein the ac. coefficients are set to zero leaving only the scaled coefficients to enter as data. Although the coefficients here and in FIG. 6a proceeding from left to right are zero-valued the stub portion at the same nodes where coefficients are entered must be entered using the rest of the terms. These are the terms, $[P*\{X(N-1)-X(N+1)\}]$ where X will be either A, B or C depending on the layer being calculated. Some examples showing the result of reconstruction using only the scaled coefficients are next shown to illustrate the characteristics of this filtering.

Example 1 in FIG. 7a shows the center five blocks of a nine-block sequence. Only the center block containing data elements 33 through 40 has non-zero value data. Elements D3 and D4 of this block are each given a value of 400 and the remaining elements given a value of zero. The forward transform is taken, the non-scaled coefficients zeroed as explained above and a three-layer reconstruction performed to reconstruct the center five blocks. The resulting values in sequence over the five blocks are,

| 0      | 0      | −0.2   | 0.2    | 1.76   | 1.37   | 0.39   | −3.52  |
|--------|--------|--------|--------|--------|--------|--------|--------|
| −12.89 | −15.23 | −12.50 | −9.38  | −6.25  | 3.13   | 15.23  | 37.89  |
| 78.52  | 99.61  | 108.20 | 113.67 | 113.67 | 108.20 | 99.61  | 78.52  |
| 37.89  | 15.23  | 3.13   | −6.25  | −9.38  | −12.50 | −15.23 | −12.89 |
| −3.52  | 0.39   | 1.37   | 1.76   | 0.2    | −0.2   | 0      | 0.     |

Note that the sum of the data elements in each of the first, second, fourth and fifth blocks is zero whereas the sum of the data elements in the third block is 800. Reconstructed 'D' elements are shown in FIG. 7b for Example 1. This response is quite similar to the familiar sin(x)/x function although it is damped such as to go to zero in the end blocks in FIG. 7b. The frequency response associated with a sin(x)/x function in the data domain is that of a sharp low-pass filter function. This characteristic is highly desired in this application to place a large percentage of the low frequency energy in the scaled term and leave the remaining ac energy within the ac coefficient terms.

A second response wherein the parameter 'p' is set to zero is also shown in 7b in dashed lines for Example 1. This response is typical of a blocked transform. In particular it applies to the WHT whose flow diagram is shown in FIG. 6b. The case where 'P' is set to zero reverts to use of only the blocked transform.

In Example 2 shown in FIG. 7c the input data is given for the constant-slope case by the equation D(X)=x over seven blocks (shown only over the five center blocks). Again ac coefficient data is discarded and reconstruction from only the WT scaling functions performed. The reconstructed values of 'X' elements for 'p'=⅛ is shown in FIG. 7d. The reconstructed values for the same input set of D's wherein 'p'=0 is also shown in dashed lines in FIG. 7d. The constant slope is exactly reproduced for p=⅛ whereas the case for p=0 yields a set of discontinuous steps, the same as for the blocked transform alone.

The Walsh-Hadamard Transform (WHT) whose eight-point bit-reversed matrix, adapted from "Transform Coding of Images" by R.J. Clarke, pg. 102, is shown in Table 1 and can be cast in a FAST calculation matrix without multiplications except for scaling multipliers. The scaling multiplier for each output of an eight-point WHT is the reciprocal of the square root of eight. The matrix, minus scaling constants, is shown in FIG. 6b and consists of only two values, +1 and −1. The transform coefficient outputs of the WHT are A0 through A7 and are seen to not be in ascending numerical order. However, these same outputs expressed in bit-reversed order, A*0 through A*7 are in numerical order. The close similarity between the WT and WHT will permit some common processing for both the forward and reconstruction computations.

TABLE 1

| WH(8) = 1/SQR(8)* | 1 | 1  | 1  | 1  | 1  | 1  | 1  | 1  | (0) |
|-------------------|---|----|----|----|----|----|----|----|-----|
|                   | 1 | −1 | −1 | 1  | 1  | −1 | −1 | 1  | (4) |
|                   | 1 | 1  | −1 | −1 | −1 | −1 | 1  | 1  | (2) |
|                   | 1 | −1 | 1  | −1 | −1 | 1  | −1 | 1  | (6) |
|                   | 1 | 1  | 1  | 1  | −1 | −1 | −1 | −1 | (1) |
|                   | 1 | −1 | −1 | 1  | −1 | 1  | 1  | −1 | (5) |
|                   | 1 | 1  | −1 | −1 | 1  | 1  | −1 | −1 | (3) |
|                   | 1 | −1 | 1  | −1 | 1  | −1 | 1  | −1 | (7) |

One efficient way of calculating the DCT is by first calculating the WHT and multiplying the result by a fixed transformation matrix. Rao and Yip report this work in the reference, "Discrete Cosine Transform Algorithms, Advantages, Applications", pp. 62-63. All of the multiplications required to obtain the DCT from the WHT are in the sparse matrix shown in Table 2. The inputs and outputs of the transformation matrix are in bit-reversed order.

Figure 8:
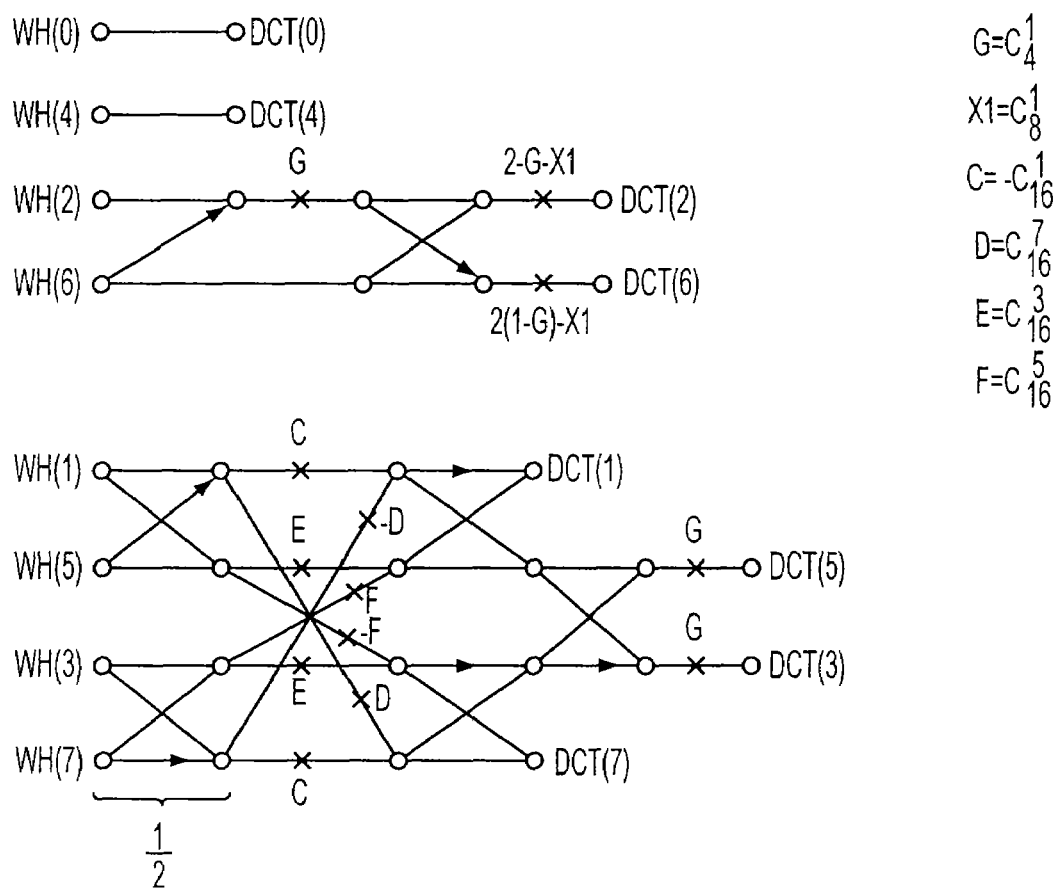
FIG. 8 shows the FAST signal flow diagram of the WHT-to-DCT converter—T Matrix in one dimension that converts an eight-point WHT to an eight-point DCT.

The majority of multiplications occur in the lower right quadrant to develop the odd-index DCT coefficients from the odd-index WHT coefficients. The matrix can be factored to produce the flow diagram in FIG. 8 to more compactly calculate the outputs and reduce the number of non-trivial multiplications. These multipliers are C, D, E, F, G and X1 and equal to, respectively, $-\cos(\pi/16)$, $\cos(7\pi/16)$, $\cos(3\pi/16)$, $\cos(5\pi/16)$, $\cos(\pi/4)$ and $\cos(\pi/8)$. The four first-column additions in odd DCT output section of FIG. 8 are each multiplied by a factor of one-half.

TABLE 2

| | | | | | | | | | |
|---|---|---|---|---|---|---|---|---|---|
| DCT(0) | 1 | 0 | 0 | 0 | 0 | 0 | 0 | 0 | WH(0) |
| DCT(4) | 0 | 1 | 0 | 0 | 0 | 0 | 0 | 0 | WH(4) |
| DCT(2) | 0 | 0 | X1 | X2 | 0 | 0 | 0 | 0 | WH(2) |
| DCT(6) | 0 | 0 | -X2 | X1 | 0 | 0 | 0 | 0 | WH(6) |
| DCT(1) | 0 | 0 | 0 | 0 | X3 | X4 | X5 | X6 | WH(1) |
| DCT(5) | 0 | 0 | 0 | 0 | X7 | X8 | X9 | X10 | WH(5) |
| DCT(3) | 0 | 0 | 0 | 0 | -X10 | -X9 | X8 | X7 | WH(3) |
| DCT(7) | 0 | 0 | 0 | 0 | -X6 | -X5 | X4 | X3 | WH(7) |

Letting $A1=\cos(\pi/16)$, $A2=\cos(3*\pi/16)$, $A3=(5*\pi/16)$ and $A4=\cos(7*\pi/16)$ and $Q=\frac{1}{2}*\cos(\pi/4)$,

| | |
|---|---|
| X1 = COS (π/8) = | .923880 |
| X2 = COS (3 * π/8) = | .382683 |
| X3 = Q * (A1 + A2 + A3 + A4) = | .906127 |
| X4 = Q * (A1 − A2 − A3 + A4) = | −.0746578 |
| X5 = Q * (A1 + A2 − A3 − A4) = | .375330 |
| X6 = Q * (A1 − A2 + A3 − A4) = | .180240 |
| X7 = Q * (−A1 + A2 + A3 + A4) = | .212608 |
| X8 = Q * (A1 + A2 + A3 − A4) = | .768178 |
| X9 = Q * (−A1 − A2 + A3 − A4) = | .513280 |
| X10 = Q * (A1 − A2 + A3 + A4) = | .318190 |

Multiplications occurring at the outputs in FIG. 8 may in practice be actually performed in the subsequent coefficient quantizer so it is useful in minimizing transform multiplications to move as many as possible to the output locations. Furthermore some of the multiplications in the odd output calculations may also be moved to the outputs of FIG. 8. For example, dividing all multipliers in column 2 of the odd term converter by 'C' and multiplying all outputs by 'C' reduces the count of non-trivial multipliers in that column by two. Scaling multiplications from the WHT are identical and therefore can be passed through the WHT-to-DCT converter to the outputs, further lowering the multiplier count. This particular technique is prior art. It can be seen from the WHT-to-DCT conversion that the DC term is unchanged in the process inferring that the conclusions concerning reconstruction responses in FIG. 7 are also true of the DCT.

Earlier FIG. 6b was shown to represent the Walsh-Hadamard blocked transform (WHT) and to be a superset of the Wavelet transform as well. It also represents both a forward and a reconstruction of both the WHT and the WT. The flow chart can be used to combine terms and to represent data usefully at points inside the transform as well as at one end or the other. The next section will represent three different but related condensations of the IWT, the WHT and the subtraction unit shown in FIGS. 1 through 3. Each of the three condensations can be used to implement the transform pair although the third implementation is generally considered the preferred embodiment and reflects the portrayal in FIG. 3.

The first condensation is most closely related to FIG. 2a but implements IWT, 30, subtraction unit, 40, and WHT, 200 all together. Since the N-layer Synthesis Filter presumes all the non-scaling coefficients are set to zero then only scaled coefficients at layers A, B and C are required.

The input data is first inserted to the WHT at the D(n) level. The stored Wavelet data consisting of $[p*\{X(n)-X(n+2)\}]$ terms are inverted, since subtraction is needed at the encoder, and inserted at the appropriate Wavelet coefficient nodes (stubs in FIG. 6b) in the same flow chart performing the WHT.

One can visualize this as causing the desired inverted reconstructed low-pass data to occur at the data inputs and then being transformed back through the matrix in the forward direction synchronously with the data inserted directly at the data inputs. The fact that the wavelet data is inserted during the forward process and not actually reconstructed first works satisfactorily since the data due to the low-pass reconstruction is the same at those nodes whether the transform is a forward or an inverse one. Of course the timing must be planned in a clocked system such that the wavelet data and input data are synchronized to be correct at the C, B and A layers.

The terms CR(8) ..., CR(13) have been saved from the N-layer Low Pass Analysis Filter IWT, 30, in FIG. 2a. as well as from neighboring blocks. Also saved are BR(3), ... BR(6) and AR(1), ... AR(5). The operation will perform entry of the Wavelet data needed to affect the low pass filter synthesis at the following nodes in FIG. 6b in concert with the entry of unfiltered input data entering the WHT.

$$C0=0.5*(D0+D1){:}C4=0.5*(D0-D1)-P*\{CR(8)-CR(10)\}$$

$$C1=0.5*(D2+D3){:}C5=0.5*(D2-D3)-P*\{CR(9)-CR(11)\}$$

$$C2=0.5*(D4+D5){:}C6=0.5*(D4-D5)-P*\{CR(10)-CR(12)\}$$

$$C3=0.5*(D6+D7){:}C7=0.5*(D6-D7)-P*\{CR(11)-CR(13)\}$$

$$B0=0.5*(C0+C1){:}B2=0.5*(C0-C1)-P*\{BR(4)-BR(6)\}$$

$$B6=0.5*(C4+C5){:}B4=0.5*(C4-C5)$$

$$B1=0.5*(C2+C3){:}B3=0.5*(C2-C3)-P*\{BR(5)-BR(7)\}$$

$$B7=0.5*(C6+C7){:}B5=0.5*(C6-C7)$$

$$A0=0.5*(B0+B1){:}A1=0.5*(B0-B1)-P*\{AR(2)-AR(4)\}$$

$$A3=0.5*(B2+B3){:}A2=0.5*(B2-B3)$$

$$A7=0.5*(B6+B7){:}A6=0.5*(B6-B7)$$

$$A4=0.5*(B4+B5){:}A5=0.5*(B4-B5)$$

A0 through A7 are desired WHT outputs adjusted for the subtraction of the low-pass filtered data from the input data.

Although this first condensation provides the desired combination of three processing blocks in FIG. 2a considerable intermediate data is required to be saved over and the subtraction process is still performed in the data domain rather than the more desired transform coefficient domain. The second condensation is an extension of the first condensation and removes the necessity of saving over the CR(X) and BR(Y) data from the Low Pass Filter Analysis of FIG. 2b.

It is first noted that in the Low Pass Filter Synthesis of FIG. 6a that the reconstructed values for B(5) and B(6), called here BR(5) and BR(6) to distinguish them from forward transform quantities, can be obtained from equations involving only AR(Z) values. Similarly, CR(X) values can be found from equations involving BR(Y). Using some intermediate calculations these can be summarized as, $$X1=AR(2)-AR(4)$$

$$X2=AR(1)-AR(3)$$

$X3=AR(3)-AR(5)$, and, $BR(3)=AR(2)+P*X2$ $BR(4)=AR(2)-P*X2$ $BR(5)=AR(3)+P*X1$ $BR(6)=AR(3)-P*X1$ $BR(7)=AR(4)+P*X3$ $BR(8)=AR(4)-P*X3.$ Next, using, $Y1=BR(3)-BR(5)$ $Y2=BR(5)-BR(7)$ $Y3=BR(4)-BR(6)$ $Y4=BR(6)-BR(8)$, then $CR(8)=BR(4)-P*Y1$ $CR(9)=BR(5)+P*Y3$ $CR(10)=BR(5)-P*Y3$ $CR(11)=BR(6)+P*Y2$ $CR(12)=BR(6)-P*Y2$ $CR(13)=BR(7)+P*Y4.$ This step trades the saving-over of intermediate analysis results for nineteen equations requiring calculation. Also, the calculations for the values in Condensation One must be performed.

Figure 9:
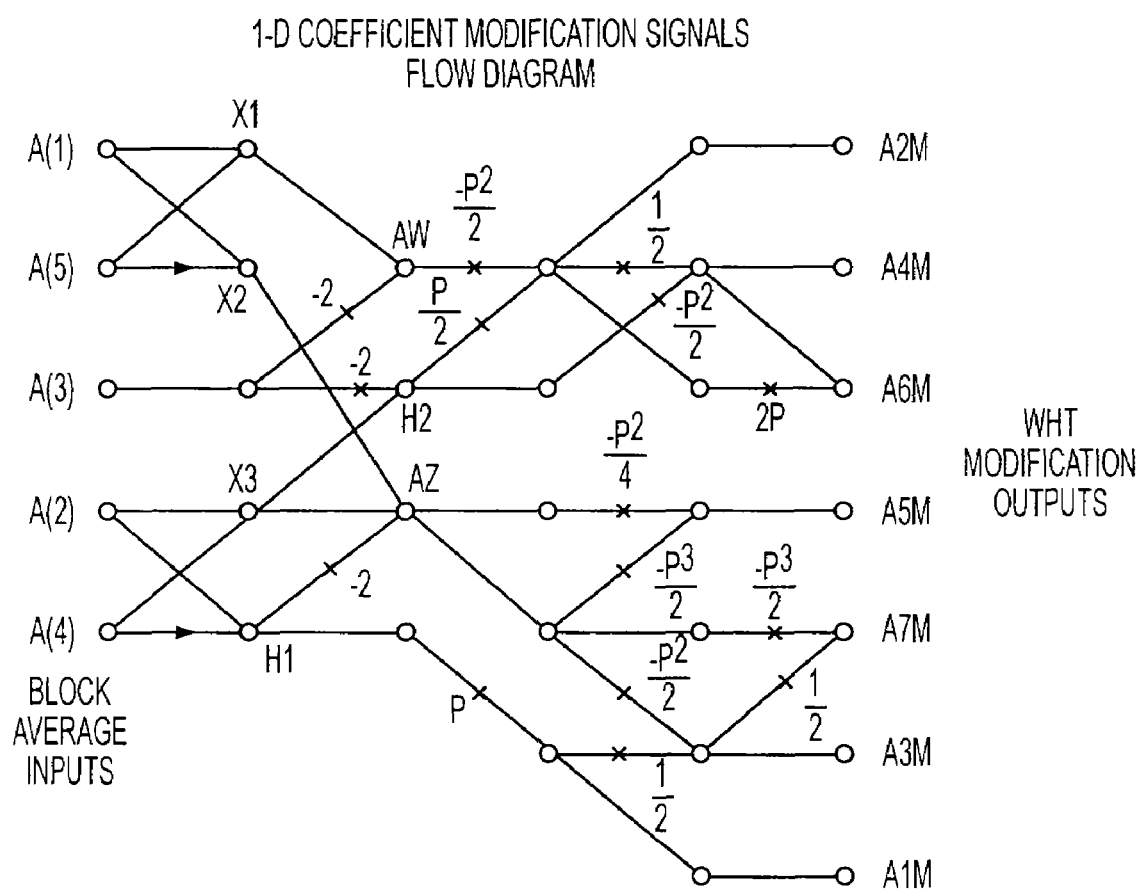
FIG. 9 shows the signal flow diagram of the Blocks Processor to derive the WHT one-dimensional transform coefficient modification signals of either FIG. 3a or FIG. 3b.

Condensation three streamlines this same operation such that transform coefficient quantities derived from $AR(1), \ldots, AR(5)$ can be used to modify the $A0, \ldots, A7$ WHT coefficients by explicit subtraction in the coefficient domain. This is the configuration shown in FIG. 3a. A derivation using the WHT develops equations for the quantities used previously at the wavelet coefficient nodes for the equivalent quantities transformed to the WHT outputs. This process is straightforward but somewhat lengthy and yields the equations, $X1=AR(1)+AR(5)$ $X2=AR(1)-AR(5)$ $X3=AR(2)+AR(4)$ $H1=AR(2)-AR(4)$ $H2=X3-2*AR(3)$ $AW=X1-2*AR(3)$ $AZ=X2-2*H1,$ and the coefficient modifications to be subtracted (subtraction unit 560 in FIG. 3a) from the seven WHT ac. coefficients now separately formed from the input data by WHT N Bands, 520, in FIG. 3a) are, $A1m=P*H1$ $A3m=\frac{1}{2}*A1m-\frac{1}{2}*P2*AZ$ $A5m=-[\frac{1}{4}*P2+\frac{1}{2}*P3]*AZ$ $A7m=\frac{1}{2}*A3m-\frac{1}{2}*P3*AZ$ $A2m=\frac{1}{2}*P*H2-\frac{1}{2}*P2*AW$ $A4m=\frac{1}{2}*A2m-\frac{1}{2}*P2*H2$ $A6m=A4m+2*P*A2m$, where $P2=P*P$ and $P3=P*P*P.$ A flow diagram for these equations is shown in FIG. 9. This equation set constitutes the Blocks Processor, 540, in FIG. 3a and the identical Blocks Processor, 650, in FIG. 3b.

At this point one sees that a hybrid transform has been developed wherein the A0 term produces a five-band spread of values upon reconstruction whereas the terms A0 through A7 terms, including the above modifications produce values only in the center block. No additional transform data is required other than A0 through A7 (with modifications) plus the A0 terms of two adjacent blocks to either side (a total of four additional A0s) to reconstruct the original data.

Other versions of this hybrid transform are also possible. For example, the WT reconstruction step used in the development of the resulting transform could have left the A(1) WT coefficient non-zeroed; in the same way the A(0) WT scaled coefficient was not zeroed. This removes the energy of the A(1) term derived from the forward WT and subsequently, after a WT reconstruction, subtracted from the input data signal. The derivation of this case proceeds exactly as before except that the A(1) WT coefficient is not set to zero.

The (in general) non-zero A(1) coefficient can be shown to have a reconstruction response in the data domain that spans most of three adjacent blocks. The data-domain response for A(1) equal to 100 is,

| 0 | 0 | 1.56 | −1.56 | −14.06 | −10.94 | −3.13 | 28.13 |
|---|---|---|---|---|---|---|---|
| 103.13 | 121.88 | 112.50 | 62.50 | −62.50 | −112.50 | −121.88 | −103.13 |
| −28.13 | 3.13 | 10.94 | 14.06 | 1.56 | −1.56 | 0 | 0. |

Note that the sum of the values in any single block is equal to zero.

The derivation leads to modification equations for coefficients A2 through A7. The equations are a superset of those derived earlier and shown in the signal flow graph of FIG. 9. A1 now becomes zero; A(1) can be stored/transmitted in its stead so that no extra coefficient is needed to represent the input data. Equations for AZ, H1, AW and H2 are as before. Two new equations involving the new coefficients are needed. The coefficient called A(i) above when placed in a sequence of blocks is now A(3) and the coefficient in the block to the left of it is A(2), and in the block to the right, A(4). Then, $QE=-AC(2)+2*AC(3)-AC(4)$, and $QH=AC(4)-AC(2).$ The equations to obtain the A-modification amounts are, $T1=P*AZ-QE$ $T2=-(P/4)*T1-2*P*AC(3)$ $A3m=(P/2)*H1-(P/2)*T1$ $A5m=T2-(P2/2)*T1$ $A7m=\frac{1}{2}*A3m-(P2/2)*T1$ $T3=(P/2)*H2-(P2/2)*AW$ $A2m=T3+(P/2)*QH$ $$A4m = \tfrac{1}{2} * A2m - (P2/2) * H2$$

$$A6m = A4m + 2*P*A2m.$$

It can be seen that setting QE and QH to zero produces the equations for A2m through A7m previously derived where only A0 was not zeroed. As before, the above modifications are to be subtracted from their respective WHT coefficients at the encoder and added to them at the decoder. No equation is needed for A1m since the coefficient minus the A1m will always be zero. The value of A(3) will be stored/transmitted in its place.

The scaling issue has yet to be harmonized between the WHT and WT. No scaling has yet been performed on the WHT but a scaling of ½ at each of the three layers has been performed with the Wavelet calculations. The wavelet outputs are therefore scaled by a total of ⅛. A simple harmonization is to scale the WHT outputs by ⅛ to permit the modifications of the AC WHT coefficients by subtraction of the A1m through A7m. Although this harmonizes the WHT with the WT it does not provide equal scaling in the Forward and Reconstruction transform directions. Recall the total scaling in a three-layer transform for both Forward and Reconstruction directions is one-eighth. For symmetrical Forward and Reconstruction scaling each should separately be the one divided by the square root of eight.

Region II of the combined transform is now described. In the Forward Transform Region II commences where Region I leaves off in FIG. 3a. Both the WT ac. coefficients and the final dc. coefficient are retained for transmission to a decoder. The quantization of transform coefficients in Region Two is usually more modest than is the quantization of blocked transform coefficients in Region One. The number of scaled coefficients that must be saved for reconstruction is reduced by a factor of 64 for three stages of decimation in Region II although new WT ac. coefficients must be saved for transmission instead. For image areas having little detail many of these WT ac. transform coefficients will have a value of zero. The ability of the WT, with its parameter, P, set to one-eighth, to generate zero-value ac. coefficients for areas of both constant level and constant slope causes this desirable effect. This in turn permits very efficient entropy encoding and an overall increase in compression efficiency.

In video systems Regions I and II are used for Intra-frame encoding; for Inter-frame encoding only Region I is used.

The Decoder of FIG. 3b is remarkably similar to the Encoder of FIG. 3a. The Blocks Transformer is the same for both Encoder and Decoder. So that the Decoder can exactly track the Encoder the Encoder's Blocks Transformer receives fixed quantization blocks at its input using the same quantization as applied to transmitted DC values. The Blocks Transformer for the one-dimensional case for both Encoder and Decoder is shown in FIG. 9. The difference between Encoder and Decoder is that the Blocks Transformer output is subtracted from the WHT coefficients at the Encoder and added to the WHT coefficients exiting the DCT-to-WHT converter at the Decoder.

Quantization of the AC coefficients at the Encoder is performed after the WHT-to-DCT converter. At the Decoder the estimates for inverse quantization are performed on the ac. DCT coefficients prior to entering the DCT-to-WHT converter.

It is seen in the implementation of the Blocks Transformer in FIG. 9 and noting that the value of 'P' is ⅛ there are several integer multiplications by small numbers especially for the higher numbered coefficients. It follows then that some approximations might be used to simplify the Blocks Transformer with relatively small change in the resulting coefficients sent to the quantizer at the Encoder. For example the quantity p*p*p/2 used in two locations has a value of 1/1024. Any simplifications made in the Blocks Transformer at the Encoder must also be made at the Decoder as well for precise tracking. Thus, in absence of quantization, no signal distortion is added by this simplification of the Blocks Transformers since the same quantity that is subtracted at the Encoder is added back in at the Decoder. The important coefficients to leave unaltered by simplification are primarily the first two or three since they have the larger weightings of input blocks in the Blocks Transformer and they also affect higher index coefficients that are subsequently formed from said first two or three coefficients.

Region II of the Decoder is the WT-only reconstruction culminating in the production of scaled coefficients at Band N for subsequent Region One reconstruction. Both the WT ac. coefficients and the Band L scaled coefficients are used to perform the Region Two Transform. In the Inter-frame mode Region Two reconstruction is not performed. Instead, differential corrections to the scaled WT and BT coefficients of Region I are transmitted to the Decoder and only the Region One processing is performed following Motion Compensated prediction.

One-Dimensional Edge Block Calculations

The last aspect of the one-dimensional case concerns the edges of a string of data blocks. In many applications the data occurs over a finite interval and it is desired to accurately transform and to inverse-transform the data up to the edges but without creation of extra coefficient data requiring transmission. In the case of a BT without a companion WT the overall data length is usually designed to be an integral multiple of the transform length. This transform length is herein taken as eight samples. With this stipulation the blocked transform in the two-transform method of this invention does not have a special case at the ends of the data stream. The WT, however, requires special treatment at the ends that is next described.

The start or finish of a data stream can be treated by assuming that data exists on the other side of the data edge where none is given and that it is a predetermined function of the already existing data close to the edge. Thus, pseudo-data are created on the side of the edge where no data is specified and is crafted such that the number of coefficients to transmit is limited to the number of original data input samples. The decoder must be able to create the same missing data assumed by the encoder. In the three-layer Wavelet transform it is only necessary to specify the scaling function(s) resulting from pseudo-data, on the absent side of the edge in terms of existing scaling functions on the side of the edge with given data since the derived formulas for modification of WHT coefficients will then use only those scaled terms. These scaling functions are normally transmitted to the decoder for every existing group of eight data elements and hence not overhead to the process. Thus the decoder can make the same calculations as made by the encoder.

Figure 10A:
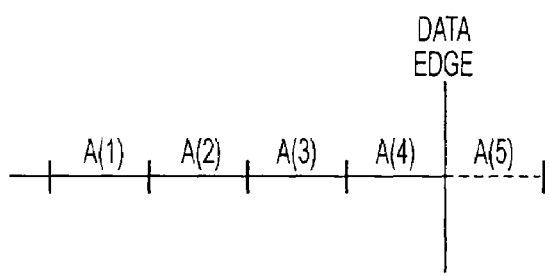
FIG. 10a shows the case wherein the A(3) block being processed is one block away from the edge and FIG. 10b. shows the case wherein the A(3) block being processed is at the edge of the data.
Figure 10B:
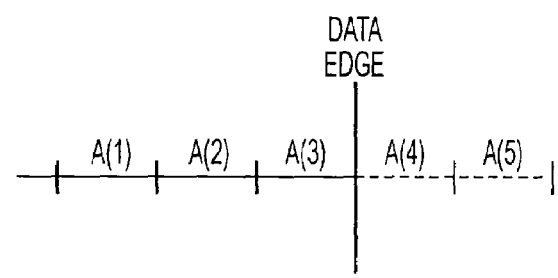
FIG. 10 shows the basis for deriving values for blocks at data edge boundaries that are outside the region of the defined one-dimensional data space.

An extrapolation process is used based on scaling coefficient values at and near the edge of the data. There are two edge cases as shown in FIG. 10. The first occurs while operating on the eight-sample-block associated with the scaled coefficient A(3) one block removed from the edge as in FIG. 10a. The second occurs while operating on the block associated with A(3) right at the data edge shown in FIG. 10b. In all cases the wavelet transform described needs two scaling coefficients on the right, A(4) and A(5), two on the left, A(1) and A(2), and the central one A(3) to calculate the modifications for the WHT ac. transform coefficients. The case for the right edge of a string of data is next described and the process for the left edge is simply the same process with the scaling coefficients treated in reverse order.

For the first case, FIG. 10a, where the block being processed is one block away from the right edge a single block on the right is missing since it is on the other side of the edge. An extrapolation method for the A(5) missing block is made based on values for A(2), A(3), and A(4), these being the three blocks closest to the edge. A constant-slope criteria will be taken as a condition for missing scaling coefficients as this may translate to zero-value (non-scaling) ac. coefficients at the data edge as it often does in the non-edge portions of the data.

To achieve a value for the missing A(5) that produces the same slope between A(4) and A(5) as between A(3) and A(4) only A(3) and A(4) are required. For the present case of extrapolation, however, the slope between A(2) and A(3) is also used to obtain a broader basis. The general expression for A(5) is, $$A(5) = -M2*A(2) + (M2-M)*A(3) + (1+M)*A(4),$$

where M1+M2=1. M1 is a parameter to be selected. If the slopes between A(2) and A(3), and A(3) and A(4) are the same then linear extrapolation of A(5) occurs independent of the value of M1. A value of M1=¾ provides a desirable value of A(5) where said slopes are not equal. To avoid multiplication by the non-trivial multiplier, ¾, the formula for A(5) can be adjusted using one more addition as, $$A(5) = -\tfrac{1}{2}*A(3) + 2*A(4) - \tfrac{1}{4}*[A(2) + A(4)]$$

These values plus the actual available scaled coefficients are used in the processor shown in FIG. 9 to calculate the coefficient modification signals. In the particular constant-slope case of A(N)=N, where A(2)=2, A(3)=3 and A(4)=4, the flow diagram of FIG. 9 calculates H1=0, H2=0, AW=O and AZ=O from which all coefficient modification signals equal zero.

The second case has the block being processed adjacent to the edge, FIG. 10b, where both A(4) and A(5) are off the edge. Using slopes between available A(*)'s to extrapolate an A(*) as before, A(1), A(2) and A(3) can be used to predict values for A(4) and A(5). The following two formulas can be used:

$$A(4) = -C2*A(1) + (C2-C1)*A(2) + (1+C1)*A(3), \text{ where } C1+C2=1, \text{ and,}$$

$$A(5) = -K2*A(1) + (K2-K1)*A(2) + (1+K1)*A(3), \text{ where } K1+K2=2.$$

Letting C1=¾, and K1=3/2, $$A(4) = -\tfrac{1}{2}*A(2) + 2*A(3) - \tfrac{1}{4}*[A(1) + A(3)], \text{ and,}$$

$$A(5) = -A(2) + 2*A(3) + \tfrac{1}{2}*[A(3) - A(1)].$$

Again letting A(N)=N, this time for A(1), A(2) and A(3), the above two equations for A(4) and A(5) yield values of 4 and 5 respectively. From this the flow diagram from FIG. 9 calculates H1=0, H2=0, AW=0 and AZ=0 from which all output coefficient modification signals equal zero.

It can be seen from FIG. 10a and FIG. 10b that the A(*) index is shifted to the right by one block for the second case relative to the first case. It can also be seen from above that the equation for A(4) in Case 2 is identical to the equation for A(5) in Case 1 after the index is shifted upward by one. Thus, it is only necessary to calculate A(4) and A(5) in the second case and to use this calculated value of A(4) for the value of A(5) for the first case.

By using a linear slope spanning multiple block values across the edge of the picture as the criteria for off-edge definition of values these values can exceed the maximum value of block values inside the picture edge. Off-edge values should be limited (clipped) to twice the maximum value in the positive direction of block values that are within the picture and the negative of the maximum value in the other direction.

This completes the description of the one-dimensional case for the invention.

Two-Dimensional Transform Pair

The combination of the blocked transform and the wavelet transform can be formed in two dimensions along similar lines as the one-dimensional (1D) combination just described. One important difference is that a diagonal axis can be formed for the wavelet transform independent of the vertical and horizontal axes. The diagonal component is introduced at the definition of the elementary wavelet transform where this is most readily accomplished. The separate diagonal component subsequently carries through to successive layers of the multi-layer Wavelet transform. The horizontal and vertical axes are constructed similarly to those in one-dimension.

The presence of the independent diagonal component will result in a 2D derivation of the combination of the blocked WHT and wavelet transforms which must be carried out in two dimensions and not as separable horizontal and vertical transforms. At the completion of this derivation equations for 63 AC subtractive modifications to the output WHT frequency coefficients result. These modifications are applied totally in the frequency domain after the WHT is calculated. With this arrangement any form of WHT calculation, including one using separable 1D transforms, can be used.

The two-dimensional Wavelet transform is next shown in three layers and seen to be an exact partial overlay to the three layers of a 2D WHT as occurred in the 1D case. Again, the transform coefficients of the Wavelet transform are set to zero leaving only the scaling transform coefficients. 2D expressions can be written to find the values of modifications introduced at each 2D Wavelet transform coefficient port similar to that done in the 1D case. In two dimensions there are now 25 (5-by-5) final scaling coefficients to be used in calculating the modifications to be made in 63 (2D) ac. coefficients. Said 25 scaling coefficients are input to the 2D Blocks Processor that in turn generates the coefficient modifiers for the WHT ac. coefficients. If any selected WT ac. coefficients are used (by design) in Region I then the number of BT ac coefficients will be 63 minus the number of selected WT ac. coefficients. For the remainder of this description no selected WT ac. coefficients in Region I will be used.

A 2D WHT-to-BT transformation is then applied to the modified WHT coefficients to create the 2D modified DCT coefficients. This is exactly the 2D version of the 1D version used for the 1D case described earlier. The WHT can be achieved in the usual way of eight 1D spatial transforms in first of the two dimensions followed by eight 1D spatial transforms in the other dimension. Alternatively the WHT can be done directly by a 2D transformer. The 2D WHT-to-BT transformation can similarly be accomplished by repeated application of 1 D transforms or by a direct 2D transformation. Both 1D and 2D cases for the WHT-to-DCT are discussed in "Discrete Cosine Transform Algorithms, Advantages, Applications" by Rao & Yip, Academic Press, 1990. The principal for other BT cases is the same but the particular transformation kernel must first be determined for a different BT. The Blocks Processor must be derived for a particular Wavelet Transform. Furthermore, the equations for the WHT coefficient modifiers must be derived using over-laid two-dimensional transform representations of the IWHT and WHT, similar to the one-dimensional case. This will be treated later after a description of the new 2D Wavelet Transform.

The 2D forward single-layer elemental Wavelet transformer is first defined along the lines of the previous 1-D transformer but in two dimensions and with a new diagonal term rendering it a non-separable 2-D transform. H1 through H4 are abbreviations for four input data elements at the center of the diagram of FIG. 11a containing 36 (6-by-6) input (non-edge) points.

$H1=D(M1-1,N1-1)$ $H2=D(M1-1,N1)$ $H3=D(M1,N1-1)$, and $H4=D(M1,N1)$.

Using 1D notation, $M1=2*M$ and $N1=2*N$ for the input indices. M is now the row index and N is the column index for the output indices. With this notation a single elemental transform is defined, $$C(M, N) = Sf * [H1 + H2 + H3 + H4]$$

$$CH(M, N) = Sf * [H1 - H2 + H3 - H4] -$$
$$P * [C(M, N-1) - C(M, N+1)]$$

$$CV(M, N) = Sf * [H1 + H2 - H3 - H4] -$$
$$P * [C(M-1, N) - C(M+1, N)],$$

and $$CD(M, N = Sf * [H1 - H2 - H3 + H4] -$$
$$P * P * [C(M-1, N-1) + C(M+1, N+1) -$$
$$C(M-1, N+1) - C(M+1, N-1)]$$

Each C(m, n) is a scaled average of four input data elements of FIG. 11a in a square. The other eight C(m,n) scaled averages are calculated like C(M,N) above but each uses a different, non-overlapping group of four input elements. FIG. 11b shows the relationship of the nine C(m,n)'s calculated from the 36 input elements of FIG. 11a in the elemental forward transform. The footprint of the C-layer outputs in FIG. 11b is the same as the 36 input data samples in FIG. 11a. The calculation of the horizontal and vertical coefficients have the same form as the 1D transform but the diagonal coefficient form is different allowing it alone to represent a diagonal warp of the data input. As in the 1D case the quantity, P, will take the value of X8 for the remaining discussion of the 2D case.

As with the 1D Wavelet Transform the coefficients are given above in terms of both input data elements (the H's) and various C(m,n)'s, the latter being functions of the inputs. This provides some additional calculation efficiency and organization similar to the 2D WHT.

The reconstruction one-layer elemental 2D Wavelet transformer is defined along the lines of the 1D reconstruction device. The suffix, R, denotes inputs and outputs of the reconstruction process and G1 through G4 are abbreviations defined below.

$G1=CR(M,N)$ $G2=CH(M,N)+P*[CR(M, N-1)-CR(M,N+1)]$ $G3=CV(M,N)+P*[CR(M-1,N)-CR(M+1, N)],$ and $G4=CD(M,N)+$
$P*P*[CR(M-1, N-1)+CR(M+1,N+1)-CR(M-1,N+1)-CR(M+1,N-1)].$ In the 2D case M is the row index and N is the column index for the input indices. M1 is the row index and N1 is the column index for the output indices. The CH(M,N), CV(M, N) and CD(M,N) terms are synthesis coefficients whereas all the other terms are synthesis scaling coefficient terms. With this notation, $DR(M1-1,N1-1)=Si*[G1+G2+G3+G4]$ $DR(M1-1,N1)=Si*[G1-G2+G3-G4]$ $DR(M1,N1-1)=Si*[G1+G2-G3-G4]$, and $DR(M1 N1)=Si*[G1-G2-G3+G4]$.

Figure 12A:
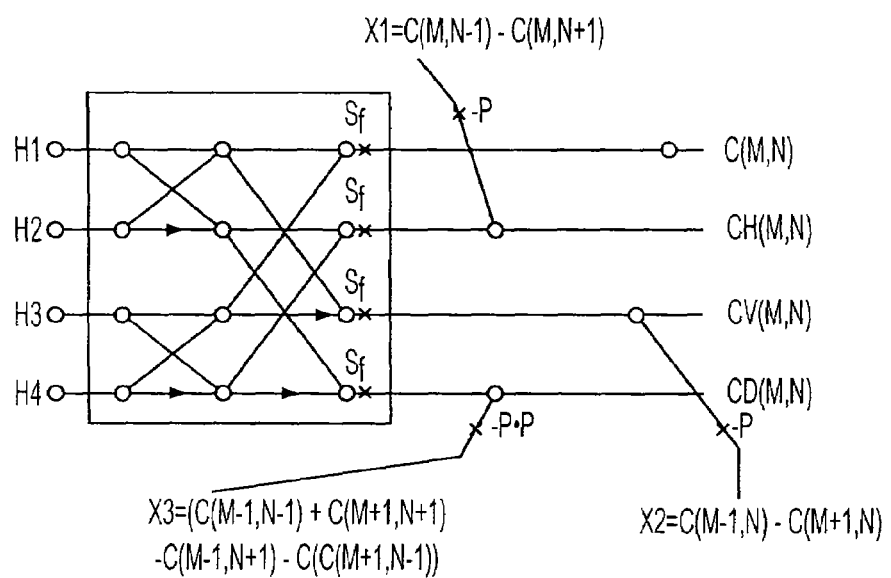
FIGS. 12a and 12b show signal flow diagrams for the elemental 2-D integer non-separable WT forward transform and elemental 2-D integer non-separable reconstruction transform respectively.
Figure 12B:
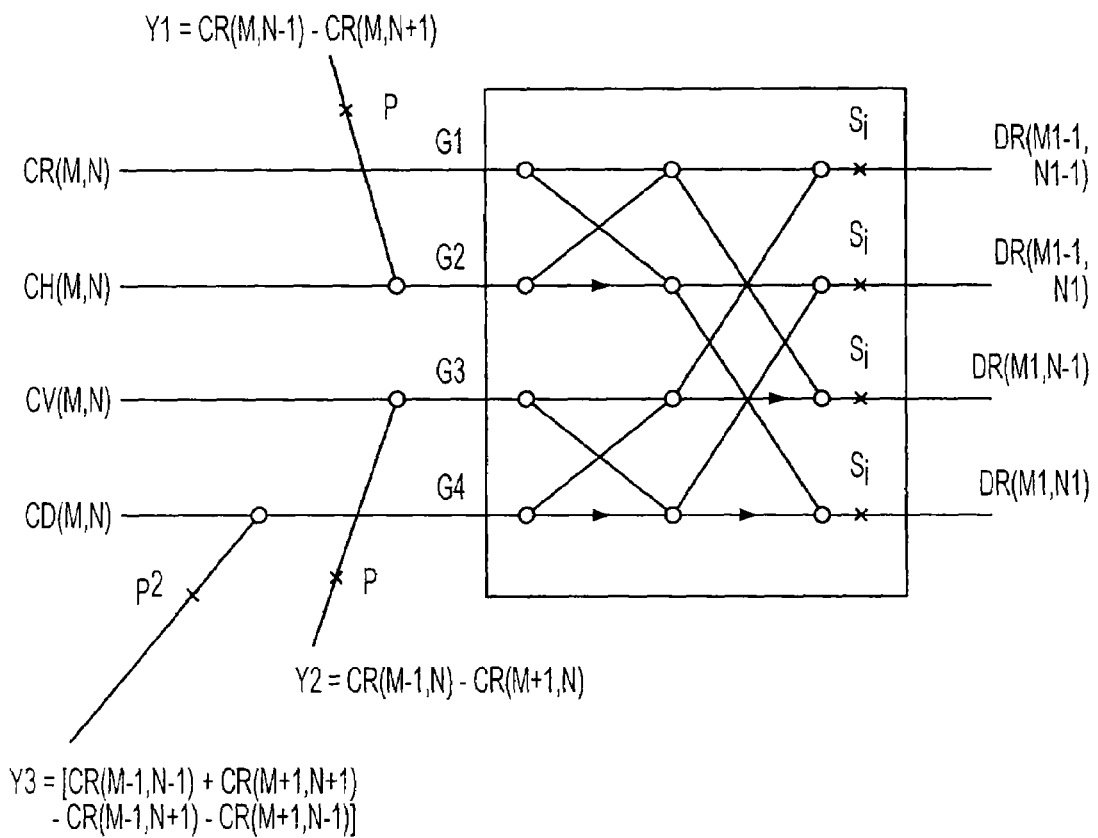
Figure 14B:
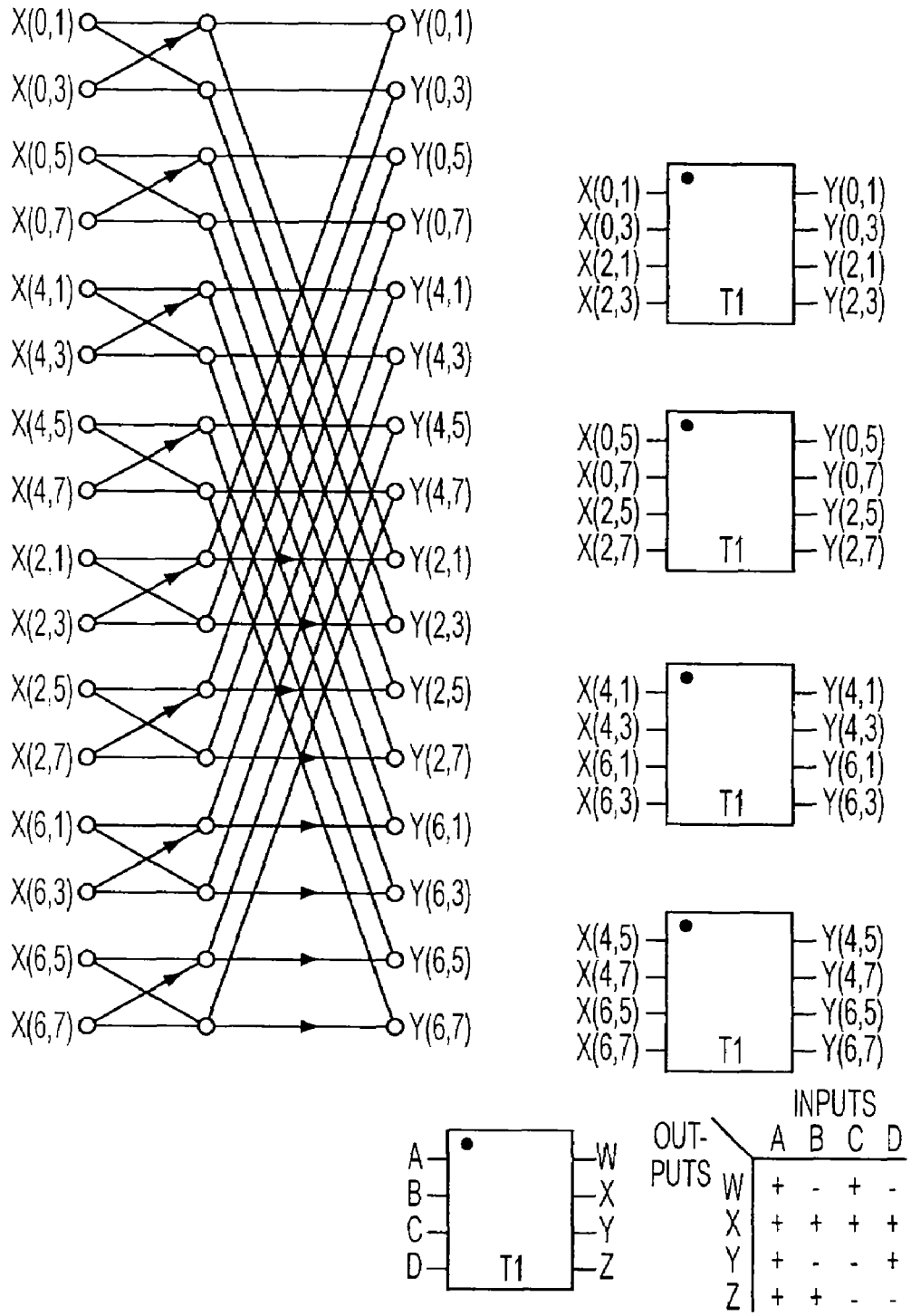
Figure 14D:
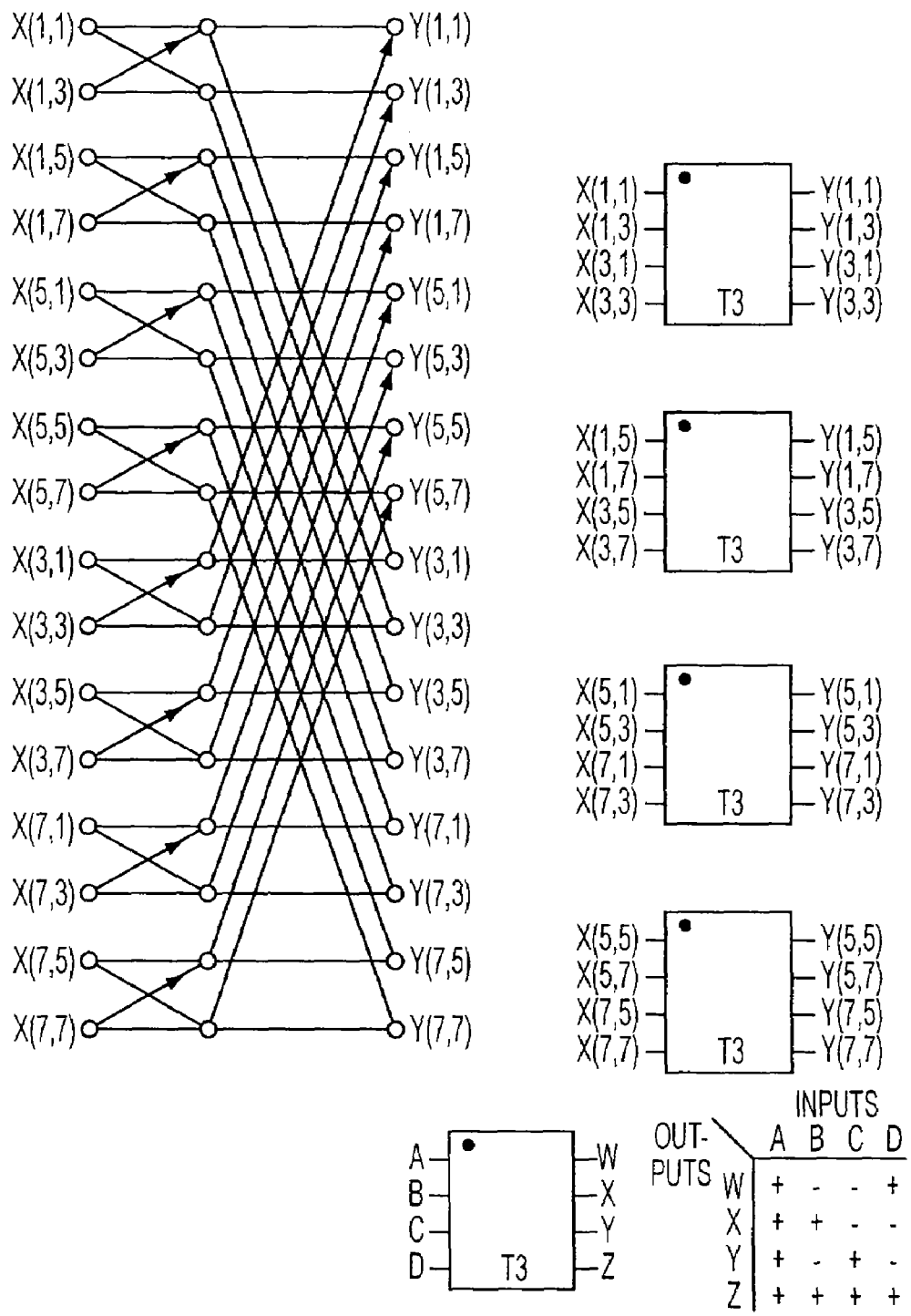
Figure 15B:
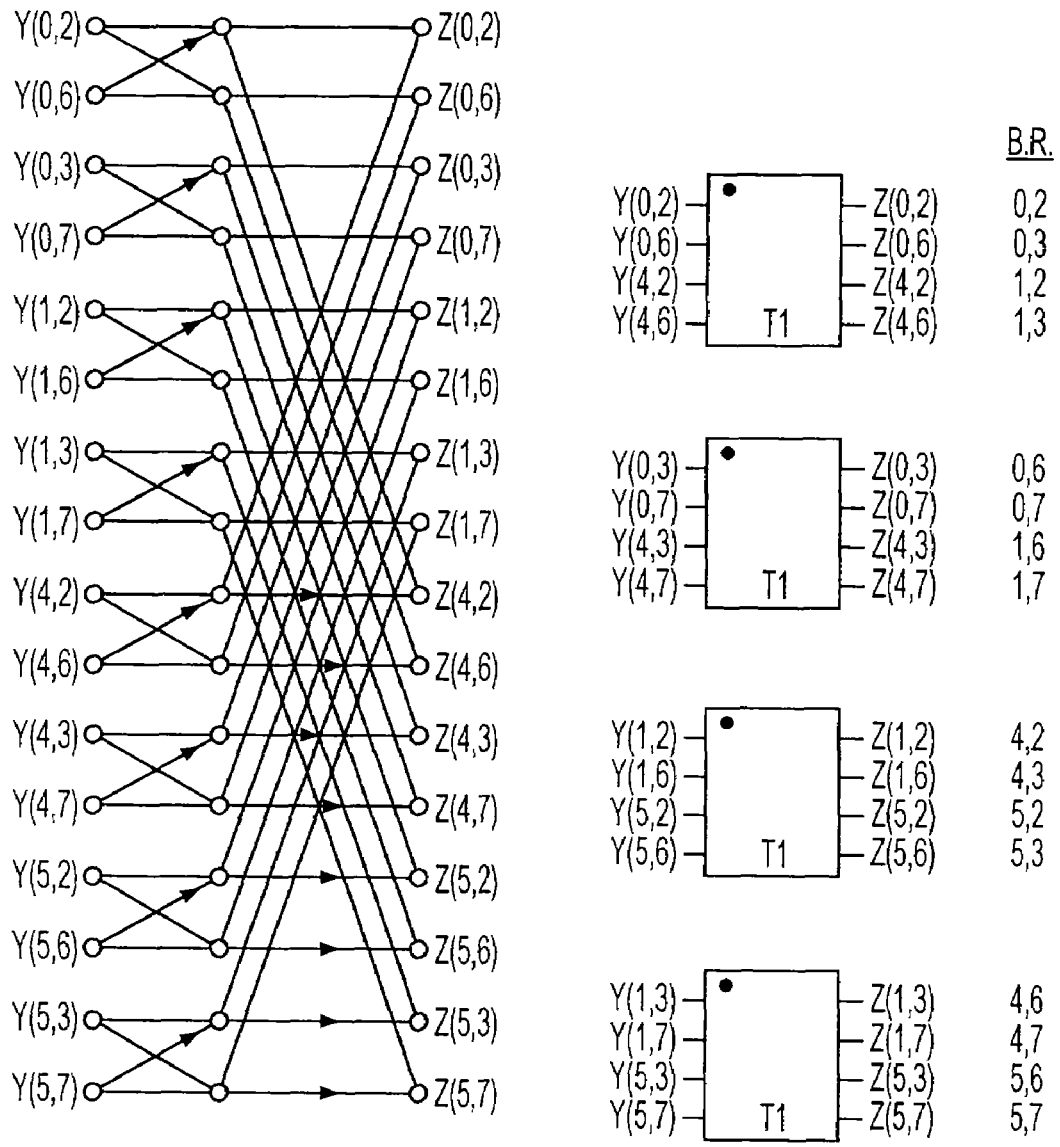

FIG. 12a shows a flow diagram of the forward (analysis) elemental 2D Wavelet Transform. As with the 1D forward transform the 2D forward coefficients contain the X1, X2 or X3 as part of their calculation. FIG. 12b shows a flow diagram of the reconstruction (synthesis) elemental Wavelet Transform. As with the 1D reconstruction transform the 2D reconstruction quantities Y1, Y2 or Y3 are taken as part of the scaling coefficients.

For the 2D case of the elemental WT to be properly scaled it is necessary for [Sf*Si] to be equal to ¼. In this situation it is practical for each Sf and Si to have a value of ½. With this done once at each layer for the 2D Wavelet Transform and at each 2D column for the WHT all scaling is performed as an Integer Transform with the only multiplications required being binary shifts. The 2D column consisting of both a vertical and a horizontal WHT transform is next discussed.

The 2D WHT can be created from the 1D WHT, of FIG. 6c. It is well known that a 2D transform of 2D input data, say of eight-by-eight data (=64 samples), can be found by first taking eight 1D transforms in one of the directions followed by eight 1D transforms in the perpendicular direction on the results of the first eight transforms. This permits a single 1D transform to be used 16 times in succession after which the transformed data is available. In the design of the 2-D Blocks Processor however it is necessary to overlay a 2D WT on a 2D WHT to derive the reduced formulas for calculating 2D WHT coefficient modifiers similar to the 1D process discussed with reference to FIG. 6a. and FIG. 6b. Thus the combination of the 2-D IWT and the 2D WHT must first be expressed algebraically in totality and reduced to simple expressions for the 2D WHT coefficient modifiers before using them on 2D data. This dramatically reduces the number of computations required relative to separately performing all the pieces of the 2D IWT and the following 2D WHT.

The overlay of the 2D WT on the 2D WHT first requires the repeated use of the elemental 2D WT of FIG. 12a as shown as generally indicated in 1D in FIG. 11 over three bands. This is described later in more detail. The 2D WHT is next derived from the 1D WHT in FIG. 6b. This 1D WHT is split into three columns of processing. The first column processes "D" data to create "C" data; the second column processes "C" data to produce "B" data and the third column processes "B" data to produce the output "A" data. For the 2D WHT the first column is first treated by eight horizontal transforms of the first column of FIG. 6b to generate 64 outputs. Secondly, these outputs are transformed vertically by eight 1D transforms of the type of the first column of FIG. 6b. The result is a 2D transformation of the input data by the first column of the WHT to generate the X(M,N) data. This is shown condensed on the left side of FIG. 13. There are actually four identical sections represented by this flow chart in the first column of the 2D WHT. The input and output data uses the row parameter "M" to distinguish each of the four sections. "M" takes on the value of 0 to describe the first of the four sections; "M" takes on the value 2 to describe the second section, the value 4 to describe the third section and the value 6 to describe the fourth section.

To more compactly represent the processing on the left side of FIG. 13 a 2D WHT block, T0 is defined at the bottom with inputs A, B, C, and D, and outputs W, X Y and Z and having the functional relationship shown in the bottom right corner. The "+" and "−" signs indicate "+1" and "−1" multipliers respectively. The WHT block appears in FIG. 13 in four places along the right side. Since "M" takes on four different values there are, in total, 16 of these blocks in the first column of the 2D WHT transformer.

The second of the three columns in the 2D WHT is developed and shown in FIG. 14a, FIG. 14b, FIG. 14c and FIG. 14d. In column 2 the horizontal transforms are all performed on the input X(M,N) data according to the $2^{nd}$ column of the 1D WHT of FIG. 6b. Each of the four groups for the $2^{nd}$ column is shown in separate drawings since the flow charts are not the same for each group. Again, the flow chart detail is shown on the left side of each of the four groups in FIG. 14, the 2D WHT block representation at the bottom and the four condensed blocks along the right side of each group. Note that FIG. 14a uses the same "T0" block as used in FIG. 13. However the "T1" block is used in FIG. 14b, the "T2" block in FIG. 14c and the "T3" block in FIG. 14d.

In a like fashion the third (final) column of FIG. 6c is performed on the Y(*,*) results of the second column with first a horizontal set and then a vertical set of transforms in accordance with the third column of FIG. 6b. FIGS. 15a, 15b, 15c and 15d each show one fourth of these operations. The same four types used in the second 2D column are also used in the third column but shown again with connections particular to 2D column three. The 2D WHT outputs are the Z(*,*) of the four sections of FIG. 15. The notation of Z(*,*) is row/column bit-reversed order. For example, output Z(3,7) is actually ZN(6,7) where the ZN-coefficient has normal index ordering. With input data W(M,N) where M is the row number from zero to seven and N is the column number from zero to seven, the outputs Z(M,N) are the WHT coefficient outputs in bit-reversed order for both M and N. With Si and Sf both assigned the value of ½ these 2D transforms require no further scaling. The 2D WHT can be drawn on a (large) single page in three columns with 16 2D elemental transform blocks per column from the blocks in FIG. 13, FIG. 14 and FIG. 15 but is not herein shown as such.

Figure 16:
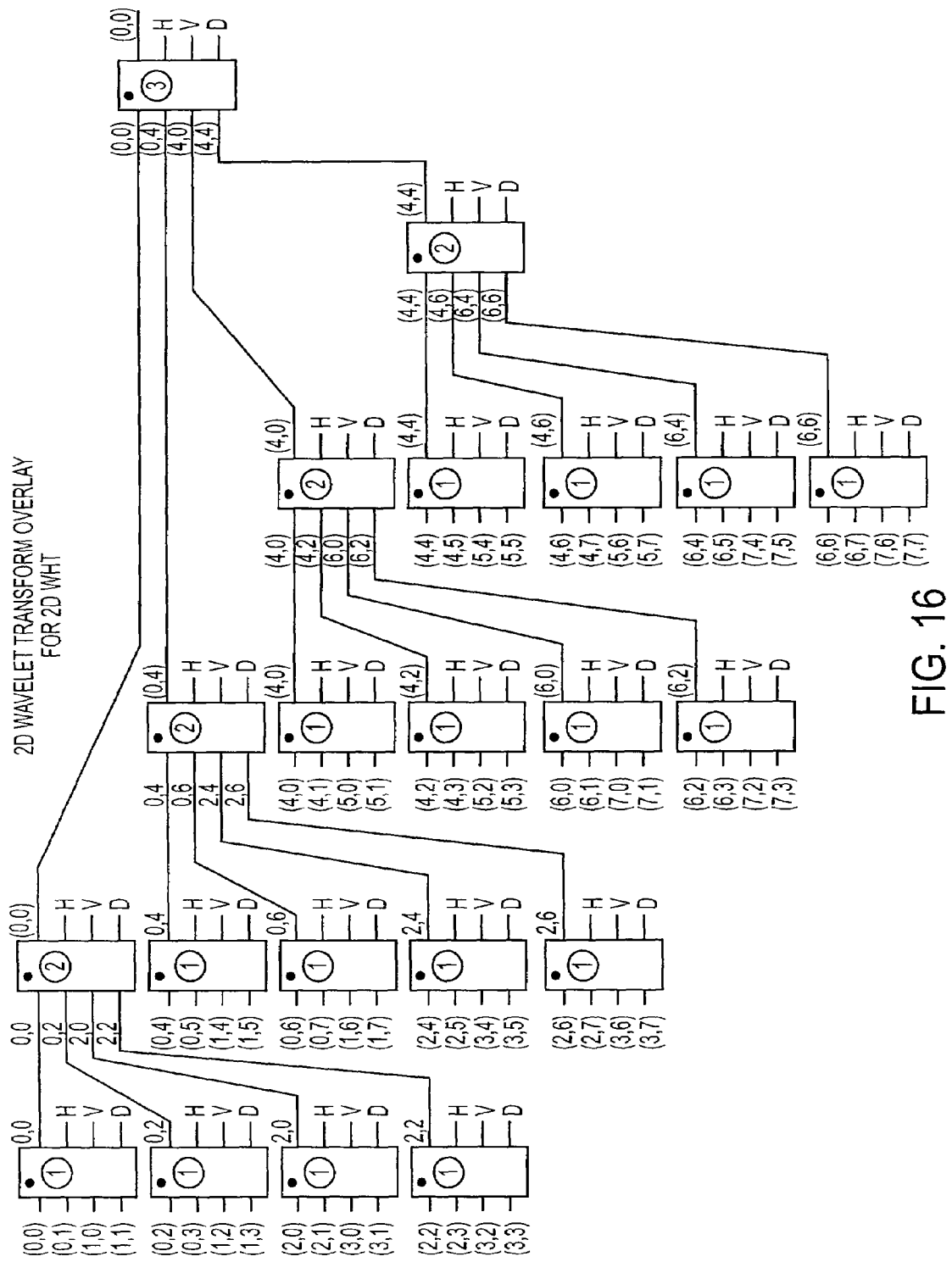
FIG. 16 shows the signal flow diagram for the complete two-dimensional WT overlay of the WHT, the latter being available from FIGS. 13, 14 and 15. Signal outputs are in bit-reversed order of actual transform coefficients whereas data inputs to column one blocks are in normal order.
Figure 17A:
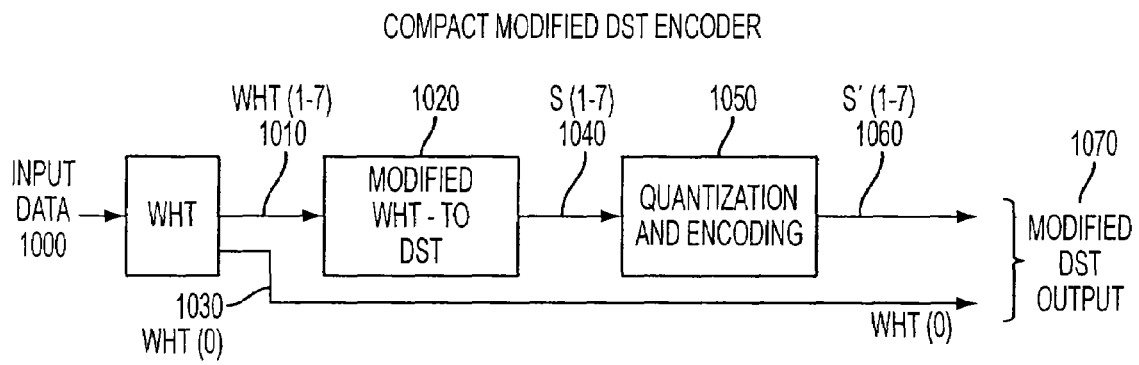
FIG. 17a shows the modified DST cast as a modified combination of the WHT and the WHT-to-DST Transformation Matrix to realize a compact DST implementation wherein the dc. value of the data input has been removed and separately sent as one of the compact set.
Figure 17B:
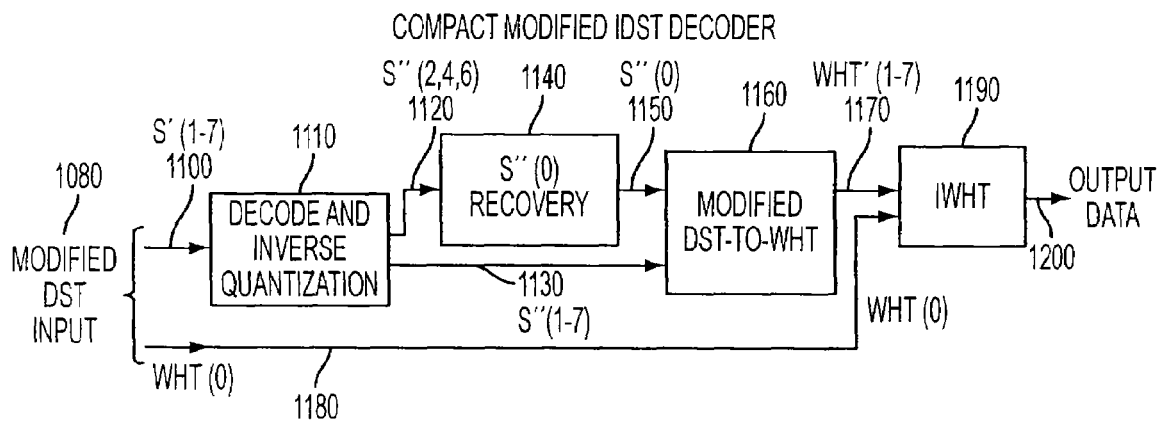
FIG. 17b shows the IDST cast as a modified combination of the DST-to-WHT Transformation Matrix following by the IWHT.

The complete shorthand result for the 2D Wavelet Transform is shown in FIG. 16 and consists of sixteen elemental blocks for the "D"-to-"C" band, four elemental blocks for the "C"-to-"B" band and a single elemental block for the "B"-to-"A" band. The "D"-to-"C" blocks overlay the 16 WHT blocks of column one. The four "B"-to-"C" blocks overlay the four Type-0 WHT blocks in column two shown in FIG. 14a. The single "B"-to-"A" block overlays the first (top) Type 0 block in FIG. 15a. The WT and WHT blocks have the same internal structure of the elemental 2D WHT.

Just as in the 1D case the purpose of determining the alignment of the 2D WT and the 2D WHT is to provide a means for algebraically determining the 2D IWT followed by algebraically determining the WHT results required by the 2D Blocks Processor in FIG. 3a and FIG. 3b. As before the 2D IWT is determined by proceeding from right to left in FIG. 16 and the WHT by proceeding from left to right in FIGS. 13, 14 and 15. Also as before it is not necessary to algebraically determine a complete inverse WT before calculating the forward WHT. For example, for Band A of the IWT it is only necessary to express the outputs of the column three blocks of FIG. 16 proceeding from right to left. Recalling that the IWT synthesis requires the Y1, Y2 and Y3 terms of FIG. 12b it is necessary to express neighboring elemental "A"-to-"B" blocks as well. This can be seen in the 1D portrayal of the WT layering shown in FIG. 5 and in the block limits in the FOR/NEXT equations for the 1D WT presented earlier.

The 2D WT reconstruction equations are given next wherein the notation is very similar to that of the 1D equations. Double FOR/NEXT equations involving both the row parameter "M" and the column parameter "N" are used. These equations can be used for full WT reconstruction but the ac. synthesis coefficients can be omitted, or selectively omitted if the design includes more than the dc. WT component, for the IWT that is part of the Blocks Processor. The ac. coefficients are labeled as three-dimensional quantities where the third (last) dimension indicates the horizontal coefficient if equal to 1, the vertical coefficient if equal to 2, and the diagonal coefficient if equal to 3. The coefficients for the three layers are AC(*), BC(*) and CC(*). A BASIC program to perform the IWT is next shown for reference.

```
'A to B Level
FOR M = 2 TO 4:M1 = 2 * M
  FOR N = 2 TO 4:N1 = 2 * N
    FC1 = A(M, N)
    FC2 = P * (A(M, N − 1) − A(M, N + 1)) + AC(M, N, 1)
    FC3 = P * (A(M − 1, N) − A(M + 1, N)) + AC(M, N, 2)
    FC4 = P * P * (A(M − 1, N − 1) + A(M + 1, N + 1) − A(M − 1, N +
      1) − A(M+ N − 1)) + AC(M, N, 3)
    BR(M1 −1, N1 −1) = FC1 + FC2 + FC3 + FC4
    BR(M1 −1, N1) = FC1 − FC2 + FC3 − FC4
    BR(M1, N1 − 1) = FC1 + FC2 − FC3 − FC4
    BR(M1, N1) = FC1 − FC2 − FC3 + FC4
  NEXT N
NEXT M
'B to C Level
FOR M = 4 TO 8:M1 = 2 * M
  FOR N = 4 TO 7:N1 = 2 * N
    FC1 = BR(M, N)
    FC2 = P * (BR(M, N − 1) − BR(M, N + 1)) + BC(M, N, 1)
    FC3 = P * (BR(M − 1, N) − BR(M + 1, N)) + BC(M, N, 2)
    FC4 = P * P * (BR(M − 1, N − 1) + BR(M + 1, N + 1) − BR(M −
      1, N + 1) − BR(M + 1, N − 1)) + BC(M, N, 3)
    CR(M1 −1, N1 −1) = FC1 + FC2 + FC3 + FC4
    CR(M1 −1, N1) = FC1 − FC2 + FC3 − FC4
    CR(M1, N1 − 1) = FC1 + FC2 − FC3 − FC4
    CR(M1, N1) = FC1 − FC2 − FC3 + FC4
  NEXT N
NEXT M
'C to D Level
FOR M = 9 TO 12:M1 = 2 * M
  FOR N = 9 TO 12:N1 = 2 * N
    FC1 = CR(M, N)
    FC2 = P * (CR(M, N − 1) − CR(M, N + 1)) + CC(M, N, 1)
    FC3 = P * (CR(M − 1, N) − CR(M + 1, N)) + CC(M, N, 2)
    FC4 = P * P * (CR(M − 1, N − 1) + CR(M + 1, N + 1) − CR(M −
      1, N + 1) − CR(M + 1, N − 1)) + CC(M, N, 3)
    DR(M1 − 1, N1 − 1) = FC1 + FC2 + FC3 + FC4
    DR(M1 − 1, N1) = FC1 − FC2 + FC3 − FC4
    DR(M1, N1 − 1) = FC1 + FC2 − FC3 − FC4
    DR(M1, N1) = FC1 − FC2 − FC3 + FC4
  NEXT N
NEXT M
```

The next task is to derive expressions for the 2D WHT coefficient modifiers as was done in the 1D case. These modifiers are subtracted from the WHT coefficient counterparts to obtain WHT coefficients for the combination of the Wavelet and WHT transforms. The process is the same as with the 1D case but the arithmetic is more extensive. The derivation is next given in outline form.

The first step involves determination at the Wavelet coefficients in the diagram of FIG. 16. These coefficients are reconstructed from the A(m,n) values determined from the scaled average value of each eight-by-eight block of data inputs since the method dictates a reconstruction of the Wavelet Transform using only the scaling coefficients and none of the other synthesis coefficients. Although these other coefficients themselves all have a zero value, terms of the form P*[C(Ma,Na)−C(Mb,Nb)] that are part of the scaling synthesis function must be appropriately determined and entered. The indexing system used for the 1D case shown in FIG. 5 will be used for the 2D case. This dictates that the input data elements range from 17 through 24 necessitated by other data elements needing positive integer indices for computer simulation. An index shift to account for the WHT input data previously shown from zero to seven is necessary in the derivation.

It is assumed that the scaled block average data A(M,N) has been pre-calculated for M and N from one through five. There is a single block in FIG. 16 requiring three expressions (H, V and D) of data. This is given as, $$H=P*[A(3,2)-A(3,4)],$$

$$V=P*[A(2,3)-A(4,3)], \text{ and}$$

$$D=P*P*[A(2,2)+A(4,4)-A(2,4)-A(4,2)].$$

The correspondence between the IWT and the WHT for the above terms is the block circled-three at the upper right in FIG. 16 and the top right-side block in FIG. 15*a*, respectively. The above H, V and D terms become the modifiers for Z(0,4), Z(4,0) and Z(4,4) respectively. Again, relative to normal coefficient numbering these indices are bit-reversed. These modifiers are subtracted at the encoder and added at the decoder. Note from the preceding BASIC program that five Band one (also called Layer one) elemental WT's are calculated. Although only the center one is needed here the others are needed to provide IWT input values for Bands two and three. This completes the three modifiers controlled by the column three level of the Wavelet Transform. The above H, V, D are shown again below after transformation of A(_,_)'s to a new orthogonal set of variables.

In FIG. 16 column two has four blocks, indicated by the circle-two designators, for the Wavelet Transform and thus has twelve coefficients to be determined. The associated WHT blocks are the four blocks shown in FIG. 14*a*. Expressions for Y(*,*)mod in the index system of the WHT can be written in terms of BR(*,*)'s, which are Wavelet H, V, and D terms, in turn reconstructed from just the A(*,*) values. The first step is to specify these expressions as modifiers at the corresponding WHT locations in FIG. 14*a* incorporating the index shift for this Band:

$$Y(0,2)\text{mod}=P*[BR(5,4)-BR(5,6)]$$

$$Y(0,6)\text{mod}=P*[BR(5,5)-BR(5,7)]$$

$$Y(4,2)\text{mod}=P*[BR(6,4)-BR(6,6)]$$

$$Y(4,6)\text{mod}=P*[BR(6,5)-BR(6,7)]$$

$$Y(2,0)\text{mod}=P*[BR(4,5)-BR(6,5)]$$

$$Y(2,4)\text{mod}=P*[BR(4,6)-BR(6,6)]$$

$$Y(6,0)\text{mod}=P*[BR(5,5)-BR(7,5)]$$

$$Y(6,4)\text{mod}=P*[BR(5,6)-BR(7,6)]$$

$$Y(2,2)\text{mod}=P*P*[BR(4,4)+BR(6,6)-BR(4,6)-BR(6,4)]$$

$$Y(2,6)\text{mod}=P*P*[BR(4,5)+BR(6,7)-BR(4,7)-BR(6,5)]$$

$$Y(6,2)\text{mod}=P*P*[BR(5,4)+BR(7,6)-BR(5,6)-BR(7,4)]$$

$$Y(6,6)\text{mod}=P*P*[BR(5,5)+BR(7,7)-BR(5,7)-BR(7,5)]$$

Two additional steps are now necessary. The first is to find expressions for the BR(*,*) in terms of the A(1,1) through A(5,5), the scaled block averages. These are found from the Wavelet reconstruction equations given next wherein the non-scaled coefficients are assumed zero in value.

```
FOR M = 2 TO 4:M1 = 2 * M
  FOR N = 2 TO 4:N1 = 2 * N
    F1 = A(M, N)
    F2 = P * [A(M, N − 1) − A(M, N + 1)]
    F3 = P * [A(M − 1, N) − A(M + 1, N)]
    F4 = P * P * [A(M − 1, N − 1) + A(M + 1, N + 1) − A(M − 1, N + 1) − A(M + 1, N − 1)]
    BR(M1 − 1, N1 − 1)   = ½ * [F1 + F2 + F3 + F4]
    BR(M1 − 1, N1)       = ½ * [F1 − F2 + F3 − F4]
    BR(M1, N1 − 1)       = ½ * [F1 + F2 − F3 − F4]
    BR(M1, N1)           = ½ * [F1 − F2 − F3 + F4]
NEXT N, M
```

Note that some values of BR(_,_) are calculated here, which aren't required until the next higher layer of reconstruction to be treated later.

The second additional step is to transform the twelve Y(_,_)mod expressions to the Z(_,_) output level to complete the process. The arithmetic effort is less, however, if the transformation is done prior to expressing the BR(_,_) in terms of A(_,_) due to combining and cancellation of terms in the transformation. This transformation is done in accordance with the polarities given for each path through the WHT block to each output frequency point and using a scaling of ½ per band.

Formulas for the 24 variables for use in calculating the frequency modifiers are shown in Listing 0. A first group of these calculates 15 ZN(even, even) modifications (ZN denotes normal, non-bit-reversed indexes) using the nine input variables, CE3, CE4, RE3, RE4, DI1, DH1, DV1 and OD1.

Listing 0

$$CE3=.5*(A(3,2)+A(3,4))-A(3,3)$$

$$CE4=A(3,3)-.5*(A(3,1)+A(3,5))$$

$$RE3=.5*(A(2,3)+A(4,3))-A(3,3)$$

$$RE4=A(3,3)-.5*(A(1,3)+A(5,3))$$

$$CO1=.5*(A(3,2)-A(3,4))$$

$$CO2=.5*(A(3,1)-A(3,5))$$

$$RO1=.5*(A(2,3)-A(4,3))$$

$$RO2=.5*(A(1,3)-A(5,3))$$

$DH1=.25*(A(2,1)+A(2,5)+A(4,1)+A(4,5))-A(3,3)$ $DH2=.25*(A(2,1)-A(2,5)+A(4,1)-A(4,5))$ $DH3=.25*(A(2,1)+A(2,5)-A(4,1)-A(4,5))$ $DH4=.25*(A(2,1)-A(2,5)-A(4,1)+A(4,5))$ $DV1=.25*(A(1,2)+A(5,2)+A(1,4)+A(5,4))-A(3,3)$ $DV2=.25*(A(1,2)+A(5,2)-A(1,4)-A(5,4))$ $DV3=.25*(A(1,2)-A(5,2)+A(1,4)-A(5,4))$ $DV4=.25*(A(1,2)-A(5,2)-A(1,4)+A(5,4))$ $DI1=.25*(A(2,2)+A(4,2)+A(2,4)+A(4,4))-A(3,3)$ $DI2=.25*(A(2,2)+A(4,2)-A(2,4)-A(4,4))$ $DI3=.25*(A(2,2)-A(4,2)+A(2,4)-A(4,4))$ $DI4=.25*(A(2,2)-A(4,2)-A(2,4)+A(4,4))$ $OD1=.25*(A(1,1)+A(5,1)+A(1,5)+A(5,5))-A(3,3)$ $OD2=.25*(A(1,1)+A(5,1)-A(1,5)-A(5,5))$ $OD3=.25*(A(1,1)-A(5,1)+A(1,5)-A(5,5))$ $OD4=.25*(A(1,1)-A(5,1)-A(1,5)+A(5,5))$

The second group calculates 16 ZN(even, odd) modifications using six input variables, CO1, CO2, DI2, DH2, DV2 and OD2.

The third group calculates 16 ZN(odd, even) modifications using six input variables, RO1, RO2, DI3, DH3, DV3 AND OD3.

The fourth group calculates 16 ZN(odd, odd) modifications using four input variables, DI4, DH4, DV4 and OD4.

First in the calculations, the H, V, and D of the column three IWT block and associated WHT block above can be transformed into modifications for Z(0,4), Z(4,0) and Z(4,4) respectively. These modifications at the encoder with the '−' signs are shown as:

$Z(0,4)=Z(0,4)-2*P*CO1=Z(0,4)+AJ*(-2048*CO1)$ $Z(4,0)=Z(4,0)-2*P*RO1=Z(4,0)+AJ*(-2048*RO1)$ $Z(4,4)=Z(4,4)-4*P*P*DI4=Z(4,4)+AJ*(-512*DI4)$,

Where Aj=1/81 92, a constant to be used by all Z(_,_) modifiers. Recall that the Z(_,_)'s have bit-reversed indexes.

Next, the twelve Y(_,_) expressions from the B layer can be transformed to modifications of Z(_,_)'s in terms of A(_,_)'s and then in terms of the orthogonal variables given above. These are after algebraic manipulation, $Z(0, 2) = Z(0, 2) + Aj * [-1024 * CE3 - 128 * CE4]$ $Z(0, 6) = Z(0, 6) + Aj * [-1280 * CO1 - 128 * CO2]$ $Z(4, 2) = Z(4, 2) + Aj * [224 * RO1 - 256 * DI3 + 32 * DH3]$ $Z(4, 6) = Z(4, 6) + Aj * [-320 * DI4 + 32 * DH4]$ $Z(2, 0) = Z(2, 0) + Aj * [-1024 * RE3 - 128 * RE4]$ $Z(2, 4) = Z(2, 4) + Aj * [224 * CO1 - 256 * DI2 + 32 * DV2]$ $Z(6, 0) = Z(6, 0) + Aj * [-1280 * RO1 - 128 * RO2]$ -continued $Z(6, 4) = Z(6, 4) + Aj * [-320 * DI4 + 32 * DV4]$ $Z(2, 2) = Z(2, 2) + Aj * [112 * CE3 + 14 * CE4 + 112 * RE3 + 14 * RE4 - 128 * DI1 + 16 * DH1 + 16 * DV1 - 2 * OD1]$ $Z(2, 6) = Z(2, 6) + Aj * [140 * CO1 - 14 * CO2 - 160 * DI2 + 16 * DH2 + 20 * DV2 - 2 * OD2]$ $Z(6, 2) = Z(6, 2) + Aj * [140 * RO1 - 14 * RO2 - 160 * DI3 + 20 * DH3 + 16 * DV3 - 2 * OD3]$ $Z(6, 6) = Z(6, 6) + Aj * [-200 * DI4 + 20 * DH3 + 20 * DV4 - * OD4]$ This completes the modifications for the Z(_,_)'s coming from the B level. Remaining now are 48 modifications coming from the C level. The same approach is used as before with the A and B levels of the WT. After calculation of CR(_,_) terms as a function of the A(_,_) inputs and subsequently entered into the corresponding WHT locations. The modifications when performed at the X level (output of the first 2D column) are as follows.

$X(0,1)=X(0,1)-P*[CR(9,8)-CR(9,10)]$ $X(1,0)=X(1,0)-P*[CR(8,9)-CR(10,9)]$ $X(1,1)=X(1,1)-P*P*[CR(8,8)+CR(10,10)-CR(8,10)-CR(10,8)]$ $X(0,3)=X(0,3)-P*[CR(9,9)-CR(9,11)]$ $X(1,2)=X(1,2)-P*[CR(8,10)-CR(10,10)]$ $X(1,3)=X(1,3)-P*P*[CR(8,9)+CR(10,11)-CR(8,11)-CR(10,9)]$ $X(0,5)=X(0,5)-P*[CR(9,10)-CR(9,12)]$ $X(1,4)=X(1,4)-P*[CR(8,11)-CR(10,11)]$ $X(1,5)=X(1,5)-P*P*[CR(8,10)+CR(10,12)-CR(8,12)-CR(10,10)]$ $X(0,7)=X(0,7)-P*[CR(9,11)-CR(9,13)]$ $X(1,6)=X(1,6)-P*[CR(8,12)-CR(10,12)]$ $X(1,7)=X(1,7)-P*P*[CR(8,11)+CR(10,13)-CR(8,13)-CR(10,11)]$ $X(2,1)=X(2,1)-P*[CR(10,8)-CR(10,10)]$ $X(3,0)=X(3,0)-P*[CR(9,9)-CR(11,9)]$ $X(3,1)=X(3,1)-P*P*[CR(9,8)+CR(11,10)-CR(9,10)-CR(11,8)]$ $X(2,3)=X(2,3)-P*[CR(10,9)-CR(10,11)]$ $X(3,2)=X(3,2)-P*[CR(9,10)-CR(11,10)]$ $X(3,3)=X(3,3)-P*P*[CR(9,9)+CR(11,11)-CR(9,11)-CR(11,9)]$ $X(2,5)=X(2,5)-P*[CR(10,10)-CR(10,12)]$ $X(3,4)=X(3,4)-P*[CR(9,11)-CR(11,11)]$ $X(3,5)=X(3,5)-P*P*[CR(9,10)+CR(11,12)-CR(9,12)-CR(11,10)]$ $X(2,7)=X(2,7)-P*[CR(10,11)-CR(10,13)]$ $X(3,6)=X(3,6)-P*[CR(9,12)-CR(11,12)]$ $X(3,7)=X(3,7)-P*P*[CR(9,11)+CR(11,13)-CR(9,13)-CR(11,11)]$ $X(4,1)=X(4,1)-P*[CR(11,8)-CR(11,10)]$ $X(5,0)=X(5,0)-P*[CR(10,9)-CR(12,9)]$ $X(5,1)=X(5,1)-P*P*[CR(10,8)+CR(12,10)-CR(10,10)-CR(12,8)]$ $X(4,3)=X(4,3)-P*[CR(11,9)-CR(11,11)]$ $X(5,2)=X(5,2)-P*[CR(10,10)-CR(12,10)]$ $X(5,3)=X(5,3)-P*P*[CR(10,9)+CR(12,11)-CR(10,11)-CR(12,9)]$ $X(4,5)=X(4,5)-P*[CR(11,10)-CR(11,12)]$ $X(5,4)=X(5,4)-P*[CR(10,11)-CR(12,11)]$ $X(5,5)=X(5,5)-P*P*[CR(10,10)+CR(12,12)-CR(10,12)-CR(12,10)]$ $X(4,7)=X(4,7)-P*[CR(11,11)-CR(11,13)]$ $X(5,6)=X(5,6)-P*[CR(10,12)-CR(12,12)]$ $X(5,7)=X(5,7)-P*P*[CR(10,11)+CR(12,13)-CR(10,13)-CR(12,11)]$ $X(6,1)=X(6,1)-P*[CR(12,8)-CR(12,10)]$ $X(7,0)=X(7,0)-P*[CR(11,9)-CR(13,9)]$ $X(7,1)=X(7,1)-P*P*[CR(11,8)+CR(13,10)-CR(11,10)-CR(13,8)]$ $X(6,3)=X(6,3)-P*[CR(12,9)-CR(12,11)]$ $X(7,2)=X(7,2)-P*[CR(11,10)-CR(13,10)]$ $X(7,3)=X(7,3)-P*P*[CR(11,9)+CR(13,11)-CR(11,11)-CR(13,9)]$ $X(6,5)=X(6,5)-P*[CR(12,10)-CR(12,12)]$ $X(7,4)=X(7,4)-P*[CR(11,11)-CR(13,11)]$ $X(7,5)=X(7,5)-P2*CR(11,10)+CR(13,12)-CR(11,12)-CR(13,10)]$ $X(6,7)=X(6,7)-P*[CR(12,11)-CR(12,13)]$ $X(7,6)=X(7,6)-P*[CR(11,12)-CR(13,12)]$ $X(7,7)=X(7,7)-P*P*[CR(11,11)+CR(13,13)-CR(11,13)-CR(13,11)]$

Next, substitution for the CR's in terms of BR's can be made using the formulas for the wavelet transform equations previously developed.

The next task is to substitute for the BR(_,_)'s and to convert to the variables in Listing 0. As before Aj=1/8192. This produces the following for the particular Z(5,3) modification:

This is the general process for determination of each of the 48 modifications stemming from the C-level coefficients.

The following table provides the Input/Output matrix values for each of the four groups. Each value is to be multiplied by 1/8192 in all four groups.

| GROUP 1 | | | | | | | | |
|---|---|---|---|---|---|---|---|---|
| | CE3 | CE4 | RE3 | RE4 | DI1 | DH1 | DV1 | OD1 |
| ZN(0, 2) | −1024 | −128 | 0 | 0 | 0 | 0 | 0 | 0 |
| ZN(0, 4) | −384 | −64 | 0 | 0 | 0 | 0 | 0 | 0 |
| ZN(0, 6) | −640 | −96 | 0 | 0 | 0 | 0 | 0 | 0 |
| ZN(2, 0) | 0 | 0 | −1024 | −128 | 0 | 0 | 0 | 0 |
| ZN(4, 0) | 0 | 0 | −384 | −64 | 0 | 0 | 0 | 0 |
| ZN(6, 0) | 0 | 0 | −640 | −96 | 0 | 0 | 0 | 0 |
| ZN(2, 2) | 112 | 14 | 112 | 14 | −128 | 16 | 16 | −2 |
| ZN(2, 4) | 42 | 7 | 40 | 5 | −48 | 8 | 6 | −1 |
| ZN(4, 2) | 40 | 5 | 42 | 7 | −48 | 6 | 8 | −1 |
| ZN(4, 4) | 15 | 2.5 | 15 | 2.5 | −18 | 3 | 3 | −.5 |
| ZN(2, 6) | 70 | 10.5 | 68 | 8.5 | −80 | 12 | 10 | −1.5 |
| ZN(6, 2) | 68 | 8.5 | 70 | 10.5 | −80 | 10 | 12 | −1.5 |
| ZN(4, 6) | 25 | 3.75 | 25.5 | 4.25 | −30 | 4.5 | 5 | −.75 |
| ZN(6, 4) | 25.5 | 4.25 | 25 | 3.75 | −30 | 5 | 4.5 | −.75 |
| ZN(6, 6) | 42.5 | 6.375 | 42.5 | 6.375 | −50 | 7.5 | 7.5 | −1.125 |

| GROUP 2 | | | | | | |
|---|---|---|---|---|---|---|
| | CO1 | CO2 | DI2 | DH2 | DV2 | OD2 |
| ZN(0, 1) | −2048 | 0 | 0 | 0 | 0 | 0 |
| ZN(0, 3) | −1280 | 128 | 0 | 0 | 0 | 0 |
| ZN(0, 7) | −672 | 80 | 0 | 0 | 0 | 0 |
| ZN(0, 5) | −160 | 80 | 0 | 0 | 0 | 0 |
| ZN(2, 1) | 224 | 0 | −256 | 0 | 32 | 0 |
| ZN(4, 1) | 80 | 0 | −96 | 0 | 16 | 0 |
| ZN(6, 1) | 136 | 0 | −160 | 0 | 24 | 0 |
| ZN(2, 3) | 140 | −14 | −160 | 16 | 20 | −2 |
| ZN(2, 7) | 73.5 | −8.75 | −84 | 10 | 10.5 | −1.25 |
| ZN(2, 5) | 17.5 | −8.75 | −20 | 10 | 2.5 | −1.25 |
| ZN(4, 3) | 50 | −5 | −60 | 6 | 10 | −1 |
| ZN(4, 7) | 26.25 | −3.125 | −31.5 | 3.75 | 5.25 | −.625 |
| ZN(4, 5) | 6.25 | −3.125 | −7.5 | 3.75 | 1.25 | −.625 |
| ZN(6, 3) | 85 | −8.5 | −100 | 10 | 15 | −1.5 |
| ZN(6, 5) | 10.625 | −5.3125 | −12.5 | 6.25 | 1.875 | −.9375 |
| ZN(6, 7) | 44.625 | −5.3125 | −52.5 | 6.25 | 7.875 | −.9375 |

GROUP 3

|        | RO1    | RO2     | DI3    | DH3   | DV3  | OD3    |
|--------|--------|---------|--------|-------|------|--------|
| ZN(1,0)| −2048  | 0       | 0      | 0     | 0    | 0      |
| ZN(3,0)| −1280  | 128     | 0      | 0     | 0    | 0      |
| ZN(7,0)| −672   | 80      | 0      | 0     | 0    | 0      |
| ZN(5,0)| −160   | 80      | 0      | 0     | 0    | 0      |
| ZN(1,2)| 224    | 0       | −256   | 32    | 0    | 0      |
| ZN(1,4)| 80     | 0       | −96    | 16    | 0    | 0      |
| ZN(1,6)| 136    | 0       | −160   | 24    | 0    | 0      |
| ZN(3,2)| 140    | −14     | −160   | 20    | 16   | −2     |
| ZN(7,2)| 73.5   | −8.75   | −84    | 10.5  | 10   | −1.25  |
| ZN(5,2)| 17.5   | −8.75   | −20    | 2.5   | 10   | −1.25  |
| ZN(3,4)| 50     | −5      | −60    | 10    | 6    | −1     |
| ZN(7,4)| 26.25  | −3.125  | −31.5  | 5.25  | 3.75 | −.625  |
| ZN(5,4)| 6.25   | −3.125  | −7.5   | 1.25  | 3.75 | −.625  |
| ZN(3,6)| 85     | −8.5    | −100   | 15    | 10   | −1.5   |
| ZN(5,6)| 10.625 | −5.3125 | −12.5  | 1.875 | 6.25 | −.9375 |
| ZN(7,6)| 44.625 | −5.3125 | −52.5  | 7.875 | 6.25 | −.9375 |

GROUP 4

|        | DI4     | DH4    | DV4    | OD4    |
|--------|---------|--------|--------|--------|
| ZN(1,1)| −512    | 0      | 0      | 0      |
| ZN(1,3)| −320    | 32     | 0      | 0      |
| ZN(1,5)| −40     | 20     | 0      | 0      |
| ZN(1,7)| −168    | 20     | 0      | 0      |
| ZN(3,1)| −320    | 0      | 32     | 0      |
| ZN(5,1)| −40     | 0      | 20     | 0      |
| ZN(7,1)| −168    | 0      | 20     | 0      |
| ZN(3,3)| −120    | 20     | 20     | −2     |
| ZN(3,5)| −25     | 12.5   | 2.5    | −1.25  |
| ZN(5,3)| −25     | 2.5    | 12.5   | −1.25  |
| ZN(3,7)| −105    | 12.5   | 10.5   | −1.25  |
| ZN(7,3)| −105    | 10.5   | 12.5   | −1.25  |
| ZN(5,5)| −3.125  | 1.5625 | 1.5625 | −.78125|
| ZN(5,7)| −13.125 | 1.5625 | 6.5625 | −.78125|
| ZN(7,5)| −13.125 | 6.5625 | 1.5625 | −.78125|
| ZN(7,7)| −55.125 | 6.5625 | 6.5625 | −.78125|

After each modification is calculated it must be subtracted added from the indicated ZN(_,_) at the encoder and added to the indicated ZN(_,_) at the decoder.

It is possible to calculate these modifications in a FAST way wherein calculations already done can support subsequent calculations. It is also possible to form the calculations such that only trivial multiplications implemented with binary shifts are required. In this way the number of additions required per term is about four, including the discussed preprocessor and the final addition to the appropriate ZN(_,_). Listings 1, 2, 3 and 4 give FAST sets of equations that accomplish the Input/Output matrices. Again, the designator 'P' equals ⅛.

Listing 1

Group 1

$Q1=CE3+P*CE4:Z(0,2)=Z(0,2)-P*Q1'$     ZN(0,2)

$Q2=Q1-P*2*CE3:Z(0,1)=4*P2*Q2'$     ZN(0,4)

$Q3=Q2+4*P*Q1:Z(0,3)=Z(0,3)-4*P2*Q3'$     ZN(0,6)

$Q4=RE3+P*RE4:Z(2,0)=Z(2,0)-P*Q4'$     ZN(2,0)

$Q5=Q4-P*2*RE3:Z(1,0)=Z(1,0)-4*P2*Q5'$     ZN(4,0)

$Q6=Q5+4*P*Q4:Z(3,0)=Z(3,0)-4*P2*Q6'$     ZN(6,0)

$Q7=DH1+DV1$ $Q8=CE3+RE3$ $Q9=-Q7/8+OD1/64$ $Q10=Q9+DI1$ $Q11=Q1+Q4$ $Q12=-Q11*(1-P)$ $Q13=Q12+Q10:Z(2,2)=Z(2,2)-P2*Q13'$     ZN(2,2)

$Q14=DI1-Q8$ $Q15=Q13-2*P*Q14$ $Q16=2*P2*(-CE3+RE4):Q17=Q16+2*P2*DV1$ $Q18=2*P2*(-RE3+CE4):Q19=Q18+2*P2*DH1$ $Q20=Q15+Q17:Z(2,1)-4*P3*Q20'$     ZN(2,4)

$Q21=Q15+Q19:Z(1,2)=Z(1,2)-4*P3*Q21'$     ZN(4,2)

$Q22=CE4+RE4$ $Q23=P2*(Q22+OD1)$ $Q24=Q15-2*P*Q15$ $Q25=2*P*Q23+Q24:Z(1,1)-2*P3*Q25'$     ZN(4,4)

$Q26=Q20+Q13/2:Z(2,3)=Z(2,3)-4*P3*Q26'$     ZN(2,6)

$Q27=Q21+Q13/2:Z(3,2)=Z(3,2)-4*P3*Q27'$     ZN(6,2)

$Q28=Q25+Q21/2:Z(1,3)=Z(1,3)-2*P3*Q28'$     ZN(4,6)

$Q29=Q25+Q20/2:Z(3,1)=Z(3,1)-2*P3*Q29'$     ZN(6,4)

$Q30=Q29+.5*Q27:Z(3,3)=Z(3,3)-2*P3*Q30'$     ZN(6,6)

Listing

Group 2

$Z(0,4)=Z(0,4)-2*P*CO1'$     ZN(0,1)

$Q1=CO1+2*P*CO1$ $Q2=Q1-P*CO2:Z(0,6)=Z(0,6)-P*Q2'$     ZN(0,3)

$Q3=2*CO1-CO2$ $Q4=Q2+2*P2*Q3:Z(0,7)=Z(0,7)-4*P2*Q4'$     ZN(0,7)

$Q5=Q4-8*P*CO1:Z(0,5)=Z(0,5)-4*P2*Q5'$     ZN(0,5)

$Q6=CO1-D12$ $Q7=CO1-DV2$ $Q9=CO2-DH2$ $Q12=-CO2+OD2$ $Q8=P*Q7-Q6:Z(2,4)=Z(2,4)-2*P2*Q8'$     ZN(2,1)

$Q10=Q8+2*P*Q6:Z(1,4)=Z(1,4)-P2*Q10'$     ZN(4,1)

$Q13=Q10+4*P*Q8:Z(3,4)=Z(3,4)-P2*Q13'$ $Q11=Q9+P*Q12$ $Q14=Q8+P*Q11$ $Q15=Q14+2*P*Q8:Z(2,6)=Z(2,6)-P2*Q15'$ $ZN(2,3)$ $Q16=Q14+2*P*Q15:Z(2,7)=Z(2,7)-4*P3*Q16'$ $ZN(2,7)$ $Q17=Q16-Q8:Z(2,5)=Z(2,5)-4*P3*Q17'$ $ZN(2,5)$ $Q18=2*P*(Q6-P*Q9):Q19=Q14Q18$ $Q20=Q19+2*P*Q10:Z(1,6)=Z(1,6)-4*P3*Q20'$ $ZN(4,3)$ $Q21=Q19+2*P*Q20:Z(1,7)=Z(1,7)-2*P3*Q21'$ $ZN(4,7)$ $Q22=Q21-Q10:Z(1,5)=Z(1,5)-2*P3*Q22'$ $ZN(4,5)$ $Q23=Q20+4*P*Q15:Z(3,6)=Z(3,6)-4*P3*Q23'$ $ZN(6,3)$ $Q24=Q22+4*P*Q17:Z(3,5)=Z(3,5)-2*P3*Q24'$ $ZN(6,5)$ $Q25=Q21+4*P*Q16:Z(3,7)=Z(3,7)-2*P3*Q25'$ $ZN(6,7)$

Listing 3

Group 3

$Z(4,0)=Z(4,0)-2*P*RO1'$ $ZN(1,0)$ $Q1=RO1+2*P*RO1$ $Q2=Q1-P*RO2:Z(6,0)=Z(6,0)-P*Q2'$ $ZN(3,0)$ $Q3=2*RO1-RO2$ $Q4=Q2+2*P2*Q3:Z(7,0)=Z(7,0)-4*P2*Q4'$ $ZN(7,0)$ $Q5=Q4-8*P*RO1:Z(5,0)=Z(5,0)-4*P2*Q5'$ $ZN(5,0)$ $Q6=RO1-DI3$ $Q7=RO1-DH3$ $Q9=RO2-DV3$ $Q12=-RO2+OD3$ $Q8=P*Q7-Q6:Z(4,2)=Z(4,2)-2*P2*Q8'$ $ZN(1,2)$ $Q10=Q8+2*P*Q6:Z(4,1)=Z(4,1)-P2*Q10'$ $ZN(1,4)$ $Q13=Q10+4*P*Q8:Z(4,3)=Z(4,3)-P2*Q13'$ $ZN(1,6)$ $Q11=Q9+P*Q12$ $Q14=Q8+P*Q11$ $Q15=Q14+2*P*Q8:Z(6,2)=Z(6,2)-P2*Q15'$ $ZN(3,2)$ $Q16=Q14+2*P*Q15$ $Z(7,2)=Z(7,2)-4*P3*Q16'$ $ZN(7,2)$ $Q17=Q16-Q8:Z(5,2)=Z(5,2)-4*P3*Q17'$ $ZN(5,2)$ $Q18=2*P*(Q6-P*Q9):Q19=Q14+Q18$ $Q20=Q19+2*P*Q10:Z(6,1)=Z(6,1)-4*P3*Q20'$ $ZN(3,4)$ $Q21=Q19+2*P*Q20:Z(7,1)=Z(7,1)-2*P3*Q21'$ $ZN(7,4)$ $Q22=Q21-Q10:Z(5,1)=Z(5,1)-2*P3*Q22'$ $ZN(5,4)$ $Q23=Q20+4*P*Q15:Z(6,3)=Z(6,3)-4*P3*Q23'$ $ZN(3,6)$ $Q24=Q22+4*P*Q17:Z(5,3)=Z(5,3)-2*P3*Q24'$ $ZN(5,6)$ $Q25=Q21+4*P*Q16:Z(7,3)=Z(7,3)-2*P3*Q25'$ $ZN(7,6)$

Listing 4

Group 4

$Z(4,4)=Z(4,4)-4*P*P*D14'$ $ZN(1,1)$ $Q1=D14*(1+2*P)$ $Q2=Q1-P*DH4:Z(4,6)=Z(4,6)-2*P*P*Q2'$ $ZN(1,3)$ $Q3=.25*Q2-P*DH4:Z(4,5)=Z(4,5)-P*P*Q3' ZN(1,5)$ $Q4=D14+Q3:Z(4,7)=Z(4,7)-P*P*Q4'$ $ZN(1,7)$ $Q5=Q1-P*DV4:Z(6,4)=Z(6,4)-2*P*P*Q5'$ $ZN(3,1)$ $Q6=.25*Q5-P*DV4:Z(5,4)=Z(5,4)-P*P*Q6'$ $ZN(5,1)$ $Q7=D14+Q6:Z(7,4)=Z(7,4)-P*P*Q7'$ $ZN(7,1)$ $Q8=Q3+Q7$ $Q9=P*(OD4-4*D14)$ $Q10=Q8+P*Q9:Z(6,6)=Z(6,6)-P*P*Q10'$ $ZN(3,3)$ $Q11=Q10-Q1$ $Q12=Q11-Q6$ $Q13=Q11-Q3$ $Q14=Q10/4+Q12:Z(6,5)=Z(6,5)-4*P3*Q14'$ $ZN(3,5)$ $Q15=Q10/4'Q13:Z(5,6)=Z(5,6)-4*P3*Q15'$ $ZN(5,3)$ $Q16=Q5+Q14:Z(6,7)=Z(6,7)-4*P3*Q16'$ $ZN(3,7)$ $Q17=Q2+Q15:Z(7,6)=Z(7,6)-4*P3*Q17'$ $ZN(7,3)$ $Q18=Q12+Q13$ $Q19=OD4/16+Q10/4$ $Q20=Q18/4+Q19/4:Z(5,5)=Z(5,5)-2*P3*Q20'$ $ZN(5,5)$ $Q21=Q20+Q6:Z(5,7)=Z(5,7)-2*P3*Q21'$ $ZN(5,7)$ $Q22=Q20+Q3:Z(7,5)=Z(7,5)-2*P3*Q22'$ $ZN(7,5)$ $Q23=Q21+Q4:Z(7,7)=Z(7,7)-2*P3*Q23'$ $ZN(7,7)$

Region Two of the transform in two dimensions is processed in the same manner as in one dimension using the equations applicable to the two-dimensional case discussed previously. In Region Two the WT transform coefficients are not discarded but are coded for transmission to the Decoder in the Intra-frame mode. Region Two is not used in the Interframe mode of two-dimensional video signals.

Two-Dimensional Edge Processing

A method was previously presented for determination of modifications near the boundaries of the one dimensional transform case. Values for scaled coefficients (the block average value of eight points in the transform), which are outside the data space, are required to calculate coefficient modification close by the edges. The criterion for defining such values was the extrapolation of a slope determined nearby from available block data values. In the two-dimensional case there exist both edges and corners. The edges can be treated in the same way as the one-dimensional case by considering a 1D line of block data perpendicular to the edge containing the unknown block data value outside of the known block data area. Along the left and right picture edges this line is in the horizontal direction. Along the top and bottom edges this line is in the vertical direction. In both directions two additional block data values are created outside the picture area adjacent to every real block data value along the edges.

Figure 18:
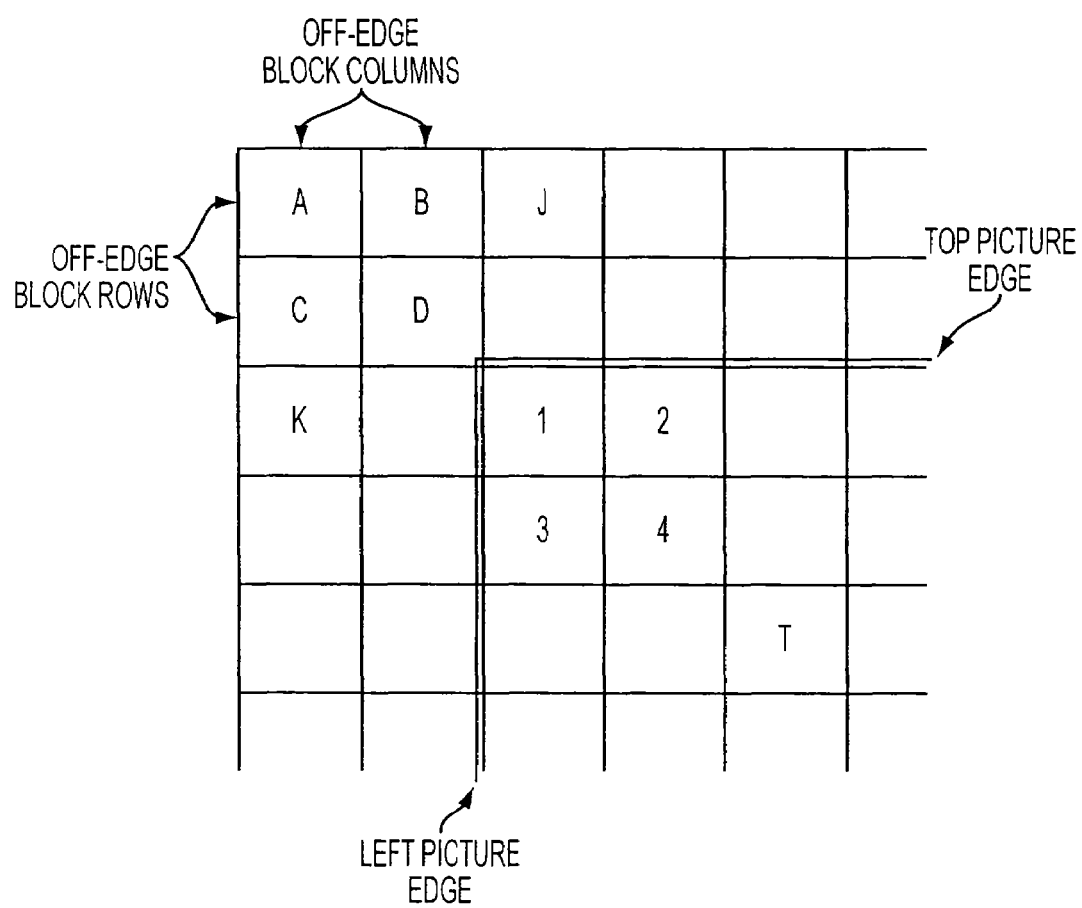
FIG. 18 shows the two-dimensional blocks at the upper left corner of a picture where off-edge corner values A, B, C and D are given values in terms of actual block values inside the picture corners. These are the extra values over and above ones calculated with reference to FIG. 10 for the one-dimensional case.

The four corners of the 2D space have four block data values that are not in a horizontal or vertical line with any block data values inside the data space. A new method is used for extrapolating these values. FIG. 18 shows the top left corner of the rectangular picture area. Blocks labeled A, B, C, and D are the non-actual corner blocks to be determined by extrapolation and used for processing blocks labeled 1, 2, 3 and 4 that are inside the picture area. The processing results in the prediction of the ac coefficients for each of those four blocks.

The 'A' block value is used only for the four ODx calculations for Block 1. The 'B' block value is used for ODx calculations for Block 2 and the DVx calculations for Block 1. Similarly, the 'C' block value is used for the ODx calculations for Block 3 and the DHx calculations for Block 1. Finally, the 'D' value is used for the ODx calculations for Block 4, the DVx calculations for Block 3, the DHx calculations for Block 2 and the Dlx calculations for Block 1.

The 'A' and 'D' block values are calculated the same way that that two off-edge elements were calculated in the 1-D case but now done along a diagonal line. The 1-D case to be used is shown in FIG. 10*b*. The 'D' corner block is now calculated as A(4) shown in FIG. 10*b*. The 'A' block in FIG. 18 is now calculated as A(5) in FIG. 10*b*. The elements A(1), A(2) and A(3) in FIG. 10*b* correspond in the present case to blocks 'T', '4' and '1' respectively. With reference to FIG. 18 the equations for the block values are, 'D'=2*'1'−½*'4'−¼*['T'+'1'], and

'A'=−'4'+2*'1'+½*['1'−'T'].

The final two block values, 'B' and 'C', are calculated by interpolation of the block values on either side of them. Block values 'J' and 'K' are used for this purpose. Both 'J' and 'K' were extrapolated from block values within the picture using the technique in FIG. 10*b* in the manner recited above and are therefore available for use. Specifically, 'B'=½*['A'+'J'], and

'C'=½*['A'+'K'].

This completes the calculation for the four corner blocks in the upper left corner. Similarly, corner block values can be calculated at the lower left, the upper right and the lower right by appropriately reversing the horizontal, vertical or both direction(s) of the diagonal line calculations.

What is claimed is:

1. A waveform coding apparatus for input data compression and reconstruction of said data using the combination of an N-band wavelet transform (WT) and a blocked transform (BT) to suppress blocking artifacts at block boundaries due to quantization of block transform coefficients at an encoder and an N-band inverse wavelet transform (IWT) and an inverse blocked transform (IBT) at the decoder used to reconstruct an output at the decoder being a replica of said input data at the encoder wherein, a) said WT and said IWT form an exact reconstruction transform pair, and said BT and said IBT form an exact reconstruction pair, b) input data is subdivided into strips in a multiple-strip environment for the one-dimensional case or into square blocks for the two-dimensional case in a multiple-block environment such that each strip contains K points or each block contains K-times-K points where K is equal to two to the Nth power, where N is equal to the number of bands in said N-band WT, and the total number of wavelet bands, L, is herein equal to N, c) said BT has one output transform coefficient being the scaled average value of the K, for a one-dimensional, or K-times-K, for two-dimensional, input data points, d) an N-band WT centered on said strip or on said block is performed using an input data from said strip or said block and on an input data required from neighborhood blocks as defined by the WT to calculate and save the value of the scaling transform coefficient of the final band while discarding the analysis coefficients of the N bands, e) an N-band IWT, using only the scaling transform coefficient generated by said centered WT and the scaling transform coefficients of neighboring blocks as required by said IWT, reconstructs a low-pass filtered version of said input data of K points for a strip or K-times-K points for a block, f) said N-band IWT is defined to create a sharp cut-off low-pass filter response in the frequency domain using the scaling transform coefficients from the final band of the WT as inputs consistent with the WT and the IWT being an exact reconstruction pair, g) the K-point one-dimensional, or the K-times-K two-dimensional, low-pass filtered data is subtracted from said input data on a point-by-point basis to obtain a high-pass filtered version of said input data, h) said high-pass filtered data is applied to said BT that in turn generates as outputs (K−1) ac. transform coefficients in one dimension or ((K-times-K)−1) transform coefficients in two dimensions, i) said ac. BT coefficients and said wavelet scaling transform coefficient of the final band are saved as compact transform domain output set of a transform pair encoder for one block and then outputs multiple block sets to subsequent coefficient quantization and encoding-for-transmission operations of prior art transform compression systems, j) a transform pair decoder receives said multiple block sets from said transform pair encoder, each block having one wavelet scaling transform coefficient and (K−1), one-dimensional or ((K-times-K)−1) two-dimensional, ac. block transform coefficients as a compact set, applying said ac. coefficients for one block to an IBT, and applying said wavelet scaling transform coefficient for the same block and additional wavelet scaling transform coefficients from neighboring blocks as required by the IWT, k) an IWT is calculated from said wavelet scaling transform coefficients to reconstruct a low-pass version of the strip or block of data, l) an IBT is calculated from said ac. block transform coefficients to obtain a high-pass version of the strip or block of data, and m) said low-pass version of the data is added, point-by-point, to said high-pass version of the data to form the decoder output data for the strip or block.

2. A waveform coding apparatus in accordance with claim 1, wherein the BT is selected from the group consisting of a discrete cosine transform, a discrete sine transform, a modified discrete sine transform, an approximation to any of these as an integer transform, and a Walsh-Hadamard transform.

3. A waveform coding apparatus in accordance with claim 1, wherein the WT is an integer transform.

4. A waveform coding apparatus for input data compression and reconstruction of said input data using the combination of an N-band wavelet transform (WT) and a blocked transform (BT) to suppress blocking artifacts at block boundaries due to quantization of block transform coefficients at an encoder and an N-band inverse wavelet transform (IWT) and an inverse blocked transform (IBT) at the decoder used to reconstruct an output at the decoder being a replica of said input data at the encoder wherein,
 a) said WT and said IWT form an exact reconstruction transform pair, and said BT and said IBT form an exact reconstruction pair,
 b) an input data is subdivided into strips in a multiple-strip environment for the one-dimensional case or into square blocks for the two-dimensional case in a multiple-block environment such that each strip contains K points or each block contains K-times-K points where K is equal to two to the Nth power, where N is equal to the number of bands in said N-band WT, and the total number of wavelet bands, L, is herein equal to N,
 c) said BT has one output transform coefficient being the scaled average value of the K, for one dimension, or K-times-K, for two dimensions, input data points,
 d) a Walsh-Hadamard Transform (WHT) BT is performed on said input data for said strip or said block producing at its outputs one scaled dc. coefficient and (K−1) WHT ac. coefficients in one dimension or ((K-times-K)−1) WHT ac. coefficients in two dimensions,
 e) a blocks processor receives said scaled dc. coefficient from one output of said WHT and said scaled dc. coefficients from neighboring blocks, all said scaled dc. coefficients being equal to said final band scaled coefficients of WTs of their respective blocks,
 f) said blocks processor employs a predetermined calculation matrix particular to said WHT and said WT selected for use to calculate (K−1) for one-dimensional, or ((K-times-K)−1) two dimensional, WHT modification coefficient in response to said scaled dc. coefficient inputs,
 g) said WHT modification coefficients from said blocks processor are applied to the minus input of a subtractor whereas said ac coefficients from said WHT are applied to the plus input of said subtractor the output of which being modified WHT ac. coefficients,
 h) modified WHT ac. coefficients are applied to a transformation matrix that converts said modified WHT ac. transform coefficients to said ac. BT coefficients,
 i) said ac. BT coefficients and said scaled dc. coefficient from the same block are saved as a compact transform domain output set of said strip or block of a transform pair encoder for one block and output to subsequent coefficient quantization and encoding-for-transmission operations of prior art transform compression systems,
 j) a transform pair decoder receives said compact transform domain output set from said transform pair encoder, each block having one scaled dc. transform coefficient being said BT dc. coefficient if L equals N and being derived from the IWT Region II Processor if L is greater than N and (K−1) in one-dimensional or ((K-times-K)−1) two-dimensional, ac. BT coefficients as a compact set, applying said ac. coefficients for one block to an inverse transformation matrix, said inverse transformation matrix performing the inverse operation of said transformation matrix, producing at its output a set of WHT ac. coefficients,
 k) a blocks processor being identical to said transform pair encoder blocks processor operates on dc. block transform coefficients from the present block and neighborhood blocks to produce at its output WHT modification coefficients identical to said WHT modification coefficient produced at said transform pair encoder,
 l) an adder unit adds said WHT ac. coefficients output by said inverse transformation matrix and said WHT modification coefficient produced by said blocks processor to provide final WHT coefficients to a subsequent inverse WHT (IWHT), and
 m) an IWHT unit converts said final WHT transform coefficients from said adder to the data domain output data of the transform pair decoder for one said strip or block.

5. A waveform coding apparatus in accordance with claim 4, wherein the BT is selected from the group consisting of a discrete cosine transform, a discrete sine transform, a modified discrete sine transform, an approximation to any of these as an integer transform, and a Walsh-Hadamard transform.

6. A waveform coding apparatus in accordance with claim 4, wherein the WT is an integer transform.

7. A waveform coding system for input data compression and reconstruction of said input data, comprising a transform pair, said transform pair being the combination of a blocked transform (BT) and a wavelet transform (WT) to suppress blocking artifacts at block boundaries due to block transform coefficient quantization at an encoder, and an inverse BT and an inverse WT at a decoder using as input data a combination of WT and BT coefficients output from said encoder to reconstruct an output at said decoder, said output being a replica of said input data at said encoder, wherein at least one of the encoder coefficients is a WT-type and the remaining encoder coefficients are BT-types, and said WT and said inverse WT form a WT exact reconstruction pair, and said BT and said Inverse BT form a BT exact reconstruction pair.

8. A waveform coding system in accordance with claim 7, wherein a zero frequency analysis term of the WT and a zero frequency term of the BT are calculated identically, both terms being equal to each other.

9. A waveform coding system in accordance with claim 7, wherein one-dimensional input data is subdivided into strips in a multi-strip environment such that each strip contains K points, wherein K is equal to two to the Nth power, and wherein N equals the number of bands in an N-band wavelet transform, said transform pair to operate on one of said subdivided strips at a time, said operation to borrow certain terms from neighboring strips as needed for WT and inverse WT calculations.

10. A waveform coding system in accordance with claim 7, wherein two-dimensional input data is subdivided into square blocks such that each block contains K-times-K points, wherein K is equal to two to the Nth power, and wherein N equals the number of bands in an N-band wavelet transform, said transform pair to operate on one of said subdivided blocks at a time, said operation to borrow certain terms from neighboring blocks as needed for WT and inverse WT calculations.

11. A waveform coding system in accordance with claim 7, the encoder further comprising a combination of a one-dimensional transform pair and a one-dimensional second WT, and the decoder further comprising a combination of a one-dimensional inverse WT and a one-dimensional inverse transform pair, wherein the encoder is to operate first in a Region I consisting of N bands of a first WT of the transform pair, with a strip of K points wherein K is equal to two to the Nth power, and to operate secondly in a Region II consisting of bands N+1 through band L, wherein only the second WT is operative, the input data for Region II being band N first WT scaled analysis coefficients of Region I and the output data for Region II being all band N+1 through band L second WT coefficients and band L scaled analysis second WT coefficients, and an encoder output of the combined transform pair and second WT being, a) any non-zero frequency first WT coefficients from Region I, b) all BT coefficients from Region I that are not replaced by first WT type coefficients in the transform pair design, and c) all second WT coefficients in Region II in band N+1 through band L and the band L analysis scaled second WT coefficients, each encoder output to be sent to the decoder for data reconstruction, wherein the inverse WT is to operate in bands L through N+1 using received Region II second WT coefficients to calculate and output band N Region I scaled analysis coefficients, and wherein the inverse transform pair is to operate in Region I using first, the band N Region I scaled analysis coefficients received from the inverse WT and secondly, the WT and BT coefficients generated in Region I by said transform pair and received as decoder inputs, the outputs of the Region I inverse transform pair being a data reconstruction of encoder input data.

12. A waveform coding system in accordance with claim 7, the encoder further comprising a combination of a two-dimensional transform pair and a two-dimensional second WT, and the decoder further comprising a combination of a two-dimensional inverse WT and a two-dimensional inverse transform pair, wherein the encoder is to operate first in a Region I consisting of N bands of a first WT of the transform pair, with a block of K-times-K points wherein K is equal to two to the Nth power, and to operate secondly in a Region II consisting of bands N+1 through band L, wherein only the second WT is operative, the input data for Region II being band N first WT scaled analysis coefficients of Region I and the output data for Region II being all band N+1 through band L second WT coefficients and band L scaled analysis second WT coefficients, and an encoder output of the combined transform pair and second WT being, a) any non-zero frequency first WT coefficients from Region I, b) all BT coefficients from Region I that are not replaced by first WT type coefficients in the transform pair design, and c) all second WT coefficients in Region II in band N+1 through band L and the band L analysis scaled second WT coefficients, said encoder output to be sent to the decoder for data reconstruction, wherein the inverse WT is to operate in bands L through N+1 using received Region II second WT coefficients to calculate and output band N Region I scaled analysis coefficients, and wherein the inverse transform pair is to operate in Region I using first, the band N Region I scaled analysis coefficients received from the inverse WT and secondly, both WT and BT coefficients generated in Region I by said transform pair and received as decoder inputs, the outputs of the Region I inverse transform pair being a data reconstruction of encoder input data.

13. A waveform coding system in accordance with claim 7, wherein the BT is selected from the group consisting of a discrete cosine transform, a discrete sine transform, a modified discrete sine transform, an approximation to any of these as an integer transform, or a Walsh-Hadamard transform.

14. A waveform coding system in accordance with claim 9, wherein the number of output encoder coefficients from a strip of K input data points in the encoder is equal to the number of the K input data points, thereby forming a compact set using the minimum number of output frequency points for the number of input data points.

15. A waveform coding system in accordance with claim 10, wherein the number of output encoder coefficients from a block of K-times-K input data points in the encoder is equal to the number of the K-times-K input data points, thereby forming a compact set using the minimum number of output frequency points for the number of input data points.

16. A waveform coding system in accordance with claim 9, wherein the one-dimensional input data comprises a data edge having defined input data on a first side of said edge but no defined input data on a second side of said edge, said system to calculate pseudo-WT one-dimensional coefficients on said second side for said WT of said transform pair by extrapolation of WT coefficients based upon actual input data near said edge, both the encoder and the decoder to calculate the pseudo-WT one-dimensional coefficients identically in accordance with predetermined formulas using said WT one-dimensional coefficients, said WT coefficients being available to both the encoder and the decoder without requiring transmission of additional data from the encoder to the decoder.

17. A waveform coding system in accordance with claim 10, wherein the two-dimensional input data comprises a data edge having defined input data on a first side of said edge but no defined input data on a second side of said edge, said system to calculate pseudo-WT two-dimensional coefficients on said second side for said WT of said transform pair by extrapolation of WT coefficients along a line perpendicular to the edge based upon actual input data near said edge, both the encoder and the decoder to calculate the pseudo-WT two-dimensional coefficients identically in accordance with predetermined formulas using said WT two-dimensional coefficients, said WT coefficients being available to both the encoder and the decoder without requiring transmission of additional data from the encoder to the decoder.

18. A waveform coding system in accordance with claim 10, wherein the two-dimensional input data comprises a data corner having defined two-dimensional input data on an inside of said corner but no defined input data around an outside of said corner, said system to calculate pseudo-WT coefficients around said outside of said corner for said WT of said transform pair by extrapolation of WT two-dimensional coefficients inside said corner along a line diagonal to two axes of blocks from inside the corner to outside the corner based upon actual input data near said corner, both the encoder and the decoder to calculate the pseudo-WT coefficients identically in accordance with predetermined formulas using said WT two-dimensional coefficients, said WT coefficients being available to both the encoder and the decoder without requiring transmission of additional data from the encoder to the decoder.

19. A data compression method comprising:
    a) receiving a first subdivided input data into a transform pair encoder, wherein the first subdivided input data is one of one-dimensional (1D) strips and two-dimensional (2D) blocks;
    b) supplying the first subdivided input data to a forward wavelet transform (WT) device;
    c) calculating a forward WT in N bands, using the WT device and the first subdivided input data;
    d) producing at least one WT frequency output coefficient for each of the 1D strips or 2D blocks, using the WT device and the first subdivided input data;

e) supplying the at least one WT frequency output coefficient to a wavelet reconstruction processor as wavelet transform coefficient data;

f) transforming the wavelet transform coefficient data to generate a modified first subdivided input data having an equal number of data points as the first subdivided input data;

g) supplying the modified first subdivided input data and the first subdivided input data to a subtractor device;

h) substracting the modified first subdivided input data from the first subdivided input data, using the subtractor device;

i) supplying a result of the substraction to a forward block transform (BT) device;

j) producing a number of BT frequency coefficients as a BT coefficient output of the transform pair encoder, using the BT device and the supplied result of the subtraction; and k) outputting the at least one WT frequency output coefficient as a WT coefficient output of the transform pair encoder.

20. A data compression method in accordance with claim 19, wherein a zero frequency WT coefficient and a zero frequency BT coefficient are equal.

21. A data compression method comprising:

a) receiving a first subdivided input data into a transform pair encoder, wherein the first subdivided input data is one of one-dimensional (1D) strips and two-dimensional (2D) blocks and comprises a number of data points;

b) supplying the first subdivided input data to a forward wavelet transform (WT) device;

c) producing a number of WT frequency output coefficients for each of the 1D strips or 2D blocks, using the WT device and the first subdivided input data;

d) supplying all of the WT frequency output coefficients except for at least one selected WT frequency output coefficient, to a wavelet reconstruction processor as wavelet transform coefficient data;

e) transforming the wavelet transform coefficient data to generate a modified first subdivided input data having an equal number of data points as the first subdivided input data;

f) supplying the modified first subdivided input data to a forward block transform (BT) device;

g) producing a number of BT frequency coefficients as a BT coefficient output of the transform pair encoder, using the BT device and the supplied modified first subdivided input data; and h) outputting all of the WT frequency output coefficients as a WT coefficient output of the transform pair encoder.

22. A data compression method in accordance with claim 19, wherein the at least one selected WT frequency output coefficient is a zero frequency coefficient.

23. A data reconstruction method comprising:

a) receiving a first inut data into a transform pair decoder, wherein the first input data is one of one-dimensional (1D) strips and two-dimensional (2D) blocks, comprises a number of data points, and further comprises a wavelet transform (WT) coefficient output of a transform pair encoder and a block transform (BT) coefficient output of a transform pair encoder, the WT coefficient output being at least one WT coefficient, and the BT coefficient output being a number of BT coefficients equal to the number of data points in the first input data minus the at least one WT coefficient;

b) supplying the BT coefficient output of the first input data to an inverse block transform (IBT) device;

c) producing a number of data points equal to the number of data points in the first input data, using the IBT device and the supplied BT coefficient output;

d) supplying the WT coefficient output of the first input data to an inverse wavelet transform (IWT) device;

e) producing a number of data points equal to the number of data points in the first input data, using the IWT device and the supplied WT coefficient output;

f) supplying the number of data points from the IBT device to an adder device, as a first adder input;

g) supplying the number of data points from the IWT device to the adder device, as a second adder input; and h) adding the data points of the first adder input and the second adder input on a point-by-point basis, to form a final data transform pair decoder output that is a replica of a data input to the transform pair encoder.

24. A data reconstruction method in accordance with claim 23, wherein the inverse BT device is replaced by an inverse T-Matrix device followed by an inverse Walsh-Hadamard transform (WHT) device.

25. A data compression method in accordance with claim 19, wherein the BT device is implemented as a Walsh-Hadamard transform (WHT) device followed by a T-matrix device.

26. A data compression method comprising:

a) receiving a first subdivided input data into a transform pair encoder, wherein the first subdivided input data is one of one-dimensional (1D) strips and two-dimensional (2D) blocks, and comprises a number of data points;

b) supplying the first subdivided input data to a forward Walsh-Hadamard transform (WHT) device;

c) calculating a forward WHT in N bands, using the WHT device and the first subdivided input data;

d) producing a number of WHT frequency output coefficients for each of the 1D strips or 2D blocks, using the WHT device and the first subdivided input data;

e) supplying a WHT zero frequency output coefficient to a blocks processor, the WHT zero frequency output coefficient being equal to WT zero frequency data;

f) transforming the WHT zero frequency coefficient data in the blocks processor to generate a modified set of WHT frequency output coefficients having a number of data points equal to one less than that of the first subdivided input data, the WHT zero frequency coefficient being omitted from the WHT frequency output coefficients;

g) supplying the modified set of WHT frequency output coefficients and the WHT coefficient data having the zero frequency coefficient omitted, to a subtractor device;

h) subtracting the modified set of WHT frequency output coefficients from the WHT coefficient data having the zero frequency coefficient omitted, using the subtractor device;

i) supplying a result of the subtraction to a T-matrix device;

j) producing a number of BT frequency coefficients as a BT coefficient output of the transform pair encoder, using the T-matrix and the supplied result of the subtraction; and k) optionally supplying the WHT zero frequency coefficient to a Region II wavelet transform (WT) device; and l) optionally outputting the WHT zero frequency coefficient as the WT coefficient output of the transform pair encoder when the Region II WT device is not used; and m) optionally outputting all Region II WT coefficients from the Region II WT device.

27. A data compression method in accordance with claim 26, wherein the blocks processor is implemented as an inverse WT device and a second WHT device, using overlay technology to combine the two devices, to efficiently reduce the amount of arithmetic processing required to implement the blocks processor relative to being implemented as the inverse WT device followed in series by the second WHT device.

28. A data reconstruction method comprising:
   a) receiving a first input data into a transform pair decoder, wherein the first input data is one of one-dimensional (1D) strips and two-dimensional (2D) blocks, comprises a number of data points, and further comprises a wavelet transform (WT) coefficient output of a transform pair encoder and a block transform (BT) coefficient output of a transform pair encoder, the WT coefficient output being at least one WT coefficient, and the BT coefficient output being a number of BT coefficients equal to the number of data points in the first input data minus the at least one WT coefficient;
   b) supplying the BT coefficient output of the first input data from the encoder to an inverse transformation matrix (IT-matrix) device;
   c) producing a number of frequency data points equal to the number of points in the first input data, using the IT-matrix device and the supplied BT coefficient output;
   d) supplying an optional Region II WT coefficient output of the first input data to an optional Region II inverse wavelet transform (IWT) device;
   e) supplying the at least one WT coefficient from the encoder when the optional Region II is not used;
   f) supplying the at least one WT coefficient to a blocks processor, as WT coefficient data;
   g) transforming the WT coefficient data to generate a modified WHT coefficient data having a number of frequency data points on a 1D strip or 2D block, using the blocks processor;
   h) supplying the frequency data points from the IT-matrix device to an adder device, as a first adder input;
   i) supplying the modified WHT frequency data points from the blocks processor to the adder device, as a second adder input; and
   j) adding the frequency data points of the first adder input and the second adder input on a point-by-point basis, to form a final transform pair decoder output that is a replica of a data input to the transform pair encoder.

* * * * *

UNITED STATES PATENT AND TRADEMARK OFFICE
CERTIFICATE OF CORRECTION

PATENT NO.        : 7,545,988 B2
APPLICATION NO. : 11/161571
DATED             : June 9, 2009
INVENTOR(S)       : George William Meeker It is certified that error appears in the above-identified patent and that said Letters Patent is hereby corrected as shown below:

Column 51 – Line 57, replace "inut" with --input--.

Signed and Sealed this

Eighteenth Day of August, 2009

David J. Kappos
*Director of the United States Patent and Trademark Office*

UNITED STATES PATENT AND TRADEMARK OFFICE
CERTIFICATE OF CORRECTION

PATENT NO. : 7,545,988 B2
APPLICATION NO. : 11/161571
DATED : June 9, 2009
INVENTOR(S) : George William Meeker It is certified that error appears in the above-identified patent and that said Letters Patent is hereby corrected as shown below:

In column 23, line 15, "A3=(5*π/16)" should read, --A3=COS(5*π/16)--
In column 23, line 27, ".513280" should read, -- –.513280--

In column 26, line 48, "coefficient called A(i)" should read, --coefficient called A(1)--

In column 29, line 20, the formula should read,
    --A(5)=–M2 * A(2) + (M2–M1) * A(3) + (1 + M1) * A(4)--

In column 31, line 33, the left side of the formula should read, --CD(M,N) =--

In column 34, lines 33 & 34 should read,
    --FC4 = P * P * (A(M–1,N–1) + A(M+1,N+1) – A(M–1,N+1) – A(M+1,N–1))
    + AC(M,N,3)--

In column 34, starting on line 35 the four formulas should read,
    --BR(M1 – 1,N1 – 1) = ½ * (FC1 + FC2 + FC3 + FC4)
    BR(M1 – 1,N1) = ½ * (FC1 – FC2 + FC3 – FC4)
    BR(M1,N1 – 1) = ½ * (FC1 + FC2 – FC3 – FC4)
    BR(M1,N1) = ½ * (FC1 – FC2 – FC3 + FC4)--

In column 34, starting on line 46 the four formulas should read,
    --CR(M1 – 1,N1 – 1) = ½ * (FC1 + FC2 + FC3 + FC4)
    CR(M1 – 1,N1) = ½ * (FC1 – FC2 + FC3 – FC4)
    CR(M1,N1 – 1) = ½ * (FC1 + FC2 – FC3 – FC4)
    CR(M1,N1) = ½ * (FC1 – FC2 – FC3 + FC4)--

In column 34, starting on line 57 the four formulas should read,
    --DR(M1 – 1,N1 – 1) = ½ * (FC1 + FC2 + FC3 + FC4)
    DR(M1– 1,N1) = ½ * (FC1 – FC2 + FC3 – FC4)
    DR(M1,N1 – 1) = ½ * (FC1 + FC2 – FC3 – FC4)
    DR(M1,N1) = ½ * (FC1 – FC2 – FC3 + FC4)--

In column 35, line 44, delete "orthogonal"

In column 37, line 49, "Aj=l/81 92" should read, --Aj=1/8192--
In column 37, line 57, the formula should read,
    --Z(0,6) = Z(0,6) + Aj*[–1280*CO1 + 128*CO2]--
In column 37, line 66, the formula should read,
    --Z(6,0) = Z(6,0) + Aj*[–1280*RO1 + 128*RO2]--

UNITED STATES PATENT AND TRADEMARK OFFICE
CERTIFICATE OF CORRECTION

PATENT NO.        : 7,545,988 B2
APPLICATION NO.   : 11/161571
DATED             : June 9, 2009
INVENTOR(S)       : George William Meeker It is certified that error appears in the above-identified patent and that said Letters Patent is hereby corrected as shown below:

In column 38, line 14, the formula should read,
--$Z(6,6) = Z(6,6) + Aj*[-200*DI4 + 20*DH4 + 20*DV4 - 2*OD4]$--

In column 40, line 4, the formula should read,
--$X(7,5) = X(7,5) - P*P*[CR(11,10) + CR(13,12) - CR(11,12) - CR(13,10)]$--

In column 41, line 33 the five entries for should read, --$ZN(3,3)$ –200  20  20  –2--
In column 41, lines 41 and 42, "it must be subtracted added from" should read,
      --it must be subtracted from--

In column 42, line 32, the second formula on this line should read, --$Z(1,1) = Z(1,1) - 2*P3*Q25$--

In column 43 line 11, the second formula should read, --$Q19 = Q14 + Q18$.--

In column 44, line 15, the formula should read, --$Q1 = DI4 * (1 + 2*P)$--
In column 44, line 20, the first formula should read, --$Q4 = DI4 + Q3$--
In column 44, line 26, the first formula should read, --$Q7 = DI4 + Q6$--
In column 44, line 29, the formula should read, --$Q9 = P*(OD4 - 4*DI4)$--
In column 44, line 40, the first formula should read, --$Q15 = Q10/4 + Q13$--

Signed and Sealed this

Seventeenth Day of November, 2009

David J. Kappos
*Director of the United States Patent and Trademark Office*